(12) United States Patent
Lee et al.

(10) Patent No.: US 12,724,817 B2
(45) Date of Patent: Sep. 1, 2026

(54) INTELLECTUAL-PROPERTY LANDSCAPING PLATFORM

(71) Applicant: Moat Metrics, Inc., Spokane, WA (US)

(72) Inventors: Lewis C. Lee, Seattle, WA (US); Jeffrey Brendan Ryan, Liberty Lake, WA (US)

(73) Assignee: Moat Metrics, Inc., Spokane, WA (US)

( * ) Notice: Subject to any disclaimer, the term of this patent is extended or adjusted under 35 U.S.C. 154(b) by 0 days.

(21) Appl. No.: 18/386,228

(22) Filed: Nov. 1, 2023

(65) Prior Publication Data

US 2025/0139149 A1 May 1, 2025

(51) Int. Cl.
*G06F 16/358* (2025.01)
*G06Q 10/0637* (2023.01)
*G06Q 50/18* (2012.01)

(52) U.S. Cl.
CPC ....... *G06F 16/358* (2019.01); *G06Q 10/0637* (2013.01); *G06Q 50/184* (2013.01)

(58) Field of Classification Search
CPC ................................................ G06F 16/33–358
See application file for complete search history.

(56) References Cited

U.S. PATENT DOCUMENTS 10,089,213 B1 * 10/2018 Noble .................. G06F 11/366
10,936,687 B1 * 3/2021 Paiz .................... G06F 16/3341
2002/0129015 A1 * 9/2002 Caudill ................. G06F 16/353 707/E17.08
2003/0069873 A1 * 4/2003 Fox ....................... G06F 16/951
2003/0130998 A1 * 7/2003 Fox ....................... G06F 16/951
2003/0217052 A1 * 11/2003 Rubenczyk ........... G06F 16/951
2017/0329840 A1 * 11/2017 McGowan .......... G06F 16/3323
2018/0052876 A1 * 2/2018 Liu ..................... G06F 16/3347
2020/0341976 A1 * 10/2020 Aggarwal ......... G06F 16/90332
2022/0101462 A1 * 3/2022 Ryan .................... G06Q 50/184
2023/0252224 A1 * 8/2023 Tran ........................ G06F 40/56 715/256

* cited by examiner

*Primary Examiner* — Tony Mahmoudi
*Assistant Examiner* — Nirav K Khakhar
(74) *Attorney, Agent, or Firm* — Lee & Hayes, P.C.

(57) ABSTRACT

Systems and methods for generation and use of intellectual-property (IP) landscaping platform architectures are disclosed. A landscaping component may be utilized to produce refined clusters of IP assets using user seeded searches in varying areas of interest, such as, for example, target technical fields, targeted publications, targeted products, and/or competitor entity portfolios. The landscaping component may be further utilized to produce an interactive graphical element including a spatial representation of the clusters of IP assets. The interactive graphical element may include a slider filter control that may be configured to receive user input representing a lower bound and/or an upper bound associated with an actual date (e.g., a year, a month, a day, etc.) associated with the IP assets included in the clusters of a selected result set.

16 Claims, 16 Drawing Sheets

200

PROCESSOR(S) 116

NETWORK INTERFACE(S) 118

COMPUTER-READABLE MEDIA 120

LANDSCAPING COMPONENT 122

SEEDING COMPONENT 212

SIMILARITY COMPONENT 218

VECTOR COMPONENT 220

RANKING COMPONENT 222

USER INTERFACE GENERATION COMPONENT 214

CLUSTERING COMPONENT 216

MACHINE LEARNING COMPONENT 256

AI TRAINING MODEL COMPONENT 258

SCORING COMPONENT 124

COVERAGE COMPONENT 228

GEOGRAPHIC DISTRIBUTION COMPONENT 234

EXPIRATION COMPONENT 236

COMPREHENSIVE BREADTH SCORE COMPONENT 238

DIVERSITY COMPONENT 240

REVENUE ALIGNMENT COMPONENT 242

INVALIDITY COMPONENT 244

OPPORTUNITY COMPONENT 230

FILING VELOCITY COMPONENT 246

PREDICTIVE ANALYTICS COMPONENT 248

PRECEDENCE COMPONENT 250

EXPOSURE COMPONENT 232

LITIGATION CAMPAIGN COMPONENT 252

ALIGNMENT TO EXPOSURE COMPONENT 254

REMOTE COMPUTING RESOURCES 104

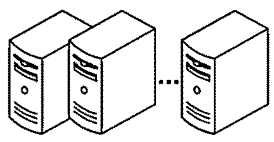

FIG. 2A

REMOTE COMPUTING RESOURCES 104
200
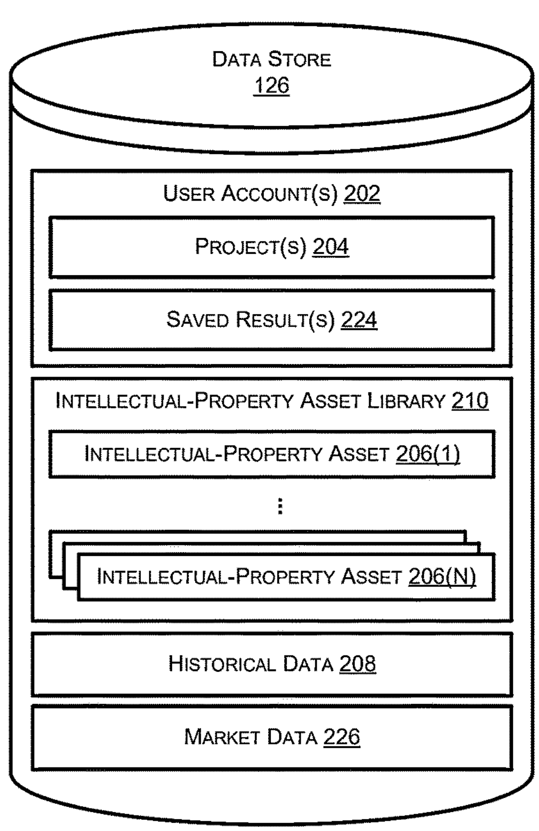
REMOTE COMPUTING RESOURCES 104
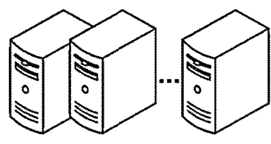
FIG. 2B

300

Provider | IP Scape    RESEARCH    PROJECTS    CLUSTER BOARD    Hi, User

Projects

304

All | Mine | Pinned

306

Add Project

302

| Project Name | Description | Created By | Created Date | Actions |
|---|---|---|---|---|
| Test Project | This project is a test | User #1 | Aug 5th 2020, 1:33 pm | |
| Client #1 Inc. | Client Project | User #1 | Jul 31st 2020, 11:33 am | |
| Electrical Client | Electrical Research | User #3 | Jul 6th 2020, 4:15 pm | |
| Client #1 Product | Software Research | User #7 | Jun 26th 2020, 10:12 am | |
| Specific Area Search #1 | Personal Search | User #2 | May 5th 2020, 1:33 pm | |
| Client #2 Inc. | Client Project | User #1 | Apr 22nd 2020, 2:45 pm | |
| Specific Area Search #2 | Personal Search | User #5 | Apr 7th 2020, 11:38 am | |
| Mechanical Client | Mechanical Research | User #3 | Apr 1th 2020, 3:24 pm | |

FIG. 3

| Markets | Assets | Earliest Priority | Leading Assignee | Score | Precedence |
|---|---|---|---|---|---|
| Venting and Air System | 1,004 | 1997-01-07 | Company A | 94 | 83 |
| Motor Control | 704 | 1994-04-08 | Company B | 87 | 10 |
| Busbars, Battery Connection | 2,005 | 1991-01-07 | Company C | 81 | 98 |
| Battery Packs | 505 | 1999-08-05 | Company B | 62 | 55 |
| Cameras and Sensors | 306 | 2001-01-07 | Company B | 61 | 45 |

Figure 8:
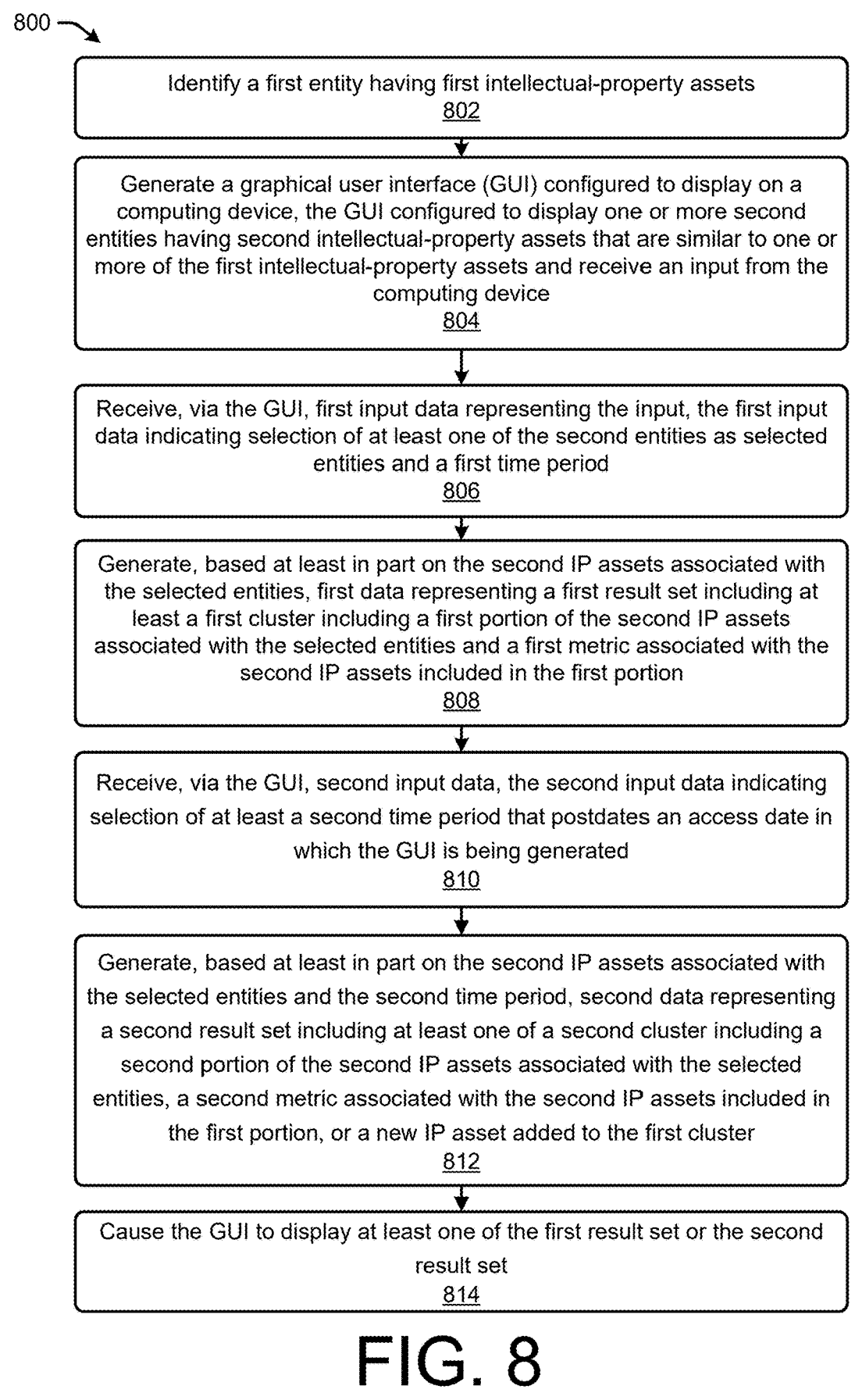

800

Identify a first entity having first intellectual-property assets
802

Generate a graphical user interface (GUI) configured to display on a computing device, the GUI configured to display one or more second entities having second intellectual-property assets that are similar to one or more of the first intellectual-property assets and receive an input from the computing device
804

Receive, via the GUI, first input data representing the input, the first input data indicating selection of at least one of the second entities as selected entities and a first time period
806

Generate, based at least in part on the second IP assets associated with the selected entities, first data representing a first result set including at least a first cluster including a first portion of the second IP assets associated with the selected entities and a first metric associated with the second IP assets included in the first portion
808

Receive, via the GUI, second input data, the second input data indicating selection of at least a second time period that postdates an access date in which the GUI is being generated
810

Generate, based at least in part on the second IP assets associated with the selected entities and the second time period, second data representing a second result set including at least one of a second cluster including a second portion of the second IP assets associated with the selected entities, a second metric associated with the second IP assets included in the first portion, or a new IP asset added to the first cluster
812

Cause the GUI to display at least one of the first result set or the second result set
814

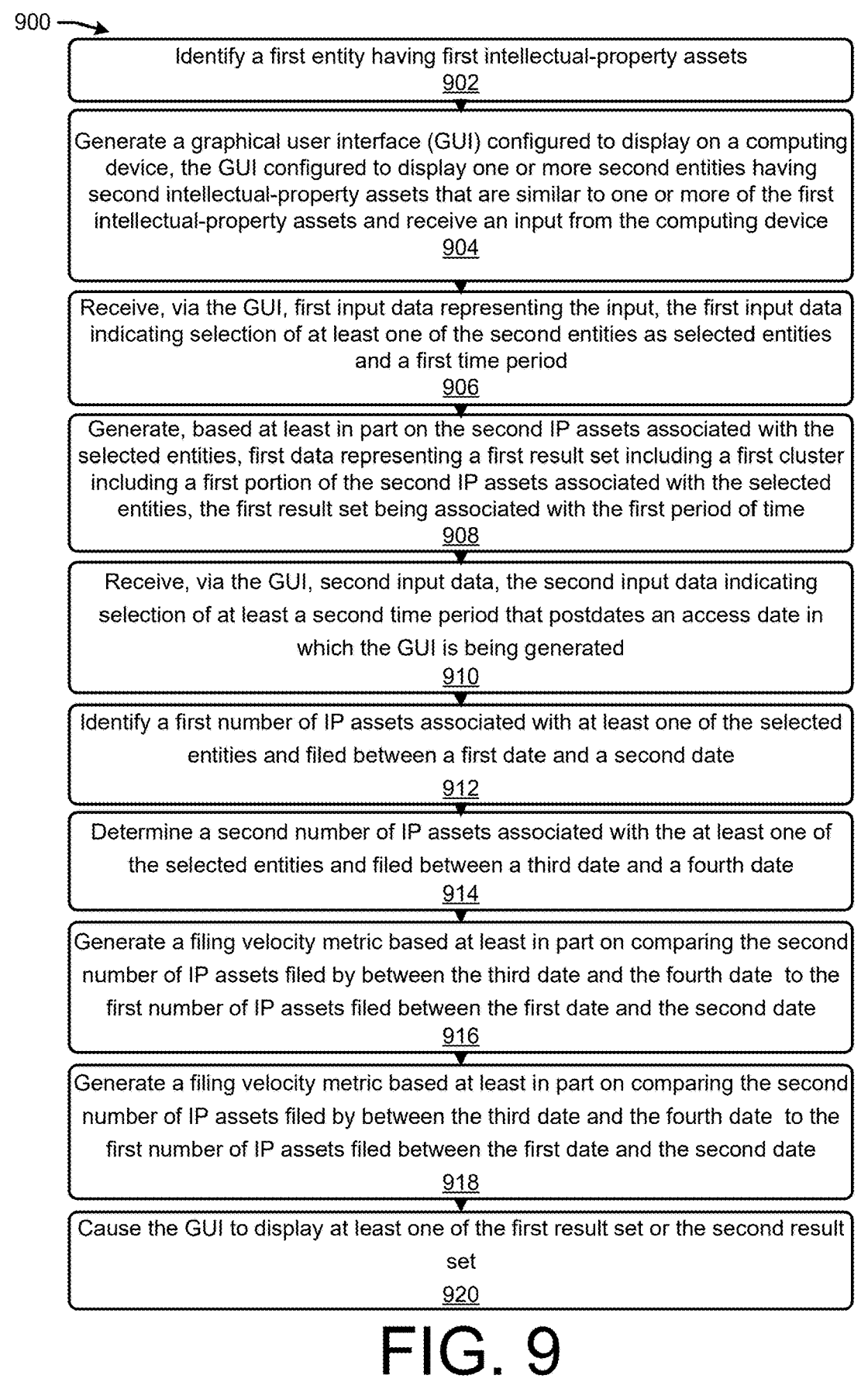

Identify a first entity having first intellectual-property assets
902

Generate a graphical user interface (GUI) configured to display on a computing device, the GUI configured to display one or more second entities having second intellectual-property assets that are similar to one or more of the first intellectual-property assets and receive an input from the computing device
904

Receive, via the GUI, first input data representing the input, the first input data indicating selection of at least one of the second entities as selected entities and a first time period
906

Generate, based at least in part on the second IP assets associated with the selected entities, first data representing a first result set including a first cluster including a first portion of the second IP assets associated with the selected entities, the first result set being associated with the first period of time
908

Receive, via the GUI, second input data, the second input data indicating selection of at least a second time period that postdates an access date in which the GUI is being generated
910

Identify a first number of IP assets associated with at least one of the selected entities and filed between a first date and a second date
912

Determine a second number of IP assets associated with the at least one of the selected entities and filed between a third date and a fourth date
914

Generate a filing velocity metric based at least in part on comparing the second number of IP assets filed by between the third date and the fourth date to the first number of IP assets filed between the first date and the second date
916

Generate a filing velocity metric based at least in part on comparing the second number of IP assets filed by between the third date and the fourth date to the first number of IP assets filed between the first date and the second date
918

Cause the GUI to display at least one of the first result set or the second result set
920

FIG. 9

INTELLECTUAL-PROPERTY LANDSCAPING PLATFORM

BACKGROUND

Analyzing an intellectual-property portfolio of a particular entity with respect to one or more entities having a similar intellectual-property portfolio may provide various insights and can be valuable. However, determining that separate entities have similar intellectual-property portfolios, particularly with entities having large portfolios, is difficult. Disclosed herein are improvements in technology and solutions to technical problems that can be used to, among other things, analyze and generate visual representations of intellectual-property portfolios of various entities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A and 2B illustrate a component diagram of example components of a remote computing resource for the intellectual-property landscaping platform.

FIG. 3 illustrates an example user interface for displaying data associated with a user account representing intellectual-property landscaping projects and/or research queries and/or one or more actionable elements.

FIG. 8 illustrates an example flow diagram of an example process for utilizing a target entity having IP assets to seed an entity search and generate a user interface configured to present extrapolated data associated with entities that are similar to the target entity.

FIG. 9 illustrates an example flow diagram of an example process for utilizing a target entity having IP assets to seed an entity search and generate a user interface configured to present extrapolated data associated with entities that are similar to the target entity.

DETAILED DESCRIPTION

Figure 1:
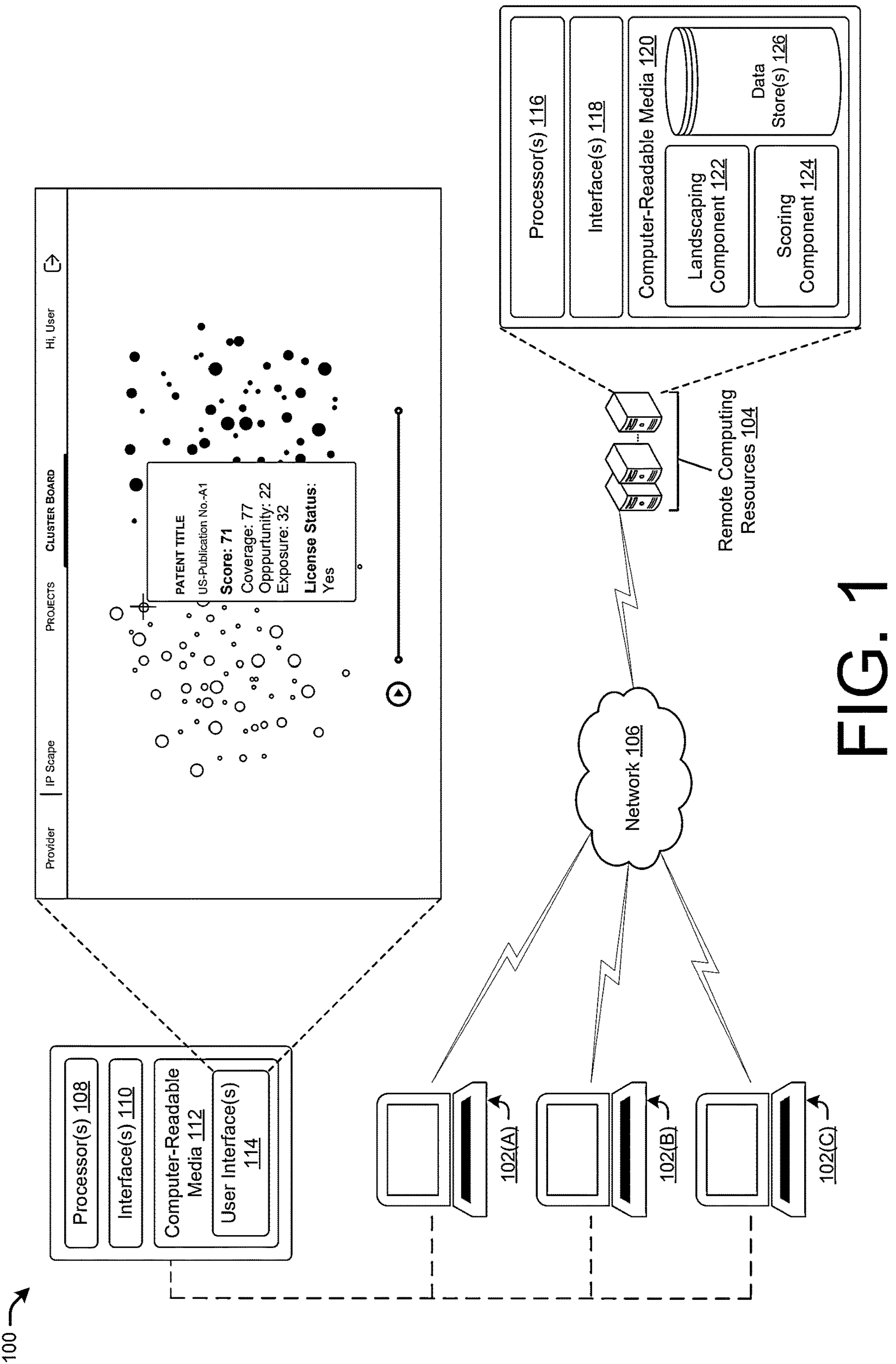
FIG. 1 illustrates a schematic diagram of an example environment for an intellectual-property landscaping platform architecture.

Systems and methods for generation and use of an intellectual-property landscaping platform are disclosed. Take, for example, an entity that would find it beneficial to utilize a platform to analyze a corpus of intellectual-property (IP) assets in an efficient manner by targeting technical fields, subject matters, and/or competitor entities and to determine an overall saturation and/or identify gaps in coverage associated with the IP assets included in the targeted technical fields, subject matters, and/or competitor entities portfolios. For example, an entity may desire to know how densely populated the IP assets associated with a technical field are for patentability determinations, for infringement determinations, for asset acquisition purposes, for research and development purposes, for insurance purposes, etc. In some cases, an entity may find it beneficial to utilize a platform to determine i) an overall coverage and/or identify gaps in coverage; ii) a potential market opportunity; and iii) a potential exposure associated with the IP assets included in the targeted technical fields, subject matters, and/or competitor entities portfolios. For example, an entity may desire to know a comprehensive breadth score, revenue alignment data, filing frequency data, or litigation campaign data associated with the IP assets associated with a technical field, a subject matter, and/or a competitor entities for patentability determinations, for infringement determinations, for asset acquisition purposes, for research and development purposes, for insurance purposes, and the like. Generally, a user may search a database of such documents using keyword searching, such as, for example, a technical term, a target product, or an identifier of a target entity. To gather a reasonable number of results that does not unduly limit the documents in those results, users may employ broad keyword searching and then review each document to determine whether each document should be considered in class or out of class for the purposes at hand. However, taking patents and patent applications as an example, the potential corpus of documents, even if looking just to patents and patent applications filed in the United States, easily numbers in the thousands if not tens of thousands or more. Additionally, grouping the patents into groupings based on one or more shared technical fields, subject matters, and/or by similar entities may become cumbersome, especially when dealing with a large corpus. In light of this, an IP landscaping platform that is configured to identify IP assets that may be determined to be similar to the IP portfolio of one or more target entities, one or more target publications, and/or one or more target products and/or services and generate multiple result sets of varying levels of granularity and having the intellectual-property assets clustered based on the technical aspects of the IP assets would be beneficial. Additionally, an interactive graphical element including a spatial representation of the clusters of the IP assets may be desirable to accurately and efficiently visualize a landscape of the clusters of IP assets.

Described herein is an IP landscaping platform that is configured to produce refined clusters of IP assets using user seeded searches in varying areas of interest, such as, for example, target technical fields, targeted publications, targeted products, and/or competitor entity portfolios. The platform may include a landscaping component, a scoring component, and a data store. In some examples, the landscaping component may include various sub-components, such as, a seeding component, a user interface generation component, and/or a clustering component. Additionally, or alternatively, the seeding component may include various sub-components, such as, a similarity component, a vector component, and/or a ranking component. Generally, the landscaping component may utilize any number of its components to seed user driven IP searches, identify entities having similar IP portfolios, cluster IP assets with varying levels of granularity, and generate a spatial representation of the clusters of IP assets. The scoring component include various sub-components, such as, a coverage component, an opportunity component, an exposure component, and a data store. In some examples, the coverage component may include various sub-components, such as, a geographic distribution component, an expiration component, a comprehensive breadth score component, a diversity component, a revenue alignment component and/or an invalidity component. In some cases, the opportunity component may include various sub-components, such as, a filing velocity component, a predictive analytics component, and/or a precedence component. In some examples, the exposure component may include various sub-component, such as, a litigation campaign component and/or an alignment to exposure component. The datastore may be a secure datastore accessible by the system and utilized to securely store user account data including a project library, an IP asset library including one or more IP assets, and/or historical data. The IP landscaping platform may be accessible to users via one or more user interfaces that may be configured to display information associated with project(s) associated with a user account of the user and/or one or more user account(s) associated with user account. Additionally, or alternatively, the user interface(s) may be configured to receive user input.

The IP landscaping platform may be configured to display a user interface for presenting information associated with the project(s) associated with the user account. For example, the user interface may include selectable portions that when selected, may present information associated with the landscaping component and or information associated with the scoring component. Additionally, or alternatively, the IP landscaping platform may be configured to cause the user interface to present information associated with the landscaping component and/or information associated with the scoring component using different views. Additionally, or alternatively, the user interface(s) may include one or more information windows for presenting information associated with the project(s) associated with the user account.

When a user accesses the IP landscaping platform using a user account, the user interface may be caused to display one or more pages that present portions of the information associated with the landscaping component and/or scoring component using information windows that are relevant to that page. Pages that may be accessed by a user account may include for example, a projects listing page, a selected project page, a selected search page, a similar publication page, a similar entity page, a clustering results page, and/or a cluster board page. In some cases, the user interface may be caused to display one or more pages that present portions of the information associated with the coverage component, the opportunity component, and/or the exposure component using information windows that are relevant to that page. Pages that may be accessed by the user account may include for example, a cluster analysis page, a cluster metric page, a cluster timeline page, and/or the like. As mentioned above, each page presents information using information windows that are relevant to the that page.

When a user account accesses the projects listing page, the user interface may be caused to display an information window associated with the projects listing page and/or one or more actionable elements. For example, the user interface may be caused to display a projects listing window, an add project element, and/or a projects filter element. The projects listing window may include one or more listings of projects associated with the user account corresponding to a selection of the projects filter element.

In some examples, the projects listing window may include a listing of projects associated with a client account. For example, the projects listing window may include projects created by the user account, projects created by additional user accounts that are associated with the user account (i.e., user accounts associated with a similar entity), and/or pinned projects (i.e., projects that the user account has saved). In some examples, the listing of the projects may be presented using individual cells for each project. In some examples, each cell may include an indication of the name of the project, a description of the project, an indication of the user account that created the project, an indication of the date the project was created, and one or more actionable elements associated with the project. In some examples, the add project element may be configured such that, when selected, the user interface presents a window configured to receive user input required to create a new project. In some examples, the one or more actionable elements may include a pin project element, a copy project element, an edit project element, and/or a delete project element. Additionally, or alternatively, each cell may be actionable such that when the project is selected, the user interface may be caused to display a selected project page corresponding to the project that is selected.

When a user account accesses a selected project page, the user interface may be caused to display information windows associated with the project that was selected on the projects listing page. For example, the user interface may be caused to display a project information window and/or one or more view selection elements. The information window may present information associated with the selected project corresponding to the view specified by the selected view selection element.

In some examples, the project information window may include a number of views that may be presented in response to selection of a corresponding view selection element. For example, the project information window may include a search view, a similarities view, and/or a clusters view. In some examples, the one or more view selection elements may include a searches view element, a similarities view element, and/or a clusters view element. The one or more view selection elements may be configured such that, when selected, the project information window may present the view corresponding to the selected view selection element.

When a user account selects the searches view element, the user interface may be caused to display the searches view of the project information window. In some examples, the searches view of the project information window may include a listing of the searches associated with the project and/or a build new search element. The listing of the searches may be presented using individual cells for each search. In some examples, each cell may include an indication of a name of the search, a description of the search, an indication of the user account that created the search, and indication of when the search was created, and/or one or more actionable elements associated with the search. In some examples, the one or more actionable elements may include a copy search element, an edit search element, and/or a delete search element. In some examples, the build new search element may be configured such that, when selected, the user interface presents a window configured to receive user input required to build a new search. Additionally, or alternatively, each cell may be actionable such that when a search is selected, the user interface may be caused to display a search page corresponding to the search that is selected.

When a user account selects the similarities view element, the user interface may be caused to display the similarities view of the project information window. In some examples, the similarities view of the project information window may include a listing of the similarities associated with the project. The listing of the similarities may be presented using individual cells for each similarity. In some examples, each cell may include an indication of a name of the similarity, an indication of the type of the similarity (i.e., patent or assignee), a description of the similarity, an indication of the user account that created the similarity, an indication of the date the similarity was created, and/or a status indicator associated with the similarity. In some examples, the status indicator may provide an indication as to the status of the generation of the similarity, such as, for example, pending, completed, and/or failed. Additionally, or alternatively, each cell may be actionable such that when a similarity is selected, the user interface may be caused to display a publication similarity page corresponding to the publication similarity that is selected and/or the user interface may be caused to display an entity similarity page corresponding to the entity similarity that is selected.

When a user account selects the clusters view element, the user interface may be caused to display the clusters view of the project information window. In some examples, the clusters view of the project information window may include a listing of the clusters that are associated with the project. The listing of the clusters may be presented using individual cells for each cluster. In some examples, each cell may include an indication of a name of the cluster, a description of the cluster, an indication of the user account that created the cluster, an indication of the date the cluster was created, and/or a status indicator associated with the cluster. In some examples, the status indicator may provide an indication as to the status of the generation of the cluster, such as, for example, pending, completed, and/or failed. Additionally, or alternatively, each cell may be actionable such that when the cluster is selected, the user interface may be caused to display a cluster page corresponding to the cluster that is selected.

When a user account accesses the search page, the user interface may be caused to display information windows associated with the search page. For example, the user interface may be caused to display at least one search information window and/or one or more view selection elements. The search information window(s) may present information associated with the selected search corresponding to the view specified by the selected view selection element.

In some examples, the search information window(s) may include a number of views that may be presented in response to selection of a corresponding view selection element. For example, the search information window(s) may include an entity view and/or a publication view. In some examples, the one or more view selection elements may include an entity view element and/or a publication view element. The one or more view selection elements may be configured such that, when selected, the search information window(s) may present the view corresponding to the selected view selection element.

When a user account selects the entity view element, the user interface may be caused to display the entity view of the search information windows. In some examples, the entity view of the search information windows may include an entity search window, a selected entities window, a save element, and/or an actions element. In some examples, the entity search window may include a listing of similar entities and/or a search element. The listing of similar entities may be presented using individual cells for each similar entity. In some examples, each cell may include an indication of a name of the similar entity, an indication of the number of IP assets associated with the similar entity, and/or a select element. In some examples, the select element may be configured such that, when selected, the similar entity is removed from the entity search window and is added to the selected entities window. In some examples, the selected entities window may include a listing of selected entities and/or an indication of a total number of IP assets associated with the selected entities. The listing of selected entities may be presented using individual cells for each selected entity. In some examples, each cell may include an indication of a name of the selected entity, an indication of the number of IP assets associated with the selected entity, and/or a remove element. In some examples, the remove element may be configured such that, when selected, the selected entity is removed from the listing of selected entities and is added to the listing of similar entities in the entity search window. In some examples, the save element may be configured such that, when selected, the listing of selected entities is saved in association with the user account. In some examples, the actions element may be associated with one or more sub-elements. For example, the actions element may include a find similar assignees sub-element, a cluster patents sub-element, an export selected entity patents sub-element, and/or an export litigation for patents sub-element. In some examples, the find similar assignees sub-element may be configured such that, when selected, the user interface is caused to present the similar entity page. Additionally, or alternatively, the cluster patents sub-element may be configured such that, when selected, the user interface is caused to present the clustering results page. Additionally, or alternatively, the export selected entity patents sub-element may be configured such that, when selected, a file may be optionally downloaded by the user representing a listing of the IP assets associated with the selected entities and information associated with the one or more selected entities. Additionally, or alternatively, the export litigation for patents sub-element may be configured such that, when selected, a file may be optionally downloaded by the user representing litigation information associated with the IP assets associated with the selected entities.

When a user account selects the publication view element, the user interface may be caused to display the publication view of the search information window. In some examples, the publication view of the search information window may include a publication search window, a save element, and/or an actions element. In some examples, the publication search window may include a search element and/or an indication of a number of the saved publication numbers associated with the search element. In some examples, the search element may be configured to receive user input representing any number of publication numbers from 1-N, where N is any integer larger than 1. In some examples, the save element may be configured such that, when selected, the publication numbers entered into the search element are saved in association with the user account. In some examples, the actions element may be associated with one or more sub-elements. For example, the actions element may include a find similar publications sub-element, a cluster patents sub-element, an export patents sub-element, an export litigation for patents sub-element, and/or an export Patent Trial and Appeal Board (PTAB) for patents sub-element. In some examples, the find similar publications sub-element may be configured such that, when selected, the user interface is caused to present the similar publication page. Additionally, or alternatively, the cluster patents sub-element may be configured such that, when selected, the user interface is caused to present the clustering results page. Additionally, or alternatively, the export patents sub-element may be configured such that, when selected, a file may be optionally downloaded by the user representing a listing of the IP assets associated with the publication numbers saved in the search element. Additionally, or alternatively, the export litigation for patents sub-element may be configured such that, when selected, a file may be optionally downloaded by the user representing litigation information associated with the IP assets that are determined to be similar to the saved publication numbers included in the search element. Additionally, or alternatively, the export PTAB for patents sub-element may be configured such that, when selected, a file may be optionally downloaded by the user representing PTAB record information associated with the IP assets that are determined to be similar to the saved publication numbers included in the search element.

When a user account accesses the similar publication page, the user interface may be caused to display an information window presenting data associated with the similarity that was selected on the similarities page and/or presenting results from the actions element that was selected on the publication search view of the search page. For example, the user interface may be caused to display a similar publications window, an actions element, and/or one or more actionable elements.

In some examples, the similar publications window may include a listing of similar publications. The listing of similar publications may be presented using individual cells for each similar publication. In some examples, each cell may include an indication of a title of the similar publication, a publication number associated with the similar publication, an indication of an entity and/or assignee associated with the similar publication, a priority date associated with the similar publication, an indication of litigation matters associated with the similar publication, a proprietary score associated with the similar publication, and/or a selection indicator. In some examples, the actions element may include a cluster patents sub-element, an export patents sub-element, and/or an export litigation for patents sub-element. In some examples, the cluster patents sub-element may be configured such that, when selected, the user interface is caused to present the clustering results page. Additionally, or alternatively, the export patents sub-element may be configured such that, when selected, a file may be optionally downloaded by the user representing a listing of the similar publications. Additionally, or alternatively, the export litigation for patents sub-element may be configured such that, when selected, a file may be optionally downloaded by the user representing litigation information associated with the similar publications. In some examples, the one or more actionable elements may include a filter element, a sort element, and a column sort element. In some examples, the filter element may be configured to filter the listing of similar publications. Additionally, or alternatively, the sort element may be configured to sort the listing of similar publications based upon various user selected criteria. Additionally, or alternatively, the column sort element may be configured to sort the listing of similar publications based upon a column associated with the cells.

When a user account accesses the similar entity page, the user interface may be caused to display information windows presenting data associated with the similarity that was selected on the similarities page and/or presenting results from the actions element that was selected on the entity search view of the search page. For example, the user interface may be caused to display a targeted entities window, a similar entities window, and/or one or more actionable elements.

In some examples, the targeted entities window may include a listing of the targeted entities, an indication of a total number of IP assets associated with the targeted entities, and/or an edit target entities selection element. The listing of targeted entities may be presented using individual cells for each targeted entity. In some examples, each cell may include an indication of an identification of the targeted entity and/or an indication of a number of IP assets that are associated with the targeted entity. In some examples, the edit targeted entities selection may be configured such that, when selected, the user interface may be caused to present the entity view of the search page. In some examples, the similar entities window may include a listing of similar entities, a filter element, and/or an actions element. The listing of similar entities may be presented using individual cells for each similar entity. In some examples, each cell may include an indication of a ranking of the similar entity with respect to the other similar entities, an indication of an identification of the similar entity, a number of IP assets associated with the similar entity, and/or a proprietary score associated with the similar entity. In some examples, the filter element may be configured to receive a user input and filter the listing of the similar entities corresponding to text string input into the filter element. In some examples, the actions element may include a cluster patents sub-element, an export entities sub-element, an export top 50 k patents sub-element, and/or an export litigation for selected similar entities sub-element. In some examples, the cluster patents sub-element may be configured such that, when selected, the user interface is caused to present the clustering results page. Additionally, or alternatively, the export entities sub-element may be configured such that, when selected, a file may be optionally downloaded by the user representing the listing of the similar entities. Additionally, or alternatively, the export top 50 k patents sub-element may be configured such that, when selected, a file may be optionally downloaded by the user representing a listing of 50,000 IP assets associated with the top ranked similar entities. Additionally, or alternatively, the export litigation for selected similar entities sub-element may be configured such that, when selected, a file may be optionally downloaded by the user representing litigation information associated with the IP assets of the selected similar entities. In some examples, the one or more actionable elements may include a back to assignee selection element that may be configured such that, when selected, causes the user interface to present the entity view of the search page.

When a user account accesses the clustering results page, the user interface may be caused to display information windows presenting data associated with the cluster that was selected on the clusters page, and/or presenting results from the actions element that was selected on the entity search view of the search page, the actions element that was selected on the similar entity page, and/or the actions element that was selected on the similar publication page. For example, the user interface may be caused to display a targeted entities window and/or a clustering results window.

In some examples, the targeted entities window may include a listing of the targeted entities, an indication of a total number of IP assets associated with the targeted entities, and/or an edit target entities selection element. The listing of targeted entities may be presented using individual cells for each targeted entity. In some examples, each cell may include an indication of an identification of the targeted entity and/or an indication of a number of IP assets that are associated with the targeted entity. In some examples, the edit targeted entities selection may be configured such that, when selected, the user interface may be caused to present the entity view of the search page. In some examples, the clustering results window may include information associated with the selected result set, one or more cluster sub-windows, a result set selector, and/or an actions element. In some examples, the information associated with the selected result set may include an indication of the selected result set, an indication of the number of clusters associated with the selected result set, and/or an indication of a total number of IP assets associated with the clusters included in the selected result set. In some examples, each of the cluster sub-windows may include an indication of the cluster number, a total number of IP assets associated with the cluster, one or more keywords associated with the clusters, and/or a name cluster field configured to receive a user input to specify a name of the cluster. In some examples, the result set selector may include an indication of the currently selected result set, and/or a listing of all of the result sets and an indication of the number of clusters included in each respective result set. In some examples, the actions element may include a cluster board sub-element, an export to Comma Separated Values (CSV) file element, and/or an export litigation for patents sub-element. In some examples, the cluster board sub-element may be configured such that, when selected, the user interface may be caused to present the cluster board page. Additionally, or alternatively, the export to CSV file element may be configured such that, when selected, a file may be optionally downloaded by the user including a representation of the clusters in a .CSV file format. Additionally, or alternatively, the export litigation for patents sub-element may be configured such that, when selected, a file may be optionally downloaded by the user representing litigation information associated with the IP assets included in the clusters of the selected result set.

When a user account accesses the cluster board page, the user interface may be caused to display information presenting data associated with clusters included in a selected result set on the clustering results page. For example, the user interface may be caused to display an interactive graphical element and/or one or more information overlay windows.

In some examples, the interactive graphical element may include a spatial representation of the clusters. In some examples, the spatial representation may include a background represented by white space, graphical indicators associated with respective IP assets included in the clusters, keyword sets associated with respective clusters included in the result set, a slider filter control, and/or an animation sequence element. In some examples, the graphical indicators may be represented as dots having a size corresponding to the relevance of the associated IP asset with respect to the other IP assets included in the cluster. Additionally, or alternatively, the graphical indicators may be represented as dots having a size corresponding to a breadth score, indicating a claim strength and/or breadth of the claims included in the associated IP asset with respect to the other IP assets included in the cluster. Additionally, or alternatively, the graphical indicators may be color coded, such that IP assets that are included in a cluster of the selected result set may be represented by a graphical indicator having a color associated with the cluster. In some examples, graphical indicators belonging to separate clusters in a result set may have different colors that correspond to the respective cluster to which they belong. In some examples, the keyword sets may include one or more keywords associated with a respective cluster and may be presented at a central location of the cluster. Additionally, or alternatively, the keyword set may be represented in a color corresponding to the associated cluster. Additionally, or alternatively, the interactive graphical element may be configured to be manipulated by various user inputs, such as, for example, a zoom action configured to enlarge or shrink the view of the interactive graphical element to a desired location of the spatial representation and/or a click and drag action configured to focus the view of the interactive graphical element to a desired location of the spatial representation. In some examples, the slider filter control may be configured to receive user input representing a lower bound and/or an upper bound associated with a priority date and/or proprietary score associated with the IP assets included in the clusters of the selected result set. In some examples, the animation sequence element may be configured such that, when selected, the interactive graphical element may be caused to display an animated view of the spatial representation of the clusters. For example, the animated view may be configured as a time lapse animation, such that, the graphical elements included in the spatial representation may appear and/or disappear according to the range specified by the lower bound and the upper bound of the slider filter control. In some examples, the slider filter control may be configured to receive user input representing a lower bound and/or an upper bound associated with an actual date (e.g., a year, a month, a day, etc.) associated with the IP assets included in the clusters of the selected result set. That is, the slider filter may be configured to receive an input of a particular year (e.g., past, present, or future), and the graphical elements included in the spatial representation may appear and/or disappear according to the range specified by the lower bound and the upper bound of the slider filter control. In some examples, the animation sequence element may be configured such that, when selected, the interactive graphical element may be caused to display an animated view of the spatial representation of the clusters. For example, the animated view may be configured as a time lapse animation, such that, the graphical elements included in the spatial representation may appear and/or disappear according to the range specified by the lower bound and the upper bound of the slider filter control.

In some examples the cluster analysis page may include a number of views that may be presented in response to selection of a corresponding view selection element. For example, once each cluster has been generated, the platform may determine, and present an analysis associated with each cluster. By way of example, analysis may include a number of IP assets included in each cluster, an earliest priority date of an IP asset included in each cluster, an entity having the most IP assets assigned to them for each cluster, a comprehensive score associated with each cluster, a coverage score (e.g., coverage metric) associated with each cluster, an opportunity score (e.g., an opportunity metric) associated with each cluster, an exposure metric (e.g., an exposure metric) associated with each cluster, and/or other scores or metrics that may be generated by the platform for each cluster. In some cases, these metrics and/or scores may be presented on the cluster metrics page via a table, a line graph, and/or the like.

In some examples the cluster metrics page may include a number of views that may be presented in response to selection of a corresponding view selection element. For example, once each cluster has been generated, the platform may determine, and present metrics associated with each cluster as well as entities associated with the IP assets included in the cluster. By way of example, metrics may include a number of IP assets included in each cluster, an earliest priority date of an IP asset included in each cluster, an entity having the most IP assets assigned to them for each cluster, a comprehensive score associated with each cluster, a coverage score (e.g., coverage metric) associated with each cluster, an opportunity score (e.g., an opportunity metric) associated with each cluster, an exposure metric (e.g., an exposure metric) associated with each cluster, and/or other scores or metrics that may be generated by the platform for each cluster. In some cases, these metrics and/or scores may be presented on the cluster metrics page via a table, a line graph, and/or the like. In some examples, the cluster metrics page may display a visualization of each cluster and a particular metric with respect to an entity assigned to and/or otherwise has ownership of an IP asset within the cluster. For example, the platform may generate a metric (e.g., a comprehensive breadth score) for each IP asset included in each cluster. The platform may also determine which entity is assigned to and/or otherwise has ownership of each IP asset within each cluster. The cluster metric page may generate a visualization, such as a table, that presents each cluster and each entity as well as an indication as to which entity is assigned to and/or otherwise has ownership of the IP asset having the highest value metric (e.g., highest comprehensive breadth score).

In some examples the cluster timeline page may include a number of views that may be presented in response to selection of a corresponding view selection element. For example, the platform may determine earliest priority dates of IP assets within a cluster as well as latest priority dates of IP assets within a cluster and generate a visualization of the priority dates for each cluster on the cluster timeline page. In some cases the visualization may include a line graph for each cluster beginning at the earliest priority date and ending at the latest priority date. In some cases, the visualization included in the cluster timeline page may be based on other dates, such as an earliest and latest filing date of an IP asset within each cluster, an earliest and latest publication date of an IP asset within each cluster, and/or other dates associated with IP assets that may indicate an age of the IP asset.

In some examples, the one or more information overlay windows may include a filter overlay window, an IP asset overlay window, a cluster overlay window, and/or a quick information window. In some examples, the filter overlay window may include a search element configured to allow a user to search for an IP asset and/or a cluster, an indication of a number of IP assets included in the clusters, an indication of the IP assets visible on the current view of the spatial representation (e.g., the graphical elements in view), an indication of a number of IP assets that are included in the clusters but not presented on the interactive graphical element, a project selection control, a score filter slider, a cluster filter element, and/or a cluster color selector. In some examples, the project selection control may be configured such that, when selected, a user may select a project to visualize on the interactive graphical element representing the IP asset landscape. In some examples, the score filter slider may include a lower bound control and/or an upper bound control associated with a proprietary score associated with the IP assets included in the clusters of the selected result set. In some examples, the cluster filter element may be configured such that, when a cluster is selected, the selected cluster may be configured to appear and/or disappear from the spatial representation. In some examples, the cluster color selector may be configured to allow a user to change the colors associated with respective clusters of the selected result set. In some examples, the IP asset overlay window may be displayed in response to user input representing a selection of a graphical element in the spatial representation. The IP asset overlay window may include information associated with a selected IP asset and/or a proprietary score associated with a selected IP asset and generated by the IP landscaping platform. In some examples, the cluster overlay window may include information associated with the cluster, such as, for example, an indication of the color associated with the cluster, an indication of the keyword set associated with the cluster, a number of patents associated with the cluster, and an average of the proprietary scores associated with the IP assets included in the cluster and generated by the IP landscaping platform. In some examples, the quick information overlay window may be displayed in response to a user hovering over a graphical element in the spatial representation. The quick information window may include at least a portion of the information included in the IP asset overlay window.

In some cases, the quick information overlay window may include metric data associated with each selected cluster and/or groups of selected clusters. For example, a user may select a cluster and/or a group of clusters and the graphical indicators may present metric data (e.g., a comprehensive score associated with each cluster, a coverage score (e.g., coverage metric) associated with each cluster, an opportunity score (e.g., an opportunity metric), an exposure metric (e.g., an exposure metric), etc.) and/or other IP related data (e.g., licensing information, standard essential patent (SEP) information, precedent information, etc.) associated with each cluster and/or group of clusters. In some cases, the quick information overlay window may include a ranked list of IP assets within each cluster and/or group of clusters based on their respective metric data. For example, the quick information overlay window may include a top 10 list of IP assets within a given cluster and/or group of clusters based on a coverage score, an opportunity score, an exposure score, and/or the like. In some cases, the list may be based on other rankings, such as a top 10 list of IP assets within a given cluster and/or group of clusters based on a likelihood to be involved in a litigation action, likelihood to be involved in a licensing agreement, and/or the like.

As mentioned above, the IP landscaping platform may include a datastore. In some examples, the datastore may include data corresponding to user accounts, projects, IP assets, historical data, saved results from previous interactions the user account has made with the IP landscaping platform, and/or market data. The project(s) may include, for example, seeded search queries, similarity results, clustering results, and/or spatial representations of clusters. The project(s) may be stored with respect to the user account(s). Additionally, or alternatively, the saved result(s) may include, for example, seeded search queries, similarity results, clustering results, and/or spatial representations of clusters. The IP asset(s) may be stored with respect to an IP asset library. In some examples, the IP asset library may include data associated with IP assets and/or related to a corresponding IP asset, such as, for example, licensing data, and/or standard essential patent data. The historical data may be stored with respect to the user account(s) and/or independently in the data store(s). In some examples, the historical data may include historical data associated with an entity, a publication, an IP asset, and/or a user account. For example, the historical data may include data specific to mergers and acquisitions associated with a particular entity and/or IP asset. The market data may include market data associated with an entity, an IP asset, a technological area, a product and/or service, and/or standardized market data, and/or any other non-IP related data of the like.

As mentioned above, the IP landscaping platform may include a landscaping component utilized to generate seeded search queries using user targeted data, identify IP assets and/or entities determined to be similar to the targeted data, generate clusters of IP assets, and/or generate an interactive graphical element including a spatial representation of selected clusters. In some examples, the landscaping component may include one or more sub-components. For example, the landscaping component may include a seeding component, a user interface generation component, and/or a clustering component. In some examples, the landscaping component may utilize the one or more sub-components to make determinations and/or generate data to be displayed on the user interface.

In some examples, the seeding component may include one or more sub-components. For example, the seeding component may include a similarity component, a vector component, and/or a ranking component. The seeding component may utilize the one or more sub-components to make determinations and/or to generate data to be displayed on the user interface. Additionally, or alternatively, the seeding component may be configured to generate seeded search queries using user specified targeted data. For example, a user may specify one or more target entities, one or more target publications, and/or one or more target products that the seeding component may utilize to generate a seeded search. In some examples, the seeding component may be configured to identify one or more target entities utilizing data representing one or more target publications and/or one or more target products. The results of the seeded search may include a listing of entities having IP assets (e.g., an IP asset portfolio) that the similarity component has determined to include similarities to the targeted data.

In some examples, the similarity component may be configured to identify similarities between separate data. For example, given a target entity and/or target entities having IP assets (e.g., an IP asset portfolio), the similarity component may be configured to identify one or more additional entities having IP assets (e.g., an IP asset portfolio) that are similar to the IP assets of the target entity. In some examples, the similarity component may be configured to identify an entity having an IP asset portfolio that is similar to an additional IP asset portfolio of an additional entity. In some examples, the similarity component may compare words included in a text portion of IP assets to determine if two separate IP assets are similar to one another. Additionally, or alternatively, the landscaping component and/or similarity component may utilize any other word matching and/or document comparison techniques to determine if two separate IP assets are similar. Additionally, or alternatively, the similarity component may utilize the vector representations of publications and/or entities to determine if two separate IP assets and/or entities are similar to one another.

In some examples, the vector component may be configured to generate vector representations of publications and/or entities. For example, the vector component may be configured to generate a vector representation of a publication and use the vector representation to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents. Additionally, or alternatively, the vector component may be configured to utilize the vector representations of the IP assets that are associated with an entity, such as, for example, a target entity and/or one or more additional entities, to generate a vector representation of an entity. Techniques to generate vectors representing entities may include various vectorization techniques utilized to generate the vectors representing IP assets, and may aggregate the data to generate a vector representing the entity associated with the IP assets.

In some examples, the ranking component may be configured to rank the results of the seeded search that may include a listing of entities having IP assets that the similarity component has determined to include similarities to the targeted data. For example, the ranking component may compare the vector representations generated by the vector component to determine which entities are most similar to a target entity and rank the entities accordingly.

The user interface generation component may be configured to generate user interface element(s) and/or user interface pages described above using data received from other components utilized by the system. In some examples, the user interface generation component may be communicatively coupled to the other components stored thereon the computer-readable media. In some examples, the user interface generation component may generate user interfaces configured to present information associated with user projects associated with a user account. Additionally, or alternatively, the user interface generation component may generate user interfaces including confidential information and may be configured to be accessible by only users with predetermined qualifications. For example, the user interface generation component may cause only a portion of information to be displayed based on the type of account that is accessing the system. For example, when a user accesses the system, the system may determine that the account type of the account that the user has utilized to access the system may be one of, for example, a client user account and/or an administrative user account. In some examples, the user interface generation component may generate interactive graphical elements and/or dynamic animation sequences associated with the interactive graphical elements.

The clustering component may be configured to generate result sets including one or more clusters of IP assets. In some examples, the clustering component may generate multiple result sets including any number of clusters from 1-N, where N is any integer larger than 1. In some examples, the result sets may be associated with varying levels of granularity. For example, a result set having 2 clusters may be less granular than a result set having 20 clusters. In some examples, the result sets may be generated using a vector form described above, such as, for example, the embedding. As mentioned above, the embedding may be used to calculate distance, and therefore similarity, between documents. The embeddings may also be utilized to create thematic groups of documents. The thematic groups may be determined utilizing a set of keywords determined following analysis of a text portion of the IP assets, and the result may be a visual display of document groups (e.g., the clusters) that share similar themes. There may be a degree of supervision in the clustering process that may allow for some human control over which documents are grouped in which clusters. Each result set may include an indication of the number of clusters included in the result set. In some examples, each of clusters may include an indication of the number of IP assets included in the respective cluster and/or the keywords associated with the respective cluster. The clusters need not include all of the IP assets associated with the one or more selected entities, as some of the IP assets may be determined to be outliers and/or not associated with a cluster and/or result set.

In some examples, as mentioned above, the result sets generated by the clustering component may be associated with varying levels of granularity. In some examples, the varying levels of granularity may be achieved by utilizing various cluster specific techniques to assign IP assets into clusters, as described with more detail below. In some examples, hard clustering assignments may be made on IP assets where the cluster assignment by the system is uncertain. Additionally, or alternatively, IP assets that have an uncertain cluster assignment may be grouped with other IP assets that have an uncertain cluster assignment. Additionally, or alternatively, for each IP asset, its probability of belonging to every cluster may be calculated. In some examples, a vector may be generated representing the probabilities of its membership to every cluster. In some examples, this process may be repeated until the IP asset reaches a threshold probability of belonging to at least one of the clusters. Additionally, or alternatively, the IP asset may be assigned to a cluster in which the IP asset has the highest probability of belonging to. Additionally, or alternatively, an IP asset not belonging to a cluster may include very low probabilities of belonging to each of the clusters, and may be identified as a singleton IP asset, and/or may be identified as a novel IP asset among the IP assets included in the clusters. Additionally, or alternatively, user input may be provided to guide the assignment of an IP asset into a cluster grouping. In some examples, one or more models that are associated with the result sets may be saved in association with a user account such that the saved models may be applied later to new IP assets considered for cluster assignment.

Take for example, a user accessing the IP landscaping platform to interact with, conduct research, and/or create a new user project. The landscaping component may be configured to receive data representing a user project. Additionally, or alternatively, the landscaping component may be configured to receive data representing a research query that is unassociated with a project. It should be appreciated that the operations described herein may be executed in association with and/or standalone from user projects. The user project may be created by and associated with a user account and/or one or more user accounts that are associated with the user account. The user projects may be stored in association with the user account data in the secure datastore. In some examples, the user projects may be utilized to organize and/or separate seeded searches, identified similar IP assets and/or entities, and/or generated clusters. In some examples, users may utilize the seeding component to generate seeded searches, generate one or more result sets including clusters of IP assets, and/or generate a spatial representation of one or more of the clusters.

In some examples, the seeding component may be configured to receive data representing a seeded search query and may perform a search operation in a number of ways. A seeded search query may include one or more instances of target data as described in more detail below. In some examples, the seeded search query may indicate an identification of one or more target entities. Additionally, or alternatively, the seeded search query may indicate an identification of one or more target publications, such as, for example, an IP asset. Additionally, or alternatively, the seeded search query may indicate an identification of one or more target products and/or services. In some examples, the IP landscaping platform may be configured to receive additional data associated with the seeded search query. For example, the seeding component may be configured to receive additional data via one or more actionable elements included on a graphical user interface (GUI) presented on a computing device and accessible to a user account. Additionally, or alternatively, the seeding component may be configured to utilize the data representing a seeded search query to make various identifications and determinations associated with IP assets and/or entities, among other things.

In some examples, the seeded search query may indicate the identification of the one or more target entities, and the seeding component may utilize the data to identify IP assets that are associated with the target entity. In some examples, the seeding component may access one or more database(s) including a listing of all of the available IP assets associated with the target entity (e.g., an IP asset portfolio). Additionally, or alternatively, the seeding component may generate a result set including IP assets having an assignee associated with the entity.

Additionally, or alternatively, the seeded search query may indicate the identification of the one or more target publications, and the similarity component may utilize the data representing the seeded search query to identify IP assets (or IP asset portfolios) that are determined to be similar to the target publication. The similarity component may identify similar IP assets using various techniques. For example, the vector component may generate a vector representation of the target publication and use the vector representation to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents. Each of the IP assets may be associated with an entity, and the seeding component may identify a target entity from one or more entities associated with the similar IP assets. In some examples, seeding component may identify a first entity of the one or more entities as a target entity based on the first entity having a number of IP assets that satisfy a threshold number. Additionally, or alternatively, the seeding component may identify a first entity of the one or more entities as a target entity based on the first entity having a more favorable number of IP assets than the one or more additional entities. For example, if the first entity has the more IP assets than the additional entities, than the seeding component may determine that the first entity has a more favorable number of IP assets and select the first entity as the target entity.

Additionally, or alternatively, the seeded search query may indicate the identification of the one or more target products and/or services, and the similarity component may utilize the data representing the seeded search query to identify IP assets that are determined to be similar to the target product and/or service. The similarity component may identify similar IP assets using various techniques. For example, the similarity component may identify a technical feature associated with the target product and may identify IP assets that are associated with the product and/or service as the similar IP assets based on the technical feature. Each of the similar IP assets may be associated with an entity, and the similarity component may identify a target entity from one or more entities associated with the similar IP assets. In some examples, the seeding component may identify a first entity of the one or more entities as a target entity based on the first entity having a number of IP assets that satisfy a threshold number. Additionally, or alternatively, the seeding component may identify a first entity of the one or more entities as a target entity based on the first entity having a more favorable number of IP assets than the one or more additional entities. For example, if the first entity has the more IP assets than the additional entities, then the seeding component may determine that the first entity has a more favorable number of IP assets and select the first entity as the target entity.

Once the landscaping component identifies one or more target entities (also referred to as target entity), the landscaping component may identify, or gather, all of the IP assets associated with the target entity. Utilizing the target entity and the associated IP assets, the landscaping component and/or similarity component may be configured to identify additional entities having IP assets that are similar to the IP assets of the target entity. For example, the landscaping component and/or vector component may utilize the techniques described above to generate vectors representing the IP assets to determine if two separate IP assets are similar. Additionally, or alternatively, the landscaping component and/or similarity component may utilize any other word matching and/or document comparison techniques to determine if two separate IP assets are similar. The landscaping component and/or similarity component may then identify one or more additional entities having IP assets that are determined to be similar to the IP assets of the target entity.

The landscaping component and/or vector component may then generate a vector representation of the target entity and/or the one or more additional entities. For example, the landscaping component may be configured to utilize the vector representations of the individual ones of the IP assets that are associated with an entity, such as, for example, the target entity and/or the one or more additional entities, to generate a vector representation of an entity. Techniques to generate vectors representing entities may include various vectorization techniques utilized to generate the vectors representing IP assets, and may aggregate the data to generate a vector representing the entity associated with the IP assets.

Once the landscaping component has identified a target entity, one or more additional entities having IP assets determined to be similar to the IP assets of the target entity, and the vector representations of the target entity and/or the one or more additional entities, the landscaping component and/or the ranking component may determine a ranking of the one or more additional entities to generate the seeded search results. In some examples, the ranking may be configured to rank a first entity higher than a second entity of the one or more additional entities if the first entity is determined to have IP assets that are more similar to the IP assets of the target entity. Additionally, or alternatively, the ranking may be configured to rank a first entity higher than a second entity of the one or more additional entities if the first entity has a more favorable vector representation than the second entity. For example, a first vector representation of a first entity may be determined to be more favorable than a second vector representation of a second entity if the first vector representation is determined to be closer to the vector representation of the target entity than the second vector representation.

As mentioned above, the landscaping component and/or user interface generation component may generate one or more graphical user interface(s) (GUIs) for presenting information on computing device(s) accessible by user accounts. In some examples, the IP landscaping platform may generate a user interface for presenting the seeded search results. The GUIs may be configured to receive one or more inputs from the computing device. In some examples, the GUI may receive an input representing a selection of at least one entity of the one or more additional entities included in the seeded search results as one or more selected entities. In some examples, the landscaping component and/or user interface generation component may be configured to generate any of the user interfaces described above.

In some examples, the landscaping component and/or clustering component may utilize the seeded search results to generate one or more result sets including clusters of IP assets. For example, the landscaping component may generate data representing the one or more result sets based at least in part on the IP assets that are associated with the one or more selected entities. In some examples, the one or more result sets may include one or more clusters of the IP assets that are associated with the one or more selected entities. The result sets may include any number of clusters from 1-N, where N is any integer larger than 1. In some examples, the result sets may be associated with varying levels of granularity. For example, a result set having 2 clusters may be less granular than a result set having 20 clusters. In some examples, the result sets may be generated using a vector form described above, such as, for example, the embedding. As mentioned above, the embedding may be used to calculate distance, and therefore similarity, between documents. The embeddings may also be utilized to create thematic groups of documents. The thematic groups may be determined utilizing a set of keywords determined following analysis of a text portion of the IP assets, and the result may be a visual display of document groups (e.g., the clusters) that share similar themes. There may be a degree of supervision in the clustering process that may allow for some human control over which documents are grouped in which clusters. Each result set may include an indication of the number of clusters included in the result set. In some examples, each of clusters may include an indication of the number of IP assets included in the respective cluster and/or the keywords associated with the respective cluster. The clusters need not include all of the IP assets associated with the one or more selected entities, as some of the IP assets may be determined to be outliers and/or not associated with a cluster and/or result set.

Additionally, or alternatively, the landscaping component and/or user interface generation component may be configured to generate one or more GUIs for presenting the clustering results. In some examples, the GUIs may be configured to receive one or more user inputs associated with the clustering results. In some examples, a GUI may receive an input representing a selection of a result set of the one or more result sets and may present the clusters associated with the selected result set. Additionally, or alternatively, a GUI may receive an input representing a user specified name of a cluster. Additionally, or alternatively, a GUI may receive an input representing a request to generate an interactive graphical element including a spatial representation of the one or more clusters for the selected result set.

In some examples, the landscaping component and/or user interface generation component may generate an interactive graphical element including a spatial representation of one or more clusters included in a selected result set. For example, the landscaping component may generate the interactive graphical element to present on a GUI. In some examples, the landscaping component may include graphical indicators representing individual ones of the IP assets included in the one or more clusters of the selected result set. In some examples, the graphical indicators may be color coded, such that IP assets that are included in a first cluster of the result set may be represented by a graphical indicator having a first color, and IP assets that are included in a second cluster of the result set may be represented by a graphical indicator having a second color that is different from the first color. Additionally, or alternatively, the graphical indicators may be represented as dots of varying sizes representing an overall score and/or an overall relevance of the IP asset with respect to the other IP assets included in the result set. In some examples, the interactive graphical element may present the one or more keywords associated with a cluster on the spatial representation of the IP assets at a central portion of the associated cluster.

As mentioned above, the IP landscaping platform may include a scoring component that includes sub-components, such as, a coverage component utilized to determine an overall coverage and/or identify gaps in coverage, an opportunity component utilized to determine a potential market opportunity, and an exposure component utilized to determine a potential exposure associated with the IP assets. In some examples, each of the coverage component, the opportunity component, and the exposure component may include one or more sub-components.

For example, the coverage component may include various sub-components, such as, a geographic distribution component, an expiration component, a comprehensive breadth score component, a diversity component, a revenue alignment component and/or an invalidity component. In some examples, the coverage component may utilize the one or more sub-components to make determinations and/or generate data to be displayed on the user interface. For example, each of the sub-components may generate a metric to be utilized by the coverage component to generate a coverage metric. In some examples, the coverage metric may be generated for an IP asset portfolio of an entity accessing the IP landscaping platform, a sub-set of the IP asset portfolio (e.g., for a particular market and/or technology), an IP asset portfolio of another entity (e.g., business competitor) associated with the entity accessing the IP landscaping platform, and/or a sub-set of the IP asset portfolio (e.g., for a particular market and/or technology) of the other entity. The coverage metric may indicate a comprehensive score indicating an IP coverage associated with the IP asset portfolio and/or a subset of the IP asset portfolio.

In some examples, the geographic distribution component may make determinations and/or generate data to be displayed on the user interface. For example, a user may specify one or more target entities, one or more target publications, and/or one or more target products that the geographic distribution component may utilize to generate a geographic distribution search. In some examples, the geographic distribution component may be configured to identify one or more target entities utilizing data representing one or more target publications and/or one or more target products. The results of the geographic distribution search may include an identification of which countries and/or regions that individual IP assets of an IP asset portfolio are filed. In some examples, the geographic distribution component may determine which countries and/or regions the IP assets of the IP asset portfolio are filed for a given entity, market, and/or technology area. In some cases, the geographic distribution component may determine a metric based at least in part on which countries the IP assets are filed. For example, the geographic distribution component may determine a gross domestic product (GDP) value associated with each country and/or region in which an entity has filed IP assets. The geographic distribution component may generate a metric based on which countries and/or regions the IP assets are filed and the GDP of those respective countries and/or regions. In some cases, if a country that the IP assets are filed in have a higher GDP, the geographic distribution component may generate a positive metric. Additionally, and/or alternatively, if a country that the IP assets are filed in have a lower GDP, the geographic distribution component may generate a negative metric. In some examples, the metrics generated by the geographic distribution component may be used by the coverage component to generate a coverage metric.

In some examples, the expiration component may make determinations and/or generate data to be displayed on the user interface. For example, a user may specify one or more target entities, one or more target publications, and/or one or more target products that the expiration component may utilize to generate an expiration search. In some examples, the expiration component may be configured to identify one or more target entities utilizing data representing one or more target publications and/or one or more target products. The results of the expiration search may include determining a number and/or a breadth score associated with individual IP assets of an asset portfolio. In some cases, the expiration component may determine that a number of IP assets of an asset portfolio are about to expire and that a breadth score of these IP assets are high. In this case, the expiration component may generate a negative metric to be provide to the coverage component. Additionally, and/or alternatively, the expiration component may determine that a number of IP assets of an asset portfolio are about to expire and that a breadth score of these IP assets are low. In this case, the expiration component may generate a less negative metric to be provide to the coverage component.

In some examples, the comprehensive breadth score component may make determinations and/or generate data to be displayed on the user interface. For example, a user may specify one or more target entities, one or more target publications, and/or one or more target products that the comprehensive breadth score component may utilize to generate a comprehensive breadth search. In some examples, the comprehensive breadth score component may be configured to identify one or more target entities utilizing data representing one or more target publications and/or one or more target products. The results of the comprehensive breadth search may include a comprehensive breadth score for an IP asset portfolio of an entity accessing the IP landscaping platform, a sub-set of the IP asset portfolio (e.g., for a particular market and/or technology), an IP asset portfolio of another entity (e.g., business competitor) associated with the entity accessing the IP landscaping platform, and/or a sub-set of the IP asset portfolio (e.g., for a particular market and/or technology) of the other entity. The comprehensive breadth score for a group of IP assets (e.g., a portfolio of IP assets and/or a sub-set of the portfolio of IP assets) may be based on weighted breadth scores calculated for individual IP assets of the group of IP assets. For example, the comprehensive breadth score component may receive or otherwise identify a plurality of IP assets associated with an entity and calculate, for the individual IP assets of the plurality of IP assets, a breadth score based at least in part on a word count score and a commonness score for the respective portions of text included in the individual intellectual-property assets. In some cases, the word count score may be based on a word count associated with respective portions of text and word counts associated with portions of text from at least one other IP asset of the plurality of IP assets. In some cases, the commonness score may be based on a frequency in which words within the respective portion of text are found in the portions of text from at least one other IP asset. Once the breadth score is calculated for individual IP assets of the group of IP assets, the comprehensive breadth score component may calculate a weighted score for the individual IP assets based on multiplying the breadth score by a weight that is determined by the respective breadth scores for the individual IP assets. For example, the comprehensive breadth score component may assign a lower weight (e.g., 1) to an IP asset determined to have a low breadth score, a medium weight (e.g., 2) to an IP asset determined to have a medium breadth score, and a higher weight (e.g., 3) to an IP asset determined to have a high breadth score. Once the weighted breadth scores are determined, the comprehensive breadth score component may calculate a comprehensive score for the group of IP assets by calculating an average of the weighted scores of the individual IP assets. In some examples, the comprehensive breadth score component may provide the comprehensive score for the group of IP assets to the coverage component to be used in calculating a coverage metric.

In some cases, the comprehensive breadth score component can calculate the comprehensive breadth score for a group of IP assets based on a market and/or technology area. In some examples, the comprehensive breadth score component can calculate the comprehensive breadth score over multiple periods of time such that a visualization of how the comprehensive breadth score for a group of IP assets has changed over time can be depicted. In some cases, the comprehensive breadth score for a group of IP assets may have changed due to a new IP asset that has been filed, a new IP asset that has granted, an IP asset that has expired, and an IP asset that has been abandoned and/or a breadth score for an IP asset that has changed.

In some examples, the diversity component may make determinations and/or generate data to be displayed on the user interface. For example, a user may specify one or more target entities, one or more target publications, and/or one or more target products that the diversity component may utilize to generate a diversity search. In some examples, the diversity component may be configured to identify one or more target entities utilizing data representing one or more target publications and/or one or more target products. The results of the diversity search may include a metric indicating how diversified a group of IP assets are over a given market and/or technology area.

In some examples, the revenue alignment component may make determinations and/or generate data to be displayed on the user interface. For example, a user may specify one or more target entities, one or more target publications, and/or one or more target products that the revenue alignment component may utilize to generate a revenue alignment search. In some examples, the revenue alignment component may be configured to identify one or more target entities utilizing data representing one or more target publications and/or one or more target products. The results of the revenue alignment search may include a metric indicating how a group of IP assets associated with an entity and with a given market and/or technology area aligns with the revenue generated by that market and/or technology area for the entity. For example, the revenue alignment component may identify one or more market areas and/or technology areas associated with an entity accessing the IP landscaping platform. The revenue alignment component may identify revenue streams of the entity that are associate with the one or more market areas and/or one or more technology areas and identify a number of IP assets that are associated with the entity as well as the one or more technology areas. In some cases, the revenue alignment component may determine a percentage of revenue generated in a market area and/or technology area of a total amount of revenue generated by the entity and may determine a percentage of IP assets directed to the one or more market areas and/or one or more technology areas from among a group of IP assets filed by the entity. The revenue alignment component may then generate an alignment metric based at least in part on the number of the IP assets associated with the one or more market areas and/or one or more technology areas and the one or more revenue streams associated with the one or more market areas and/or one or more technology areas. In some examples, the revenue alignment component may identify the market and/or technology areas by accessing a taxonomy of market sets and/or a taxonomy of technology areas provided by a third-party resource and/or stored on the database. In this way, the revenue alignment component may illustrate if an entity is revenue heavy (e.g., greater percentage of revenue generated than percentage of IP assets filed) or is more IP asset heavy (e.g., greater percentage of IP assets filed than percentage of revenue generated) for individual market areas and/or technology areas.

In some cases, the revenue alignment component may also generate a metric illustrating a revenue alignment for multiple other entities. For example, the revenue alignment component may determine a percentage of revenue generated in a market area and/or technology area of a total amount of revenue generated by a group of entities and may determine a percentage of IP assets directed to the one or more market areas and/or one or more technology areas from among a group of IP assets filed by the group of entities. In this way, the revenue alignment component may illustrate a comparison of a revenue alignment metric associated with the entity to a revenue alignment metric associated with multiple other entities generating revenue and filing IP assets in an individual market area and/or technology area.

In some examples, the invalidity component may make determinations and/or generate data to be displayed on the user interface. For example, a user may specify one or more target entities, one or more target publications, and/or one or more target products that the invalidity component may utilize to generate a geographic distribution search. In some examples, the invalidity component may be configured to identify one or more target entities utilizing data representing one or more target publications and/or one or more target products. The results of the invalidity search may include citation data associated with a group of IP assets and/or individual IP assets associated with an entity accessing the IP landscaping platform. In some cases, the invalidity component may generate an invalidity metric indicating a likelihood that an IP asset may be considered to be invalid if it were to be challenged in a court of law. In some cases, the invalidity component may generate the invalidity metric based on a density of other IP assets cited during prosecution of the IP asset, a density of other IP assets in which the IP asset was cited during prosecution, and/or litigation data associated with the other IP assets (e.g., result of invalidity challenges of the other IP assets). In some cases, the invalidity metric may be utilized by other component and/or sub-components to impact other metrics, such as the comprehensive breadth score metric.

In some cases, the coverage component may utilize any metric generated by the various sub-components to generate a coverage metric associated with a group of IP assets associated with an entity and/or other entities. In some cases, other determinations may affect the coverage metric, such as, legal status of an IP asset (e.g., ownership of the IP asset), how a breadth scope of claims change during prosecution of an IP asset, etc.

In some cases, the opportunity component may include various sub-components, such as, a filing velocity component, a predictive analytics component, and/or a precedence component. In some examples, the opportunity component may utilize the one or more sub-components to make determinations and/or generate data to be displayed on the user interface. For example, each of the sub-components may generate a metric to be utilized by the opportunity component to generate an opportunity metric. In some examples, the opportunity metric may be generated for an IP asset portfolio of an entity accessing the IP landscaping platform, a sub-set of the IP asset portfolio (e.g., for a particular market and/or technology), an IP asset portfolio of another entity (e.g., business competitor) associated with the entity accessing the IP landscaping platform, and/or a sub-set of the IP asset portfolio (e.g., for a particular market and/or technology) of the other entity. The opportunity metric may indicate a potential market area and/or technology area opportunity associated with the IP asset portfolio and/or a subset of the IP asset portfolio.

In some examples, the filing velocity component may make determinations and/or generate data to be displayed on the user interface. For example, a user may specify one or more target entities, one or more target publications, and/or one or more target products that the filing velocity component may utilize to generate a filing velocity search. In some examples, the filing velocity component may be configured to identify one or more target entities utilizing data representing one or more target publications and/or one or more target products. The results of the filing velocity search may include a filing velocity metric indicating a percentile rank of an entity for filing of IP assets in a given market area and/or technology area. For example, the filing velocity component may identify a total amount of IP assets filed that are directed towards or otherwise associated with a given market area and/or technology area for a period of time (e.g., a year, five years, ten years, etc.) The filing velocity component may then identify a number of IP assets filed by individual entities, such as an entity accessing the IP landscaping platform and associated entity competitors, during that time period directed towards or otherwise associated with the market area and/or the technology area. In some examples, the filing velocity component may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component to generate an opportunity metric. For example, a low percentile ranking (e.g., 10%, 20%, 30%) may indicate that an entity is underperforming with regard to a number of IP assets filed in a particular market area and/or technology area. Additionally, and/or alternatively, a high percentile ranking (e.g., 70%, 80%, 90%) may indicate that an entity is overperforming with regard to a number of IP assets filed in a particular market area and/or technology area. In some cases, the filing velocity component may be used to predict future metrics associated with IP assets. For instance, the percentile ranking of an entity and/or technology area and/or an amount in which a number of filings has increased (e.g. a filing velocity) may be extrapolated by the filing velocity component into an upcoming time period. For example, if an entity has increased an amount of IP assets filed by 10% each year for the last 50 years and the entity filed 200 IP assets in the current year of 2023, the filing velocity component may predict that the entity will file a 10% increase for the year 2024 and file 220 IP assets for the year 2024. The same type of extrapolation can be applied to a given market and/or technology area. For instance, if a particular market and/or technology area has grown or shrunk (e.g., increased or decreased of associated IP asset filings) over a period of time by a determined amount of a determined period of time (e.g., 5% decrease over the last 75 years), then the filing velocity component may extrapolate that value and apply it to future periods of time to determine how the market and/or technology area may grow or shrink in the future.

In some cases, the term "future," as used herein may indicate a future date that has yet to come into existence (e.g., the time or a period of time following the moment of speaking or writing). In some examples, the term "future" may refer to a period of time in which there is no and/or not enough data (e.g., documentation) to be used in generating one or more determinations (e.g., metrics). For instance, in some cases, certain documents (e.g., patent applications) may not be made publicly available for a period of time (e.g., 18 months) after they are generated and/or filed with a particular entity (e.g., the United States Patent and Trademark Office (USPTO)). Thus, the IP landscaping platform may generate predictions for determinations (e.g., metrics) based on the techniques discussed herein for the period of time in which no and/or not enough data exists, regardless of whether or not that period of time has come into existence or not. In some cases this period of time may be referred to as the "future," in the sense that the period of time post-dates a last date in which publicly available data exists. In some examples, the predicted data that is generated for the period of time in which the publicly available data does not exist may be referred to as an extrapolated data set.

In some examples, the filing velocity component may identify a total amount of IP assets filed that are directed towards or otherwise associated with an IP art unit for a period of time (e.g., a year, five years, ten years, etc.) The filing velocity component may then identify a number of IP assets filed by individual entities, such as an entity accessing the IP landscaping platform and associated entity competitors, during that time period directed towards or otherwise associated with the IP art unit. In some examples, the filing velocity component may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component to generate an opportunity metric. For example, a low percentile ranking (e.g., 10%, 20%, 30%) may indicate that an entity is underperforming with regard to a number of IP assets filed in a particular IP art unit. Additionally, and/or alternatively, a high percentile ranking (e.g., 70%, 80%, 90%) may indicate that an entity is overperforming with regard to a number of IP assets filed in a particular IP art unit.

In some examples, the predictive analytics component may make determinations and/or generate data to be displayed on the user interface. For example, a user may specify one or more target entities, one or more target publications, and/or one or more target products that the predictive analytics component may utilize to generate a predictive analytics search. In some examples, the predictive analytics component may be configured to identify one or more target entities utilizing data representing one or more target publications and/or one or more target products. The results of the predictive analytics search may include a predicted comprehensive breadth score for a pending IP asset associated with an entity. For example, the predictive analytics component may determine an examiner and/or an art unit associated with at least one pending IP asset filed or otherwise associated with the entity. In some cases, the predictive analytics component may determine a comprehensive breadth score, as discussed herein, for at least one originally filed claim of an IP asset (e.g., application) previously examined by the examiner and/or previously filed in the art unit. The predictive analytics component may then determine a comprehensive breadth score for an issued version of the originally filed claim of the application and generate an examiner metric and/or an art unit metric based at least in part on a difference between the comprehensive breadth score of the originally filed claims and the comprehensive breadth score of the issued claims. In this way, the predictive analytics component may determine an effect that a particular examiner and/or art unit may have on a comprehensive breadth score of a potentially allowable claim. For example, the predictive analytics component may determine predicted breadth score for a pending IP asset based at least in part on the examiner metric and/or the art unit metric. In some cases, the predicted breadth score may be utilized by the opportunity component to generate the opportunity metric.

In some cases, the predictive analytics component may generate a predicted issue date for a pending IP asset associated with an entity based on an average length of prosecution associated with an examiner and/or an art unit. In some cases, the predicted issue date may be utilized by the opportunity component to generate the opportunity metric.

In some examples, the precedence component may make determinations and/or generate data to be displayed on the user interface. For example, a user may specify one or more target entities, one or more target publications, and/or one or more target products that the precedence component may utilize to generate a precedence search. In some examples, the precedence component may be configured to identify one or more target entities utilizing data representing one or more target publications and/or one or more target products. The results of the precedence search may include metric data indicating a historical precedence associated with an IP asset. For example, the precedence component may identify a particular market area and/or technology area associated with an IP asset and determine a number of similar IP assets filed within the identified market area and/or technology area. In some examples, if the number of other IP assets is low, then the precedence metric associated with the IP asset may be high. Additionally, and/or alternatively, if the number of other IP assets is high, then the precedence metric associated with the IP asset may be low. Once the precedence component determines a precedence metric, the precedence metric may be provided to the opportunity component and utilized to generate the opportunity metric.

In some examples, the exposure component may include various sub-component, such as, a litigation campaign component and/or an alignment to exposure component. In some examples, the exposure component may utilize the one or more sub-components to make determinations and/or generate data to be displayed on the user interface. For example, each of the sub-components may generate a metric to be utilized by the exposure component to generate an exposure metric. In some examples, the exposure metric may be generated for an IP asset portfolio of an entity accessing the IP landscaping platform, a sub-set of the IP asset portfolio (e.g., for a particular market and/or technology), an IP asset portfolio of another entity (e.g., business competitor) associated with the entity accessing the IP landscaping platform, and/or a sub-set of the IP asset portfolio (e.g., for a particular market and/or technology) of the other entity. The exposure metric may indicate a potential exposure and/or risk (e.g. potential risk of litigation) associated with a market area and/or technology area associated with the IP asset portfolio and/or a subset of the IP asset portfolio. In some examples, the exposure component may identify the levels of exposure associated with the result sets and/or IP assists associated with an entity, and may aggregate the data indicating the levels of exposure associated with the result sets and/or IP asset to determine an overall level of exposure for an entity. In some examples, the exposure assessment component may be utilized in combination with any of the components described above. Additionally, or alternatively, the exposure component may make determinations and/or generate data to be displayed on the user interface.

In some examples, the litigation campaign component may make determinations and/or generate data to be displayed on the user interface. For example, a user may specify one or more target entities, one or more target publications, and/or one or more target products that the litigation campaign component may utilize to generate a litigation campaign search. In some examples, the litigation campaign component may be configured to identify one or more target entities utilizing data representing one or more target publications and/or one or more target products. The results of the litigation campaign search may include data indicating a potential likelihood of litigation associated with a particular market area and/or technology area. For example, the litigation campaign component may identify a litigation campaign associated with a market area and/or technology area by determining that an entity has filed at least two cases associated with the market area and/or technology area within the same calendar year. Once the litigation campaign component determines that the at least two cases are part of a litigation campaign directed towards a particular market area and/or technology area, the litigation campaign component may determine a period of time since the most recent filing of a case included in the litigation campaign, a number of defendants associated with the litigation campaign, and/or a non-practicing entity (NPE) status of the litigation campaign (e.g., whether the entity associated with the litigation campaign is an NPE or a practicing entity). In some examples, the litigation campaign component may obtain litigation data (e.g., defendant information, plaintiff information, case filing information, etc.) from a third party resource and may store the data in the database. In some cases, the data generated by the litigation campaign component may be provided to the exposure component and utilized to generate an exposure metric.

In some examples, the alignment to exposure component may make determinations and/or generate data to be displayed on the user interface. For example, a user may specify one or more target entities, one or more target publications, and/or one or more target products that the alignment to exposure component may utilize to generate an alignment to exposure search. In some examples, the alignment to exposure component may be configured to identify one or more target entities utilizing data representing one or more target publications and/or one or more target products. The results of the alignment to exposure search may include metric data indicating a potential exposure metric associate with a group of IP assets associated with an entity with regard to potential litigation. For example, the alignment to exposure component may determine a market area and/or technology area associated with a group of IP assets filed and/or otherwise associated with an entity, such as an entity utilizing the IP landscaping platform. The alignment to exposure component may then identifying a litigation history (e.g., past litigation and current litigation) associated with the technology area and/or market area. In some cases, if there is a large amount of litigation associated with the market area and/or technology area, the alignment to exposure component may determine that the group of IP assets are at a greater risk of litigation. Additionally, and/or alternatively, if there is a small amount of litigation associated with the market area and/or technology area, the alignment to exposure component may determine that the group of IP assets are at a lesser risk of litigation. In some cases, the data generated by the alignment to exposure component may be provided to the exposure component and utilized to generate an exposure metric.

In some examples, the scoring component may utilize the coverage component, the opportunity component, the exposure component, and the respective metrics associated with each component to generate an overall score for a group of IP assets associated with an entity. The overall score may indicate i) an overall coverage and/or identify gaps in coverage; ii) a potential market opportunity; and/or iii) a potential exposure associated with the IP assets. included in the targeted technical fields, subject matters, and/or competitor entities portfolios.

In some examples, the scoring component may be configured to receive data representing a seeded search query and may perform a search operation in a number of ways and provide data and/or metrics to the various other components and sub-components discussed herein. A seeded search query may include one or more instances of target data as described in more detail below. In some examples, the seeded search query may indicate an identification of one or more target entities. Additionally, or alternatively, the seeded search query may indicate an identification of one or more target publications, such as, for example, an IP asset. Additionally, or alternatively, the seeded search query may indicate an identification of one or more target products and/or services. In some examples, the IP landscaping platform may be configured to receive additional data associated with the seeded search query. For example, the scoring component may be configured to receive additional data via one or more actionable elements included on a graphical user interface (GUI) presented on a computing device and accessible to a user account. Additionally, or alternatively, the scoring component may be configured to utilize the data representing a seeded search query to make various identifications and determinations associated with IP assets and/or entities, among other things.

In some examples, the seeded search query may indicate the identification of the one or more target entities, and the scoring component may utilize the data to identify IP assets that are associated with the target entity. In some examples, the scoring component may access one or more database(s) including a listing of all of the available IP assets associated with the target entity (e.g., an IP asset portfolio). Additionally, or alternatively, the scoring component may generate a result set including IP assets having an assignee associated with the entity.

Additionally, or alternatively, the seeded search query may indicate the identification of the one or more target publications may utilize the data representing the seeded search query to identify IP assets (or IP asset portfolios) that are determined to be similar to the target publication. The scoring component may identify similar IP assets using various techniques. For example, the scoring component may generate a vector representation of the target publication and use the vector representation to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for an IP landscaping platform architecture. The architecture 100 may include, for example, one or more user devices 102(*a*)-(*c*), also described herein as electronic devices 102(*a*)-(*c*), and/or a remote computing resources 104 associated with a vendor management platform. Some or all of the devices and systems may be configured to communicate with each other via a network 106.

The electronic devices 102 may include components such as, for example, one or more processors 108, one or more network interfaces 110, and/or computer-readable media 112. The computer-readable media 112 may include components such as, for example, one or more user interfaces 114. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative and should not be considered the exclusive example of the components of the electronic device 102.

By way of example, the user interface(s) 114 may include one or more of the user interfaces described elsewhere herein, such as the user interfaces described with respect to FIGS. 3-11, corresponding to a projects user interface, a similar publication user interface, a clustering results user interface, and/or a cluster board user interface, etc. It should be understood that while the user interface(s) 114 are depicted as being a component of the computer-readable media 112 of the electronic devices 102(*a*)-(*c*), the user interface(s) 114 may additionally or alternatively be associated with the remote computing resources 104. The user interface(s) 114 may be configured to display information associated with the IP landscaping platform and to receive user input associated with the IP landscaping platform.

The remote computing resources 104 may include one or more components such as, for example, one or more processors 116, one or more network interfaces 118, and/or computer-readable media 120. The computer-readable media 120 may include one or more components, such as, for example, a landscaping component 122, an scoring component 124, and/or one or more data store(s) 126. The landscaping component 122 may be configured to receive user input data as described herein for indicating target data representing at least one of an entity, publication, and/or product utilized to generate seeded search queries that utilize the target data to determine a representative entity and return results including one or more entities that have IP assets that are determined to be similar to the IP assets of the representative entity. The landscaping component 122 may also be configured to generate vector representations of the entities and/or IP assets such that the landscaping component 122 may rank the results from the search query by utilizing vector representations. The landscaping component 122 may also be configured to utilize the vector representations of the entities to generate result sets including clusters of selected entities associated with technical fields, products or technologies of interest, etc. The landscaping component 122 may also be configured to generate an interactive graphical element, that may be configured to respond to various user inputs representing manipulations to the interactive graphical element, for presenting a spatial representation of the one or more clusters included in a selected result set.

The scoring component 124 may be configured to communicate with the landscaping component 122 to receive user input data as described herein for indicating target data representing at least one of an entity, publication, and/or product utilized to generate seeded search queries that utilize the target data to determine a representative entity and return results including IP assets associated with the representative entity and/or one or more entities that have IP assets that are determined to be similar to the IP assets of the representative entity. The scoring component 124 may be configured to communicate with the landscaping component 122 to generate vector representations of the entities and/or IP assets such that the scoring component 124 may rank and/or otherwise analyze the results from the search query by utilizing vector representations. The scoring component 124 may also be configured to utilize the vector representations of the entities and/or the IP assets associated with the entities to generate result sets including comprehensive breadth scores, revenue alignment metrics, IP asset filing metrics, and/or litigation campaign metrics associated with the technical fields, products or technologies of interest, IP assets associated with particular market areas and/or technical areas, etc. The scoring component 124 may also be configured to generate an interactive graphical element, that may be configured to respond to various user inputs representing manipulations to the interactive graphical element, for presenting a spatial representation of the one or more metrics included in a selected result set.

The data store(s) 126 of the remote computing resources 104 may include data corresponding to user accounts, user projects, historical data, and/or intellectual-property assets The user projects may include, for example, seeded search queries, similar entity and/or publication results, clustering results, and/or the spatial representation of the clustering results. The user projects may be stored with respect to the user account of the data store 126. The IP assets may be stored with respect to an IP asset library of the data store 126.

As shown in FIGS. 2A and 2B, several of the components of the remote computing resources 104 and/or the electronic devices 102 and the associated functionality of those components as described herein may be performed by one or more of the other systems and/or by the electronic devices 102. Additionally, or alternatively, some or all of the components and/or functionalities associated with the electronic devices 102 may be performed by the remote computing resource(s) 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 108 and/or 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 116 may possess its own local memory, which also may store program components, program data, and/or one or more operating systems.

The computer-readable media 112 and/or 120 may include volatile and nonvolatile memory, removable and non-removable media implemented in any method or technology for storage of information, such as computer-readable instructions, data structures, program component, or other data. Such computer-readable media 112 and/or 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 112 and/or 120 may be implemented as computer-readable storage media ("CRSM"), which may be any available physical media accessible by the processor(s) 108 and/or 116 to execute instructions stored on the computer-readable media 112 and/or 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 112 and/or 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or 118 may enable messages between the components and/or devices shown in system 100 and/or with one or more other remote systems, as well as other networked devices. Such network interface(s) 110 and/or 118 may include one or more network interface controllers (NICs) or other types of transceiver devices to send and receive messages over the network 106.

For instance, each of the network interface(s) 110 and/or 118 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or 118 may include a wide area network (WAN) component to enable message over a wide area network.

In some instances, the remote computing resources 104 may be local to an environment associated with the electronic device(s) 102. For instance, the remote computing resources 104 may be located within the electronic device(s) 102. In some instances, some or all of the functionality of the remote computing resources 104 may be performed by the electronic device(s) 102. Also, while various components of the remote computing resources 104 have been labeled and named in this disclosure and each component has been described as being configured to cause the processor(s) 108 and/or 116 to perform certain operations, it should be understood that the described operations may be performed by some or all of the components and/or other components not specifically illustrated.

FIG. 2A illustrates a component diagram of example components 200 of a remote computing resource 104 for the IP landscaping platform. The remote computing resource 104 may include one or more components such as, for example, one or more processor(s) 116, one or more network interfaces 118, and/or computer-readable media 120. The computer-readable media may include one or more components, such as, for example, a landscaping component 122, an scoring component 124, and/or one or more data stores 126 (illustrated at FIG. 2B). Some or all of the components and functionalities may be configured to communicate with each other.

As mentioned with respect to FIG. 1, the landscaping component 122 may be configured to receive user input data as described herein for indicating target data representing at least one of an entity, publication, and/or product utilized to generate seeded search queries that utilize the target data to determine a representative entity and return results including one or more entities that have IP assets that are determined to be similar to the IP assets of the representative entity. The landscaping component 122 may also be configured to generate vector representations of the entities and/or IP assets such that the landscaping component 122 may rank the results from the search query by utilizing vector representations. The landscaping component 122 may also be configured to utilize the vector representations of the entities to generate result sets including clusters of selected entities associated with technical fields, products or technologies of interest, etc. The landscaping component 122 may also be configured to generate an interactive graphical element, that may be configured to respond to various user inputs representing manipulations to the interactive graphical element, for presenting a spatial representation of the one or more clusters included in a selected result set. The landscaping component 122 may include one or more components, such as, for example, a seeding component 212, a user interface generation component, 214, and/or a clustering component 216. Additionally, or alternatively, the landscaping component 122 may be configured to perform the operations described below with respect to the one or more components.

The seeding component 212 may include one or more components, such as, for example, a similarity component 218, a vector component 220, and/or a ranking component 222. The seeding component 212 may be configured to generate seeded search queries using user specified targeted data. For example, a user may specify a target entity, a target publication and/or a target product that the seeding component 212 may utilize to generate a seeded search. In some examples, the seeding component 212 may be configured to identify a target entity utilizing data representing a target publication and/or a target product. The results of the seeded search may include a listing of entities having IP assets that the similarity component 218 has determined to include similarities to the targeted data. Additionally, or alternatively, the seeding component 212 may be configured to perform the operations described below with respect to the one or more components.

The similarity component 218 may be configured to identify similarities between separate data. For example, given a target entity and/or target entities having IP assets (e.g., an IP asset portfolio), the similarity component may be configured to identify one or more additional entities having IP assets (e.g., an IP asset portfolio) that are similar to the IP assets of the target entity. In some examples, the similarity component 218 may be configured to identify an entity having an IP asset portfolio that is similar to an additional IP asset portfolio of an additional entity. In some examples, the similarity component 218 may compare words included in a text portion of IP assets to determine if two separate IP assets are similar to one another. Additionally, or alternatively, the similarity component 218 may utilize any other word matching and/or document comparison techniques to determine if two separate IP assets are similar. Additionally, or alternatively, the similarity component 218 may utilize vector representations of publications and/or entities to determine if two separate IP assets and/or entities are similar to one another.

The vector component 220 may be configured to generate vector representations of publications and/or entities. For example, the vector component 220 may be configured to generate a vector representation of a publication that may be used to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents. Additionally, or alternatively, the vector component 220 may be configured to utilize the vector representations of the IP assets that are associated with an entity, such as, for example, a target entity and/or one or more additional entities, to generate a vector representation of an entity. Techniques to generate vectors representing entities may include various vectorization techniques utilized to generate the vectors representing IP assets, and may aggregate the data to generate a vector representing the entity associated with the IP assets.

The ranking component 222 may be configured to rank results of a seeded search that may include a listing of entities having IP assets that the similarity component 218 has determined to include similarities to the targeted data. For example, the ranking component 222 may compare the vector representations generated by the vector component 220 to determine which entities are most similar to a target entity and rank the entities accordingly. Additionally, or alternatively, the ranking component 222 may be in communication with the user interface generation component 214 and may cause the GUI to display results of a seeded search in according to a ranked manner determined by the ranking component 222.

The user interface generation component 214 may be configured to generate user interface element(s), window(s), page(s), and/or view(s) described below with respect to FIGS. 3-11 using data received from other components utilized by the IP landscaping platform. In some examples, the user interface generation component 214 may be communicatively coupled to the other components stored thereon the computer-readable media 120. In some examples, the user interface generation component 214 may generate user interfaces configured to present information associated with user account data 202, project data 204, and/or saved results 224. Additionally, or alternatively, the user interface generation component 214 may generate user interfaces including confidential information and may be configured to be accessible by only users with predetermined qualifications. For example, the user interface generation component 214 may cause only a portion of information to be displayed based on the type of account that is accessing the platform. For example, when a user accesses the system, the user interface generation component 214 may determine that the account type of the account that the user has utilized to access the system may be one of, for example, an internal user and/or an external user, and may only include a portion of the information to be displayed that is associated with that account type. In some examples, the user interface generation component 214 may generate notifications to send to the user accounts.

The clustering component 216 may be configured to generate result sets including one or more clusters of IP assets. In some examples, the clustering component 216 may generate multiple result sets including any number of clusters from 1-N, where Nis any integer larger than 1. In some examples, the result sets may be associated with varying levels of granularity. For example, a result set having 2 clusters may be less granular than a result set having 20 clusters. In some examples, the clustering component 216 may generate result sets using a vector form described above, such as, for example, the embedding. As mentioned above, the embedding may be used to calculate distance, and therefore similarity, between documents. The clustering component 216 may also utilize the embeddings to create thematic groups of documents. The thematic groups may be determined utilizing a set of keywords determined following analysis of a text portion of the IP assets, and the result may be a visual display of document groups (e.g., the clusters) that share similar themes. There may be a degree of supervision in the clustering process that may allow for some human control over which documents are grouped in which clusters. Each result set may include an indication of the number of clusters included in the result set. In some examples, each of clusters may include an indication of the number of IP assets included in the respective cluster and/or the keywords associated with the respective cluster. The clusters need not include all of the IP assets associated with the one or more selected entities, as some of the IP assets may be determined to be outliers and/or not associated with a cluster and/or result set.

In some examples, as mentioned above, the result sets generated by the clustering component 216 may be associated with varying levels of granularity. In some examples, the varying levels of granularity may be achieved by utilizing various cluster specific techniques to assign IP assets into clusters, as described with more detail below. In some examples, hard clustering assignments may be made on IP assets where the cluster assignment by the system is uncertain. Additionally, or alternatively, IP assets that have an uncertain cluster assignment may be grouped with other IP assets that have an uncertain cluster assignment. Additionally, or alternatively, for each IP asset, its probability of belonging to every cluster may be calculated. In some examples, a vector may be generated representing the probabilities of its membership to every cluster. In some examples, this process may be repeated until the IP asset reaches a threshold probability of belonging to at least one of the clusters. Additionally, or alternatively, the IP asset may be assigned to a cluster in which the IP asset has the highest probability of belonging to. Additionally, or alternatively, an IP asset not belonging to a cluster may include very low probabilities of belonging to each of the clusters, and may be identified as a singleton IP asset, and/or may be identified as a novel IP asset among the IP assets included in the clusters. Additionally, or alternatively, user input may be provided to guide the assignment of an IP asset into a cluster grouping. In some examples, one or more models that are associated with the result sets may be saved in association with a user account such that the saved models may be applied later to new IP assets considered for cluster assignment.

The landscaping component 122 may also be configured to receive input data representing user input indicating an identification of a target entity. In some examples, the landscaping component 122 may also be configured to identify one or more IP assets 206 that are associated with a target entity. For example, the landscaping component 122 may be configured to identify IP assets 206 in the IP asset library 210 that are associated with a target entity. Additionally, or alternatively, the landscaping component 122 may also be configured to receive input data representing user input indicating an identification of a target publication, such as, for example, a target IP asset 206. In some examples, the landscaping component 122 may be configured to identify the target entity based on the target publication. In some examples, the landscaping component 122 and/or similarity component 218 may be configured to identify one or more entities having IP assets that are similar to a target publication as a target entity. For example, the landscaping component 122 may determine that the target entity has a number of IP assets that satisfy a threshold number of IP assets. Additionally, or alternatively, the landscaping component 122 and/or similarity component 218 may be configured to identify one or more entities having a set of IP assets that are similar to a set of IP assets associated with one or more additional entities, as a target entity. For example, the landscaping component 122 may be configured to compare a first IP asset portfolio of a first entity with a second IP asset portfolio of a second entity, and/or additional IP asset portfolios of additional entities. Additionally, or alternatively, the landscaping component 122 may be configured to determine that the target entity has a number of IP assets that is determined to be more favorable than a number of IP assets that are associated with additional entities. Additionally, or alternatively, the landscaping component 122 may also be configured to receive input data representing user input indicating an identification of a target product and/or service. In some examples, the landscaping component 122 may be configured to identify a technical categorization of the target product and may identify one or more entities having IP assets that are associated with the technological categorization of the target product as a target entity. Additionally, or alternatively, the landscaping component 122 may identify the target entity using any of the techniques described above.

The landscaping component 122 may also be configured to identify IP assets that are determined to be foreign IP assets and/or design IP assets and may remove the foreign and/or design IP assets from result sets that are generated by the clustering component 216. Additionally, or alternatively, the landscaping component 122 may also be configured to determine a score associated with a result set and/or cluster of IP assets. For example, the landscaping component 122 may generate a first score for a first result set of IP assets based on comparing the keywords associated with the first result set to keywords associated with additional result sets.

As mentioned above with respect to FIG. 1, the scoring component 124 may be configured to communicate with the landscaping component 122 to receive user input data as described herein for indicating target data representing at least one of an entity, publication, and/or product utilized to generate seeded search queries that utilize the target data to determine a representative entity and return results including one or more IP assets associated with the representative entity, one or more entities that have IP assets that are determined to be similar to the IP assets of the representative entity, market area and/or technology areas associated with the IP assets of the representative entity, revenue data associated with the market area and/or technology areas of the representative entity, revenue data associated with one or more entities that have IP assets that are determined to be similar to the IP assets of the representative entity, and/or litigation data associated with market area and/or technology areas associated with the IP assets of the representative entity. The scoring component 124 may also be configured to communicate with the landscaping component 122 to generate vector representations of the entities and/or IP assets such that the scoring component 124 may rank the results from the search query by utilizing vector representations. The scoring component 124 may also be configured to communicate with the landscaping component 122 to utilize the vector representations of the entities to generate result sets including metrics of selected entities associated with technical fields, IP assets, products or technologies of interest, etc. The scoring component 124 may also be configured to generate an interactive graphical element, that may be configured to respond to various user inputs representing manipulations to the interactive graphical element, for presenting a spatial representation of the one or more metrics included in a selected result set. The scoring component 124 may include one or more components, such as, a coverage component 228 utilized to determine an overall coverage and/or identify gaps in coverage, an opportunity component 230 utilized to determine a potential market opportunity, and an exposure component 232 utilized to determine a potential exposure associated with the IP assets. In some examples, each of the coverage component 228, the opportunity component 230, and the exposure component 232 may include one or more sub-components.

For example, the coverage component 228 may include various sub-components, such as, a geographic distribution component 234, an expiration component 236, a comprehensive breadth score component 238, a diversity component 240, a revenue alignment component 242 and/or an invalidity component 244. In some examples, the coverage component 228 may utilize the one or more sub-components to make determinations and/or generate data to be displayed on the user interface. For example, each of the sub-components may generate a metric to be utilized by the coverage component 228 to generate a coverage metric. In some cases, the opportunity component 230 may include various sub-components, such as, a filing velocity component 246, a predictive analytics component, 232 and/or a precedence component 250. In some examples, the opportunity component 230 may utilize the one or more sub-components to make determinations and/or generate data to be displayed on the user interface. For example, each of the sub-components may generate a metric to be utilized by the opportunity component 230 to generate an opportunity metric. In some examples, the exposure component 232 may include various sub-component, such as, a litigation component 252 and/or an alignment to exposure component 254. In some examples, the exposure component 232 may utilize the one or more sub-components to make determinations and/or generate data to be displayed on the user interface. For example, each of the sub-components may generate a metric to be utilized by the exposure component 232 to generate an exposure metric. Additionally, or alternatively, the scoring component 124 may be configured to perform the operations described below with respect to the one or more components.

In some examples, the geographic distribution component 234 may make determinations and/or generate data to be displayed on the user interface. For example, a user may specify one or more target entities, one or more target publications, and/or one or more target products that the geographic distribution component 234 may utilize to generate a geographic distribution search. In some examples, the geographic distribution component 234 may be configured to identify one or more target entities utilizing data representing one or more target publications and/or one or more target products. The results of the geographic distribution search may include an identification of which countries and/or regions that individual IP assets of an IP asset portfolio are filed. In some examples, the geographic distribution component 234 may determine which countries and/or regions the IP assets of the IP asset portfolio are filed for a given entity, market, and/or technology area. In some cases, the geographic distribution component 234 may determine a metric based at least in part on which countries the IP assets are filed. For example, the geographic distribution component 234 may determine a gross domestic product (GDP) value associated with each country and/or region in which an entity has filed IP assets. The geographic distribution component 234 may generate a metric based on which countries and/or regions the IP assets are filed and the GDP of those respective countries and/or regions. In some cases, if a country that the IP assets are filed in have a higher GDP, the geographic distribution component 234 may generate a positive metric. Additionally, and/or alternatively, if a country that the IP assets are filed in have a lower GDP, the geographic distribution component 234 may generate a negative metric. In some examples, the metrics generated by the geographic distribution component 234 may be used by the coverage component 228 to generate a coverage metric.

In some examples, the expiration component 236 may make determinations and/or generate data to be displayed on the user interface. For example, a user may specify one or more target entities, one or more target publications, and/or one or more target products that the expiration component 236 may utilize to generate an expiration search. In some examples, the expiration component 236 may be configured to identify one or more target entities utilizing data representing one or more target publications and/or one or more target products. The results of the expiration search may include determining a number and/or a breadth score associated with individual IP assets of an asset portfolio. In some cases, the expiration component 236 may determine that a number of IP assets of an asset portfolio are about to expire and that a breadth score of these IP assets are high. In this case, the expiration component 236 may generate a negative metric to be provide to the coverage component 228. Additionally, and/or alternatively, the expiration component 236 may determine that a number of IP assets of an asset portfolio are about to expire and that a breadth score of these IP assets are low. In this case, the expiration component 236 may generate a less negative metric to be provide to the coverage component 228.

In some examples, the comprehensive breadth score component 238 may make determinations and/or generate data to be displayed on the user interface. For example, a user may specify one or more target entities, one or more target publications, and/or one or more target products that the comprehensive breadth score component 238 may utilize to generate a comprehensive breadth search. In some examples, the comprehensive breadth score component 238 may be configured to identify one or more target entities utilizing data representing one or more target publications and/or one or more target products. The results of the comprehensive breadth search may include a comprehensive breadth score for an IP asset portfolio of an entity accessing the IP analysis platform, a sub-set of the IP asset portfolio (e.g., for a particular market and/or technology), an IP asset portfolio of another entity (e.g., business competitor) associated with the entity accessing the IP analysis platform, and/or a sub-set of the IP asset portfolio (e.g., for a particular market and/or technology) of the other entity. The comprehensive breadth score for a group of IP assets (e.g., a portfolio of IP assets and/or a sub-set of the portfolio of IP assets) may be based on weighted breadth scores calculated for individual IP assets of the group of IP assets. For example, the comprehensive breadth score component 238 may receive or otherwise identify a plurality of IP assets associated with an entity and calculate, for the individual IP assets of the plurality of IP assets, a breadth score based at least in part on a word count score and a commonness score for the respective portions of text included in the individual intellectual-property assets. In some cases, the word count score may be based on a word count associated with respective portions of text and word counts associated with portions of text from at least one other IP asset of the plurality of IP assets. In some cases, the commonness score may be based on a frequency in which words within the respective portion of text are found in the portions of text from at least one other IP asset. Once the breadth score is calculated for individual IP assets of the group of IP assets, the comprehensive breadth score component 238 may calculate a weighted score for the individual IP assets based on multiplying the breadth score by a weight that is determined by the respective breadth scores for the individual IP assets. For example, the comprehensive breadth score component 238 may assign a lower weight (e.g., 1) to an IP asset determined to have a low breadth score, a medium weight (e.g., 2) to an IP asset determined to have a medium breadth score, and a higher weight (e.g., 3) to an IP asset determined to have a high breadth score. Once the weighted breadth scores are determined, the comprehensive breadth score component 238 may calculate a comprehensive score for the group of IP assets by calculating an average of the weighted scores of the individual IP assets. In some examples, the comprehensive breadth score component 238 may provide the comprehensive score for the group of IP assets to the coverage component 228 to be used in calculating a coverage metric.

In some cases, the comprehensive breadth score component 238 can calculate the comprehensive breadth score for a group of IP assets based on a market and/or technology area. In some examples, the comprehensive breadth score component 238 can calculate the comprehensive breadth score over multiple periods of time such that a visualization of how the comprehensive breadth score for a group of IP assets has changed over time can be depicted. In some cases, the comprehensive breadth score for a group of IP assets may have changed due to a new IP asset that has been filed, a new IP asset that has granted, an IP asset that has expired, and an IP asset that has been abandoned and/or a breadth score for an IP asset that has changed.

In some examples, the diversity component 240 may make determinations and/or generate data to be displayed on the user interface. For example, a user may specify one or more target entities, one or more target publications, and/or one or more target products that the diversity component 240 may utilize to generate a diversity search. In some examples, the diversity component 240 may be configured to identify one or more target entities utilizing data representing one or more target publications and/or one or more target products. The results of the diversity search may include a metric indicating how diversified a group of IP assets are over a given market and/or technology area.

In some examples, the revenue alignment component 242 may make determinations and/or generate data to be displayed on the user interface. For example, a user may specify one or more target entities, one or more target publications, and/or one or more target products that the revenue alignment component 242 may utilize to generate a revenue alignment search. In some examples, the revenue alignment component 242 may be configured to identify one or more target entities utilizing data representing one or more target publications and/or one or more target products. The results of the revenue alignment search may include a metric indicating how a group of IP assets associated with an entity and with a given market and/or technology area aligns with the revenue generated by that market and/or technology area for the entity. For example, the revenue alignment component 242 may identify one or more market areas and/or technology areas associated with an entity accessing the IP analysis platform. The revenue alignment component 242 may identify revenue streams of the entity that are associate with the one or more market areas and/or one or more technology areas and identify a number of IP assets that are associated with the entity as well as the one or more technology areas. In some cases, the revenue alignment component 242 may determine a percentage of revenue generated in a market area and/or technology area of a total amount of revenue generated by the entity and may determine a percentage of IP assets directed to the one or more market areas and/or one or more technology areas from among a group of IP assets filed by the entity. The revenue alignment component 242 may then generate an alignment metric based at least in part on the number of the IP assets associated with the one or more market areas and/or one or more technology areas and the one or more revenue streams associated with the one or more market areas and/or one or more technology areas. In some examples, the revenue alignment component 242 may identify the market and/or technology areas by accessing a taxonomy of market sets and/or a taxonomy of technology areas provided by a third-party resource and/or stored on the database. In this way, the revenue alignment component 242 may illustrate if an entity is revenue heavy (e.g., greater percentage of revenue generated than percentage of IP assets filed) or is more IP asset heavy (e.g., greater percentage of IP assets filed than percentage of revenue generated) for individual market areas and/or technology areas.

In some cases, the revenue alignment component 242 may also generate a metric illustrating a revenue alignment for multiple other entities. For example, the revenue alignment component 242 may determine a percentage of revenue generated in a market area and/or technology area of a total amount of revenue generated by a group of entities and may determine a percentage of IP assets directed to the one or more market areas and/or one or more technology areas from among a group of IP assets filed by the group of entities. In this way, the revenue alignment component 242 may illustrate a comparison of a revenue alignment metric associated with the entity to a revenue alignment metric associated with multiple other entities generating revenue and filing IP assets in an individual market area and/or technology area.

In some examples, the invalidity component 244 may make determinations and/or generate data to be displayed on the user interface. For example, a user may specify one or more target entities, one or more target publications, and/or one or more target products that the invalidity component 244 may utilize to generate a geographic distribution search. In some examples, the invalidity component 244 may be configured to identify one or more target entities utilizing data representing one or more target publications and/or one or more target products. The results of the invalidity search may include citation data associated with a group of IP assets and/or individual IP assets associated with an entity accessing the IP analysis platform. In some cases, the invalidity component 244 may generate an invalidity metric indicating a likelihood that an IP asset may be considered to be invalid if it were to be challenged in a court of law. In some cases, the invalidity component 244 may generate the invalidity metric based on a density of other IP assets cited during prosecution of the IP asset, a density of other IP assets in which the IP asset was cited during prosecution, and/or litigation data associated with the other IP assets (e.g., result of invalidity challenges of the other IP assets). In some cases, the invalidity metric may be utilized by other component and/or sub-components to impact other metrics, such as the comprehensive breadth score metric.

In some cases, the coverage component 228 may utilize (e.g., aggregate) any metric generated by the various sub-components to generate a coverage metric associated with a group of IP assets associated with an entity and/or other entities. In some cases, other determinations may affect the coverage metric, such as, legal status of an IP asset (e.g., ownership of the IP asset), how a breadth scope of claims change during prosecution of an IP asset, etc.

In some examples, the filing velocity component 246 may make determinations and/or generate data to be displayed on the user interface. For example, a user may specify one or more target entities, one or more target publications, and/or one or more target products that the filing velocity component 246 may utilize to generate a filing velocity search. In some examples, the filing velocity component 246 may be configured to identify one or more target entities utilizing data representing one or more target publications and/or one or more target products. The results of the filing velocity search may include a filing velocity metric indicating a percentile rank of an entity for filing of IP assets in a given market area and/or technology area. For example, the filing velocity component 246 may identify a total amount of IP assets filed that are directed towards or otherwise associated with a given market area and/or technology area for a period of time (e.g., a year, five years, ten years, etc.) The filing velocity component 246 may then identify a number of IP assets filed by individual entities, such as an entity accessing the IP analysis platform and associated entity competitors, during that time period directed towards or otherwise associated with the market area and/or the technology area. In some examples, the filing velocity component 246 may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component 230 to generate an opportunity metric. For example, a low percentile ranking (e.g., 10%, 20%, 30%) may indicate that an entity is underperforming with regard to a number of IP assets filed in a particular market area and/or technology area. Additionally, and/or alternatively, a high percentile ranking (e.g., 70%, 80%, 90%) may indicate that an entity is overperforming with regard to a number of IP assets filed in a particular market area and/or technology area. In some examples, the filing velocity component 246 may determine a threshold percentile (e.g., 50%) in which the filing velocity component 246 may compare the percentile ranking of the entity (e.g., based on the number of IP assets filed by the entity) to in order to determine how the percentile ranking may affect the opportunity metric. For example, a percentile ranking of the entity being below the threshold percentile may indicate that an entity is underperforming with regard to a number of IP assets filed in a particular market area and/or technology area. Additionally, and/or alternatively, a percentile ranking of the entity being above the threshold percentile may indicate that an entity is overperforming with regard to a number of IP assets filed in a particular market area and/or technology area.

In some examples, the filing velocity component 246 may identify a total amount of IP assets filed that are directed towards or otherwise associated with an IP art unit for a period of time (e.g., a year, five years, ten years, etc.) The filing velocity component 246 may then identify a number of IP assets filed by individual entities, such as an entity accessing the IP analysis platform and associated entity competitors, during that time period directed towards or otherwise associated with the IP art unit. In some examples, the filing velocity component 246 may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component 230 to generate an opportunity metric. For example, a low percentile ranking (e.g., 10%, 20%, 30%) may indicate that an entity is underperforming with regard to a number of IP assets filed in a particular IP art unit. Additionally, and/or alternatively, a high percentile ranking (e.g., 70%, 80%, 90%) may indicate that an entity is overperforming with regard to a number of IP assets filed in a particular IP art unit.

In some examples, the predictive analytics component 248 may make determinations and/or generate data to be displayed on the user interface. For example, a user may specify one or more target entities, one or more target publications, and/or one or more target products that the predictive analytics component 248 may utilize to generate a predictive analytics search. In some examples, the predictive analytics component 248 may be configured to identify one or more target entities utilizing data representing one or more target publications and/or one or more target products. The results of the predictive analytics search may include a predicted comprehensive breadth score for a pending IP asset associated with an entity. For example, the predictive analytics component 248 may determine an examiner and/or an art unit associated with at least one pending IP asset filed or otherwise associated with the entity. In some cases, the predictive analytics component 248 may determine a comprehensive breadth score, as discussed herein, for at least one originally filed claim of an IP asset (e.g., application) previously examined by the examiner and/or previously filed in the art unit. The predictive analytics component 248 may then determine a comprehensive breadth score for an issued version of the originally filed claim of the application and generate an examiner metric and/or an art unit metric based at least in part on a difference between the comprehensive breadth score of the originally filed claims and the comprehensive breadth score of the issued claims. In this way, the predictive analytics component 248 may determine an effect that a particular examiner and/or art unit may have on a comprehensive breadth score of a potentially allowable claim. For example, the predictive analytics component 248 may determine predicted breadth score for a pending IP asset based at least in part on the examiner metric and/or the art unit metric. In some cases, the predicted breadth score may be utilized by the opportunity component 230 to generate the opportunity metric.

In some cases, the predictive analytics component 248 may generate a predicted issue date for a pending IP asset associated with an entity based on an average length of prosecution associated with an examiner and/or an art unit. In some cases, the predicted issue date may be utilized by the opportunity component 230 to generate the opportunity metric.

In some examples, the precedence component 250 may make determinations and/or generate data to be displayed on the user interface. For example, a user may specify one or more target entities, one or more target publications, and/or one or more target products that the precedence component 250 may utilize to generate a precedence search. In some examples, the precedence component 250 may be configured to identify one or more target entities utilizing data representing one or more target publications and/or one or more target products. The results of the precedence search may include metric data indicating a historical precedence associated with an IP asset. For example, the precedence component 250 may identify a particular market area and/or technology area associated with an IP asset and determine a number of similar IP assets filed within the identified market area and/or technology area. In some examples, if the number of other IP assets is low, then the precedence metric associated with the IP asset may be high. Additionally, and/or alternatively, if the number of other IP assets is high, then the precedence metric associated with the IP asset may be low. Once the precedence component 250 determines a precedence metric, the precedence metric may be provided to the opportunity component 230 and utilized to generate the opportunity metric.

In some cases, the opportunity component 230 may utilize (e.g., aggregate) any metric generated by the various subcomponents to generate an opportunity metric associated with a group of IP assets associated with an entity and/or other entities.

In some examples, the litigation component 252 may make determinations and/or generate data to be displayed on the user interface. For example, a user may specify one or more target entities, one or more target publications, and/or one or more target products that the litigation component 252 may utilize to generate a litigation campaign search. In some examples, the litigation component 252 may be configured to identify one or more target entities utilizing data representing one or more target publications and/or one or more target products. The results of the litigation campaign search may include data indicating a potential likelihood of litigation associated with a particular market area and/or technology area. For example, the litigation component 252 may identify a litigation campaign associated with a market area and/or technology area by determining that an entity has filed at least two cases associated with the market area and/or technology area within the same calendar year. Once the litigation component 252 determines that the at least two cases are part of a litigation campaign directed towards a particular market area and/or technology area, the litigation component 252 may determine a period of time since the most recent filing of a case included in the litigation campaign, a number of defendants associated with the litigation campaign, and/or a non-practicing entity (NPE) status of the litigation campaign (e.g., whether the entity associated with the litigation campaign is an NPE or a practicing entity). In some examples, the litigation component 252 may obtain litigation data (e.g., defendant information, plaintiff information, case filing information, etc.) from a third party resource and may store the data in the database. In some cases, the data generated by the litigation component 252 may be provided to the exposure component 232 and utilized to generate an exposure metric.

In some examples, the alignment to exposure component 254 may make determinations and/or generate data to be displayed on the user interface. For example, a user may specify one or more target entities, one or more target publications, and/or one or more target products that the alignment to exposure component 254 may utilize to generate an alignment to exposure search. In some examples, the alignment to exposure component 254 may be configured to identify one or more target entities utilizing data representing one or more target publications and/or one or more target products. The results of the alignment to exposure search may include metric data indicating a potential exposure metric associate with a group of IP assets associated with an entity with regard to potential litigation. For example, the alignment to exposure component 254 may determine a market area and/or technology area associated with a group of IP assets filed and/or otherwise associated with an entity, such as an entity utilizing the IP analysis platform. The alignment to exposure component 254 may then identifying a litigation history (e.g., past litigation and current litigation) associated with the technology area and/or market area. In some cases, if there is a large amount of litigation associated with the market area and/or technology area, the alignment to exposure component 254 may determine that the group of IP assets are at a greater risk of litigation. Additionally, and/or alternatively, if there is a small amount of litigation associated with the market area and/or technology area, the alignment to exposure component 254 may determine that the group of IP assets are at a lesser risk of litigation. In some cases, the data generated by the alignment to exposure component 254 may be provided to the exposure component 232 and utilized to generate an exposure metric.

In some examples, the scoring component 124 may utilize data received from and/or metrics generated by the coverage component 228, the opportunity component 230, the exposure component 232, and the respective metrics associated with each component to generate an overall score for a group of IP assets associated with an entity. The overall score may indicate i) an overall coverage and/or identify gaps in coverage; ii) a potential market opportunity; and/or iii) a potential exposure associated with the IP assets. included in the targeted technical fields, subject matters, and/or competitor entities portfolios.

In some examples, the scoring component 124 may be configured to receive data representing a seeded search query and may perform a search operation in a number of ways and provide data and/or metrics to the various other components and sub-components discussed herein. A seeded search query may include one or more instances of target data. In some examples, the seeded search query may indicate an identification of one or more target entities. Additionally, or alternatively, the seeded search query may indicate an identification of one or more target publications, such as, for example, an IP asset. Additionally, or alternatively, the seeded search query may indicate an identification of one or more target products and/or services. In some examples, the IP analysis platform may be configured to receive additional data associated with the seeded search query. For example, the scoring component 124 may be configured to receive additional data via one or more actionable elements included on a graphical user interface (GUI) presented on a computing device and accessible to a user account. Additionally, or alternatively, the scoring component 124 may be configured to utilize the data representing a seeded search query to make various identifications and determinations associated with IP assets and/or entities, among other things.

In some cases, a machine learning (ML) component 256 may be configured to train one or more ML model(s) using machine-learning mechanisms. For example, a machine-learning mechanism can analyze historical data 208, market data 226, and/or any other type of data stored or otherwise accessible by the data store 126, associated with one or more entities, technology spaces, and/or markets, configured as training data to train a data model that creates an output, which can be a recommendation, a score, a respective probability, a threshold probability, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in the data store(s) 126 associated with remote computing resources 104 for use at a time after the data models have been trained (e.g., at runtime). Additionally, or alternatively, in at least one example, the machine-learning mechanisms may include an extreme gradient boosting (XGBoost) ML algorithm, a multi-layered perception ML algorithm, a random forest ML algorithm, and/or the like. In some examples, an innovation metric may be generated using at least one ML model trained by the machine learning component 256 based on company data associated with historical data 208, market data 226, and/or any other type of data stored or otherwise accessible by the data store 126, associated with one or more entities, technology spaces, and/or markets, configured as training data.

Once the ML model(s) are trained by the machine learning component 256, the ML model(s) may output an innovation metric for a given entity, technology space, and/or market. In some examples, the innovation metric may be a percentage ranging from 0% to 100%, such as with the percentile innovation metric discussed herein. Additionally and/or alternatively, the innovation metric output by the ML model(s) may include a normalized innovation metric, as discussed herein, indicating an integer value difference from a mean innovation metric from a group of innovation metrics of similar entities, technology spaces, and/or markets.

In some cases, an artificial intelligence (AI) training model component 258 may be configured to train one or more AI training model(s) using the landscaping component 122 and/or the scoring component 124. For example, third-party generative AI is a powerful tool that can assist entities explore IP asset filings. By analyzing the existing IP assets and trends in the relevant fields, generative AI can create plausible scenarios of how an entities IP asset portfolio might evolve over time. For example, generative AI tools can identify trends in IP asset filing strategies and present these to a user.

In some cases, the AI training model component 258 may update generative AI models (e.g., third-party generate AI models) with a search strategy in order to improve outputs generated and/or receive by the generative AI models. For example, the AI training model component 258 may use vectorized documents (e.g., via the vector component 220) that are outside of the training data used by the AI training model and provide the vectorized documents to the generative AI model(s). This can help the models learn from new and relevant information that might not be captured by the original data. The AI training model component 258 may generate a search strategy that may use a similarity measure (e.g., via the similarity component 218), such as cosine similarity, to compare vector representations of the vectorized documents and the generative AI model's outputs. The most similar documents and/or documents having a similarity score above a predetermined threshold (e.g., 80% similar, 90% similar, etc.) can then be selected and provided to the generative AI model as additional inputs and/or feedback included with and/or within the search strategy. In this way, the AI training model component 258 can enable the generative AI model to adapt to a changing domain of documents (e.g., IP assets) and generate more accurate and diverse outputs. As IP asset filing trends are identified using the described methods, additional IP assets can be added into the model based on the vectorization and similarity methods described above. In this way, a large language model or other generative AI model can be updated with the latest IP assets without the need for retraining or fine tuning of the generative AI model.

In some cases, the AI training model component 258 may use types of documents other that IP asset documents to include in a search strategy to be provided to a generative AI model. For instance, one example type of document that might be provided to a generative AI model is a formal filing with the government regarding past and future expectations. For instance, a 10-K form filed with the Securities and Exchange Commission (SEC) by a public company might disclose additional concerns or directions for the future. A 10-K filing can contain statements such as "Acme Co. is going to continue to invest heavily in widget technology" or "Acme Co. has noticed a softening of the widget market and expects significant risk in this area in the future." An output of the IP landscaping platform may indicate (e.g., forecast) that a particular technical area is likely to be growing in the future based on the content (e.g., the indications and/or word statements) included in the 10-K filing. For example, a 10-K filing by companies that participate in the technical area may indicate that the company is more or less likely to invest in the technical area. The AI training model component 258 may include the 10-K in a search strategy to be provided to a generative AI model to augment the search performed by the generative AI model with the 10-K and IP assets, then query the AI generative model for whether IP asset filings in the technical area are likely to increase or decrease based on the language used in the 10-K filing.

In some cases, the AI training model component 258 may utilize the generative AI model to summarize a user's manipulations and view on a particular technology space. For instance, a user may review forecast trends for a technical area and provide the user input to remove a number of entities (e.g., two entities) from the space because they may not be applicable or relevant to the user, and add a number of entities (e.g., one entity) that were not originally generated in the output. The user may then select a forward looking timeframe (e.g., a 2-year forward looking timeframe) to graph likely IP asset trends. In some case, the AI training model component 258 may be configured to present a "Summarize" button or similar button, which, when selected, causes the AI training model component 258 to instruct a generative AI to write a report detailing what the user sees in the viewed graph. For instance, if there are 5 entities presented in a particular technology space, the AI may produce a narrative description similar to "Acme Co. expects that over the next two years in widget technology, that competitor's A and C will moderately increase patent filings and investment in this space, and competitor B will dramatically increase filings and investment. Competitors D and E will either maintain or decrease investment over the same two year window." By writing this narrative, the user's insights can be described in ways that can be published, emailed, or communicated, without having to explain how to read complicated graphs, or in addition to the graphs as an alternate way to explain the data. In some cases, the AI training model component 258 may instruct the generative AI model to produce power point slide shows using both the graphs and textual descriptions to automate sending the trends analysis to another user.

FIG. 2B illustrates another component diagram of example components 200 of a remote computing resource 104 for the IP landscaping platform. The remote computing resource 104 may include one or more components such as, for example, one or more processor(s) 116 (illustrated at FIG. 2A), one or more network interfaces 118 (illustrated at FIG. 2A), and/or computer-readable media 120 (illustrated at FIG. 2A). The computer-readable media may include one or more components, such as, for example, a landscaping component 122 (illustrated at FIG. 2A), an scoring component 124 (illustrated at FIG. 2A), and/or one or more data stores 126. Some or all of the components and functionalities may be configured to communicate with each other.

The data store(s) 126 may include data corresponding to user account(s) 202, project(s) 204, intellectual-property (IP) asset(s) 206(1)-(N), historical data 208, saved result(s) 224 from previous interactions the user account has made with the IP landscaping platform, and/or market data 226. The project(s) 204 may include, for example, seeded search queries, similarity results, clustering results, and/or spatial representations of clusters. The project(s) 204 may be stored with respect to the user account(s) 202. Additionally, or alternatively, the saved result(s) 224 may include, for example, seeded search queries, similarity results, clustering results, and/or spatial representations of clusters. The IP asset(s) 206(1)-(N) may be stored with respect to an IP asset library 210. In some examples, the IP asset library 210 may include data associated with IP assets and/or related to a corresponding IP asset, such as, for example, licensing data, and/or standard essential patent data. The historical data 208 may be stored with respect to the user account(s) 202 and/or independently in the data store(s) 126. In some examples, the historical data 208 may include historical data associated with an entity, a publication, an IP asset 206, and/or a user account 202. For example, the historical data 208 may include data specific to mergers and acquisitions associated with a particular entity and/or IP asset 206. The market data 226 may include market data associated with an entity, an IP asset 206, a technological area, a product and/or service, standardized market data, and/or any other non-IP related data.

FIGS. 3-11 illustrate conceptual diagrams of example user interface(s) 300-1100 that may receive user input and utilize the IP landscaping platform to perform the various operations described above with respect to FIGS. 1, 2A, and 2B and/or the various operations described below with respect to FIGS. 12-17. The user interface(s) 300-1100 may be generated by the user interface generation component 214 described with respect to FIGS. 2A and 2B above. The user interface(s) 300-1100 may be displayed on a display of an electronic device associated with a user account, such as the electronic device 102 as described with respect to FIG. 1 above. While example user interface(s) 300-1100 are shown in FIGS. 3-11, the user interface(s) 300-1100 are not intended to be construed as a limitation, and the user interface(s) 300-1100 may be configured to present any of the data described herein.

FIG. 3 illustrates an example user interface 300 configured to present data associated with a user account representing user created IP landscaping research, project(s) and/or project(s) associated with a user account. The data may be presented using a projects listing window 302. Additionally, or alternatively, the user interface 300 may include a project filter indicator 304 indicating the current projects that are being presented in the projects listing window 302 on the user interface 300. Additionally, or alternatively, the user interface 300 may include an add project element 306. The user interface 300 may be displayed on a display of an electronic device associated with a user account, such as, for example, the electronic device 102 as described with respect to FIG. 1 above.

In some examples, the projects listing window 302 may include a listing of projects associated with a client account. For example, the projects listing window 302 may include projects created by the user account, projects created by additional user accounts that are associated with the user account (i.e., user accounts associated with a similar entity), and/or pinned projects (i.e., projects that the user account has saved). In some examples, the listing of the projects may be presented using individual cells for each project. In some examples, each cell may include an indication of the name of the project, a description of the project, an indication of the user account that created the project, an indication of the date the project was created, and one or more actionable elements associated with the project. In some examples, the one or more actionable elements may include a pin project element, a copy project element, an edit project element, and/or a delete project element. Additionally, or alternatively, each cell may be actionable such that when the project is selected, the user interface may be caused to display a selected project page corresponding to the project that is selected.

In some examples, the project filter indicator 304 may be configured such that, when selected, the projects listing window 302 displays the listing of projects corresponding to the selected project filter indicator 304. For example, the "All" project filter indicator 304 may cause the projects listing window 302 to display the listing of projects including all of the projects, the "Mine" project filter indicator 304 may cause the projects listing window 302 to display the listing of projects including the projects that are created by the user, and/or the "Pinned" project filter indicator 304 may cause the projects listing window 302 to display the listing of projects including the projects that the user has pinned.

In some examples, the add project element 306 may be configured such that, when selected, the user interface presents a window configured to receive user input required to create a new project.

Figure 4:
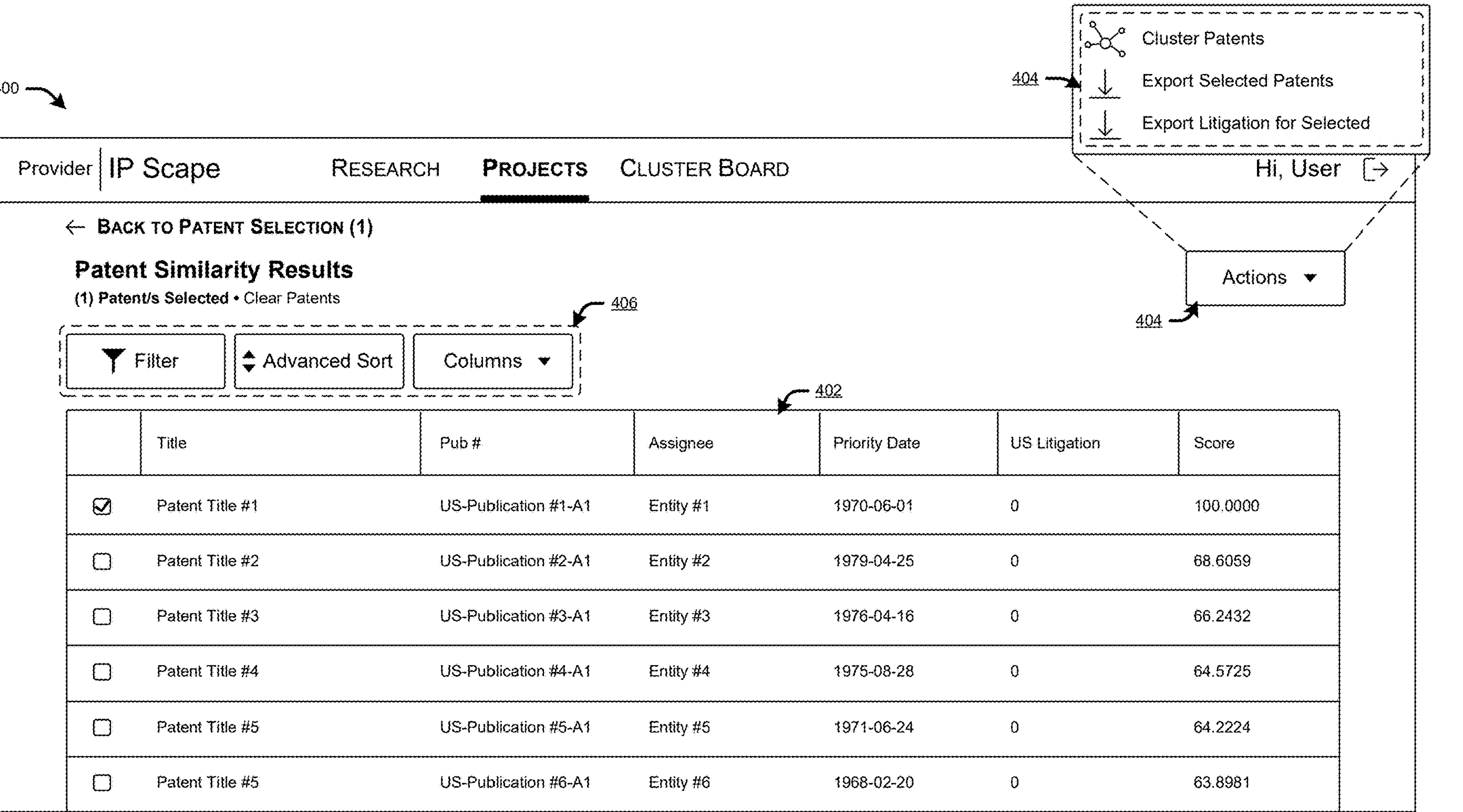
FIG. 4 illustrates an example user interface for displaying data associated with a user account representing a similar intellectual-property assets window associated with an intellectual-property landscaping project and/or research queries and/or one or more actionable elements.

FIG. 4 illustrates an example user interface 400 for displaying data associated with a user account representing selected IP asset similarity results. The data may be presented using an IP similarity results window 402, an actions element 404, and/or one or more actionable elements 406. The user interface 400 may be displayed on a display of an electronic device associated with a user account, such as, for example, the electronic device 102 as described with respect to FIG. 1 above.

In some examples, the IP similarity results window 402 may include a listing of similar publications. The listing of similar publications may be presented using individual cells for each similar publication. In some examples, each cell may include an indication of a title of the similar publication, a publication number associated with the similar publication, an indication of an entity and/or assignee associated with the similar publication, a priority date associated with the similar publication, an indication of litigation matters associated with the similar publication, a proprietary score associated with the similar publication, and/or a selection indicator.

In some examples, the actions element 404 may include one or more sub-elements, and may be configured to perform various actions in response to user input representing selection of a particular sub-element. For example, the actions element 404 may include a cluster patents sub-element, an export patents sub-element, and/or an export litigation for patents sub-element. In some examples, the cluster patents sub-element may be configured such that, when selected, the user interface is caused to present the clustering results page. Additionally, or alternatively, the export patents sub-element may be configured such that, when selected, a file may be optionally downloaded by the user representing a listing of the IP assets presented in the listing of similar publications and/or the selected IP assets included in the listing. Additionally, or alternatively, the export litigation for patents sub-element may be configured such that, when selected, a file may be optionally downloaded by the user representing litigation information associated with the IP assets presented in the listing of similar publications and/or the selected IP assets included in the listing.

In some examples, the one or more actionable elements 406 may include a filter element, a sort element, and a column sort element. In some examples, the filter element may be configured to filter the listing of similar publications. Additionally, or alternatively, the sort element may be configured to sort the listing of similar publications based upon various user selected criteria. Additionally, or alternatively, the column sort element may be configured to sort the listing of similar publications based upon a column associated with the cells.

Figure 5:
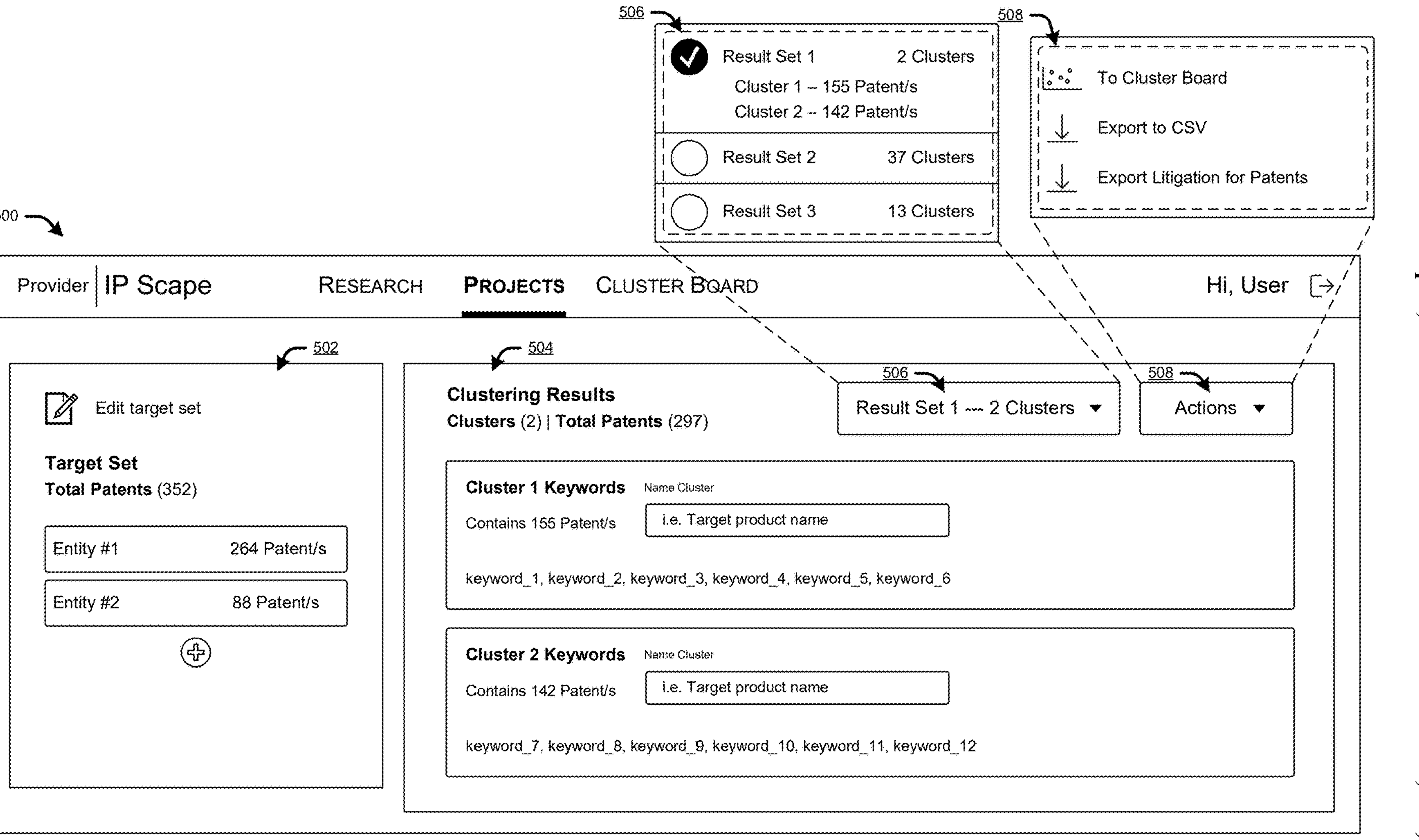
FIG. 5 illustrates an example user interface for displaying data associated with a user account representing a target entities window and a clustering results window associated with an intellectual-property landscaping project and/or research queries and/or one or more actionable elements.

FIG. 5 illustrates an example user interface 500 for displaying data associated with a user account representing selected clustering results. The data may be presented using a target set window 502 and/or a clustering results window 504. The user interface 500 may be displayed on a display of an electronic device associated with a user account, such as, for example, the electronic device 102 as described with respect to FIG. 1 above.

In some examples, the target set window 502 may include an indication of the targeted set, including entities and/or publications, an indication of a total number of IP assets associated with the targeted set, and/or an edit target set selection element. The listing of the targeted set may be presented using individual cells for each targeted set, entity, and/or publication. In some examples, each cell may include an indication of an identification of the targeted set, entity, publication, and/or an indication of a number of IP assets that are associated with the targeted set. In some examples, the edit targeted set selection may be configured such that, when selected, the user interface may be caused to present the entity view of the search page and/or allow the user to add and/or remove entities and/or publications to the targeted set.

In some examples, the clustering results window 504 may include a results set element 506 and/or an actions element 508. In some examples, the results set element 506 may include one or more selectable result sets and may be configured to present one or more clusters in the clustering results window 504 that correspond to a selected result set of the one or more selectable result sets. Additionally, or alternatively, the actions element 508 may include one or more sub-elements, and may be configured to perform various actions in response to user input representing selection of a particular sub-element. For example, the actions element 508 may include a cluster board sub-element, an export to Comma Separated Values (CSV) file element, and/or an export litigation for patents sub-element. In some examples, the cluster board sub-element 508 may be configured such that, when selected, the user interface may be caused to present the cluster board page. Additionally, or alternatively, the export to CSV file sub-element 508 may be configured such that, when selected, a file may be optionally downloaded by the user including a representation of the clusters in a .CSV file format. Additionally, or alternatively, the export litigation for patents sub-element 508 may be configured such that, when selected, a file may be optionally downloaded by the user representing litigation information associated with the IP assets included in the clusters of the selected result set. Additionally, or alternatively, the clustering results window 504 may include information associated with the selected result set, one or more cluster sub-windows, a result set selector, and/or an actions element. In some examples, the information associated with the selected result set may include an indication of the selected result set, an indication of the number of clusters associated with the selected result set, and/or an indication of a total number of IP assets associated with the clusters included in the selected result set. In some examples, each of the cluster sub-windows may include an indication of the cluster number, a total number of IP assets associated with the cluster, one or more keywords associated with the clusters, and/or a name cluster field configured to receive a user input to specify a name of the cluster.

Figure 6A:
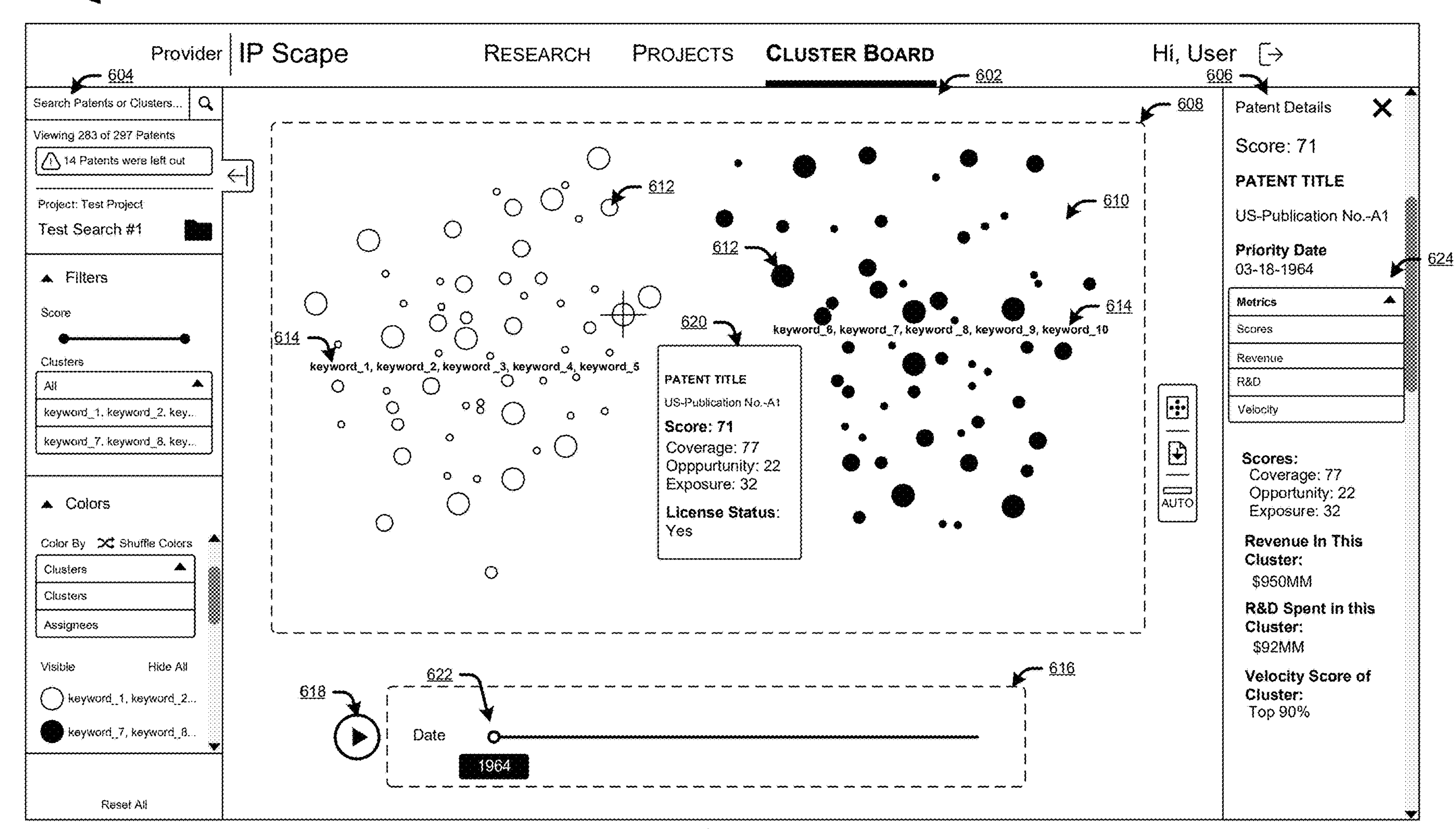
FIGS. 6A-6C illustrates example user interfaces for displaying data representing an interactive graphical element configured as a visual representation of a targeted intellectual-property landscape, one or more informational overlay windows, and/or one or more actionable elements.

FIG. 6A illustrates an example user interface 600 for displaying data associated with a user account representing a spatial representation of cluster(s) included in a selected result set and/or included in a user-defined result set. The data may be presented using an interactive graphical element 602, a filters overlay window 604, an IP asset overlay window 606, and/or a cluster overlay window 606. The user interface 600 may be displayed on a display of an electronic device associated with a user account, such as, for example, the electronic device 102 as described with respect to FIG. 1 above.

In some examples, the interactive graphical element 602 may include a spatial representation 608 of the clusters. In some examples, the spatial representation 608 may include a background 610 represented by white space, graphical indicators 612 associated with respective IP assets included in the clusters, keyword sets 614 associated with respective clusters included in the result set, a slider filter control 616, an animation sequence element 618, and/or a quick information overlay window 620. In some examples, the graphical indicators 612 may be represented as dots having a size corresponding to the relevance of the associated IP asset with respect to the other IP assets included in the cluster. It should be appreciated that the interactive graphical element 602 may include more graphical indicators 612 than indicated by the reference numerals. Additionally, or alternatively, the graphical indicators 612 may be color coded, such that IP assets that are included in a cluster of the selected result set may be represented by a graphical indicator 612 having a color associated with the cluster. In some examples, graphical indicators 612 belonging to separate clusters in a result set may have different colors that correspond to the respective cluster to which they belong. In some examples, the keyword sets 614 may include one or more keywords associated with a respective cluster and may be presented at a central location of the cluster. Additionally, or alternatively, the keyword set 614 may be represented in a color corresponding to the associated cluster. Additionally, or alternatively, the interactive graphical element 602 may be configured to be manipulated by various user inputs, such as, for example, a zoom action configured to enlarge or shrink the view of the interactive graphical element to a desired location of the spatial representation and/or a click and drag action configured to focus the view of the interactive graphical element 602 to a desired location of the spatial representation 608. In some examples, the slider filter control 616 may be configured to receive user input representing a lower bound and/or an upper bound associated with a priority date and/or proprietary score associated with the IP assets included in the clusters of the selected result set. In some examples, the animation sequence element 618 may be configured such that, when selected, the interactive graphical element may be caused to display an animated view of the spatial representation of the clusters. For example, the animated view may be configured as a time lapse animation, such that, the graphical elements 612 included in the spatial representation may appear and/or disappear according to the range specified by the lower bound and the upper bound of the slider filter control 616. Additionally, or alternatively, the animated view may be configured as a time lapse animation, such that, the graphical elements 612 included in the spatial representation may change color according to the assignee of the IP asset associated with a graphical element 612, such that, the time lapse animation may reflect the mergers and/or acquisitions associated with one or more entities over time. In some examples, the quick information overlay window 620 may be displayed in response to a user hovering over a graphical element 612 in the spatial representation. The quick information window may include at least a portion of the information included in the IP asset overlay window 606. In some examples, the slide filter control 616 may be adjustable via slide mechanism 622 such that the data presented in the spatial representations 608 changes based on a user moving the slide mechanism 622 along the slide filter control 616 without having to press the animation sequence element 618. By way of example, in FIG. 6A, the user has moved the slide mechanism 622 to the far left of the slide filter control 616 indicating a selection of the year 1964. In response, the spatial representations 608, the graphical elements 612, and the overlay window 606 present data for each IP asset based on data from the year 1964. That is, the interactive graphical element 602 presents clusters associated with the IP assets, metric data associated with the IP assets, as well as other data associated with the IP assets based on which year the user has selected via the slide mechanism 622, which, in this example, is 1964. As discussed in further detail below with respect to FIGS. 6B and 6C, as the user changes the slide mechanism 622 to different years, the spatial representation 608 and the overlay window 606 may present different data based on which year is select. In some cases, the user may select which types of information they would like to be displayed and see that information change as they change the year via the slide mechanism 622. For example, a user may interact with a metric selector 624 to define which metrics should be displayed in the overlay window 606 and/or the spatial representation 608. In this example, the user has selected to present the scores (e.g., coverage score, opportunity score, and exposure score), the revenue associated with the selected cluster, the R&D spending associated with the selected cluster, and the filing velocity score associated with the selected cluster.

In some examples, the filters overlay window 604 may include a search element configured to allow a user to search for an IP asset and/or a cluster, an indication of a number of IP assets included in the clusters, an indication of the IP assets visible on the current view of the spatial representation (e.g., the graphical elements in view), an indication of a number of IP assets that are included in the clusters but not presented on the interactive graphical element, a project selection control, a score filter slider, a cluster filter element, and/or a cluster color selector. In some examples, the project selection control may be configured such that, when selected, a user may select a project to visualize on the interactive graphical element representing the IP asset landscape. In some examples, the score filter slider may include a lower bound control and/or an upper bound control associated with a proprietary score associated with the IP assets included in the clusters of the selected result set. In some examples, the cluster filter element may be configured such that, when a cluster is selected, the selected cluster may be configured to appear and/or disappear from the spatial representation. In some examples, the cluster color selector may be configured to allow a user to change the colors associated with respective clusters of the selected result set.

In some examples, the IP asset overlay window 606 may be displayed in response to user input representing a selection of a graphical element in the spatial representation. The IP asset overlay window 606 may include information associated with a selected IP asset and/or a proprietary score associated with a selected IP asset and generated by the IP landscaping platform. Additionally, or alternatively, the IP asset overlay window 606 may be configured as a cluster overlay window 606. In some examples, the cluster overlay window 606 may be displayed in response to user input representing a search query indicating an identification of a cluster. The cluster overlay window 606 may include information and/or metric data or score data associated with the cluster, such as, for example, an indication of the color associated with the cluster, an indication of the keyword set associated with the cluster, a number of patents associated with the cluster, an average of the proprietary scores associated with the IP assets included in the cluster and generated by the IP landscaping platform.

Figure 6B:
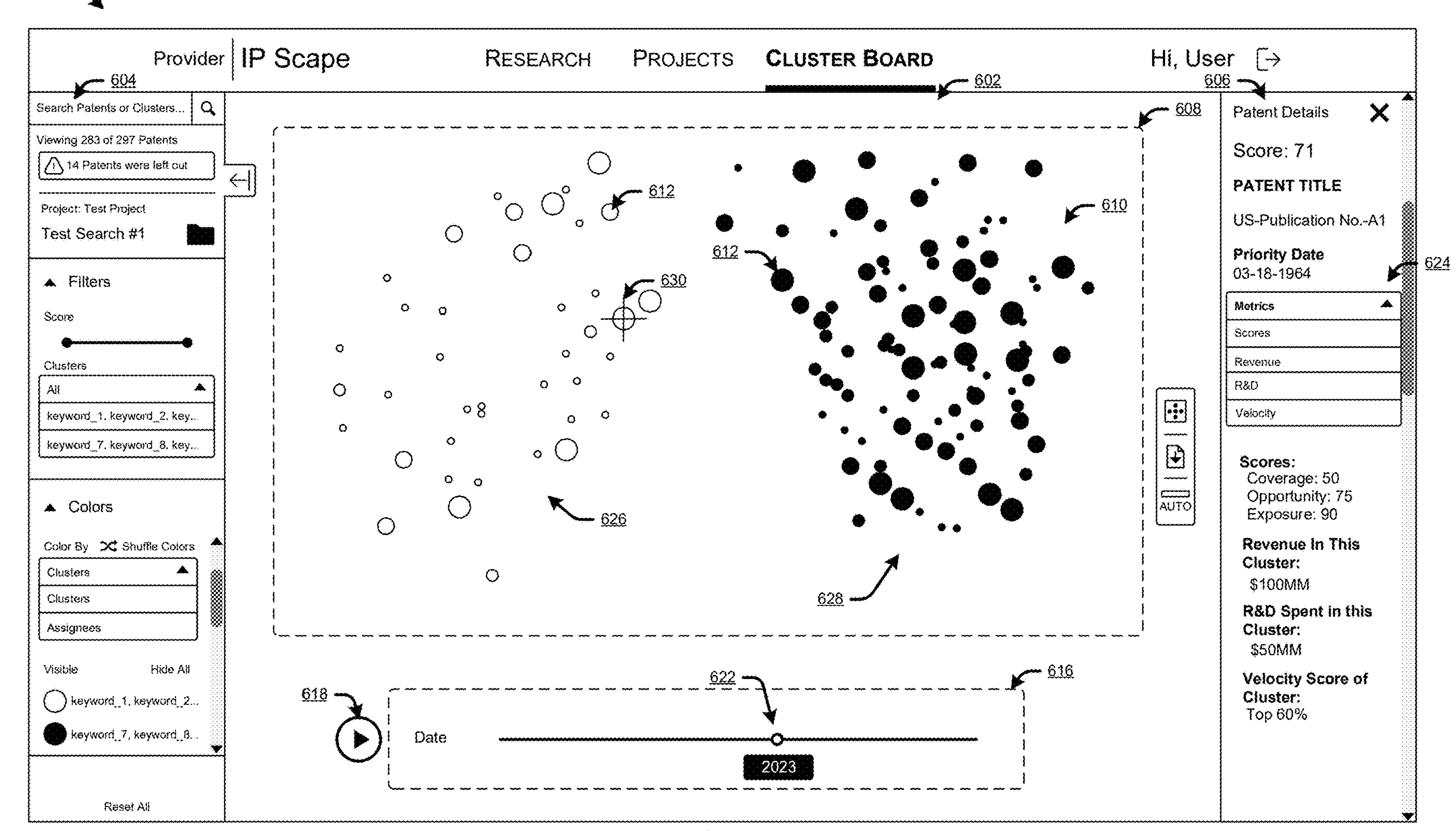

FIG. 6B illustrates the example user interface 600 for displaying data associated with a user account representing a spatial representation of cluster(s) that may be included in a selected result set and/or included in a user-defined result set. In this example, the user may have moved the slide mechanism 622 to a different year, such as 2023. In this example, the year 2023 may reflect the current year and/or an access year (e.g., an access date) in which the GUI is being generated. In this case, the user can visualize the difference in the cluster representation of cluster 626 and cluster 628 between the year 1964 and the year 2023. For instance cluster 626 has reduced in size (e.g., less IP assets) and cluster 628 as increased in size (e.g., more IP assets). In some cases, the user may continue to use selector 630 to select the cluster 626 causing the overlay window 606 to present data, such as scores and/or metrics associated with the cluster 626. In this case, each of the scores associated with the selected cluster 626, the revenue associated with the selected cluster 626, the R&D associated with the selected cluster 626, and the velocity score associated with the selected cluster 626 have changed since 1964.

Figure 6C:
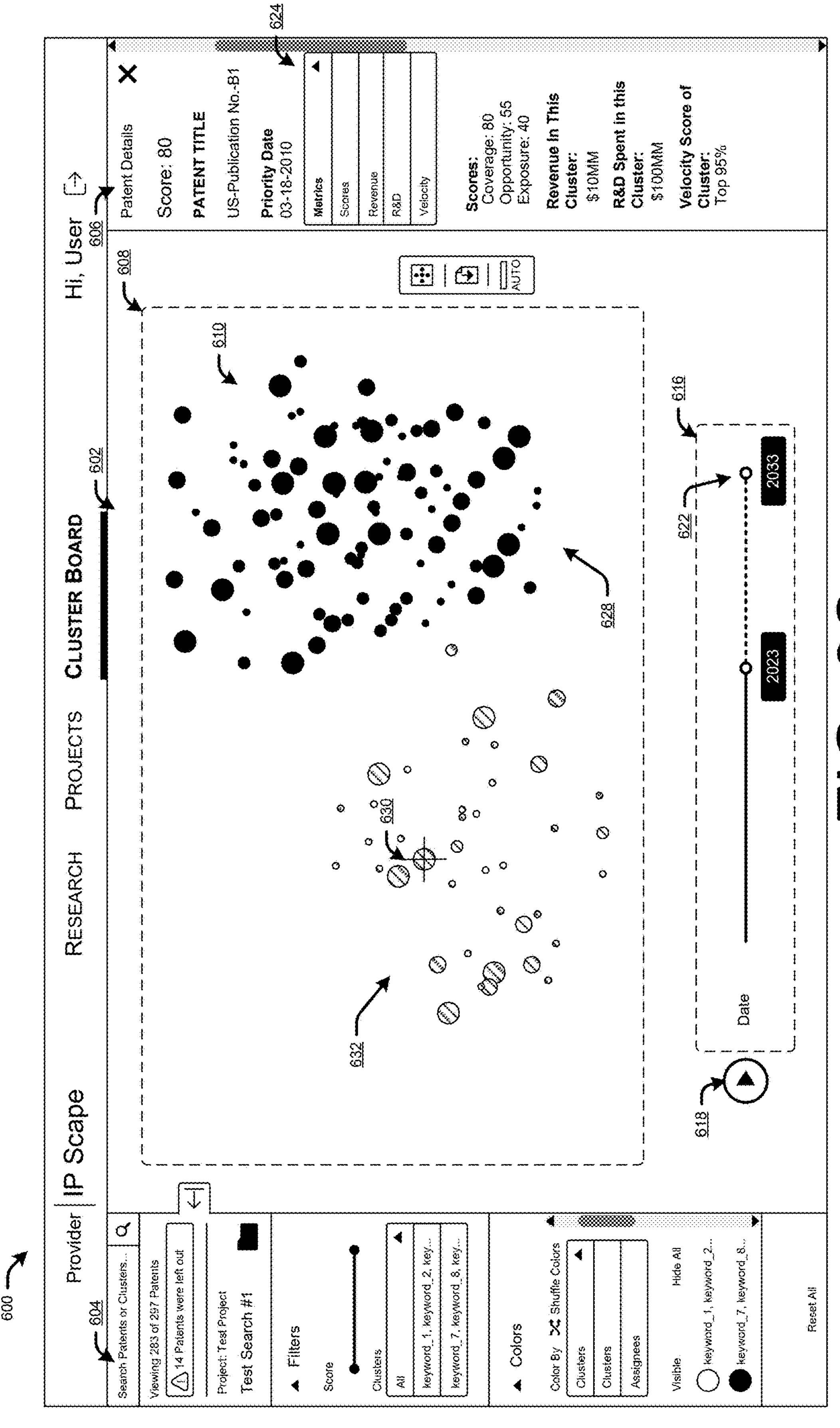

FIG. 6C illustrates the example user interface 600 for displaying data associated with a user account representing a spatial representation of cluster(s) that may be included in a selected result set and/or included in a user-defined result set. In this example, the user may have moved the slide mechanism 622 to a future date, such as 2033. In this case, the IP landscaping platform may predict changes to the spatial representation 608. The percentile ranking of an entity and/or technology area and/or an amount in which a number of filings has increased (e.g. a filing velocity) may be extrapolated by the filing velocity component into an upcoming time period. For example, if an entity has increased an amount of IP assets filed by 10% each year for the last 50 years and the entity filed 200 IP assets in the current year of 2023, the filing velocity component may predict that the entity will file a 10% increase for the year 2024 and file 220 IP assets for the year 2024. The same type of extrapolation can be applied to a given market and/or technology area. For instance, if a particular market and/or technology area has grown or shrunk (e.g., increased or decreased of associated IP asset filings) over a period of time by a determined amount of a determined period of time (e.g., 5% decrease over the last 75 years), then the filing velocity component may extrapolate that value and apply it to future periods of time to determine how the market and/or technology area may grow or shrink in the future. In some cases, the indications representing the extrapolated data may be presented in a way to differentiate them from the data generated based on existing data. For instance the indications representing the extrapolated data may be a different color, a different size, a different shape, etc.).

In some examples, the filing velocity component may identify a total amount of IP assets filed that are directed towards or otherwise associated with an IP art unit for a period of time (e.g., a year, five years, ten years, etc.) The filing velocity component may then identify a number of IP assets filed by individual entities, such as an entity accessing the IP landscaping platform and associated entity competitors, during that time period directed towards or otherwise associated with the IP art unit. In some examples, the filing velocity component may then generate a percentile ranking for each entity based at least in part on comparing the number of IP assets filed by the individual entities during the time period to the total number of IP assets filed during the time period. In some examples, the percentile ranking of each entity maybe utilized as a metric for the opportunity component to generate an opportunity metric. For example, a low percentile ranking (e.g., 10%, 20%, 30%) may indicate that an entity is underperforming with regard to a number of IP assets filed in a particular IP art unit. Additionally, and/or alternatively, a high percentile ranking (e.g., 70%, 80%, 90%) may indicate that an entity is overperforming with regard to a number of IP assets filed in a particular IP art unit.

In some examples, the predictive analytics component may make determinations and/or generate data to be displayed on the user interface. For example, a user may specify one or more target entities, one or more target publications, and/or one or more target products that the predictive analytics component may utilize to generate a predictive analytics search. In some examples, the predictive analytics component may be configured to identify one or more target entities utilizing data representing one or more target publications and/or one or more target products. The results of the predictive analytics search may include a predicted comprehensive breadth score for a pending IP asset associated with an entity. For example, the predictive analytics component may determine an examiner and/or an art unit associated with at least one pending IP asset filed or otherwise associated with the entity. In some cases, the predictive analytics component may determine a comprehensive breadth score, as discussed herein, for at least one originally filed claim of an IP asset (e.g., application) previously examined by the examiner and/or previously filed in the art unit. The predictive analytics component may then determine a comprehensive breadth score for an issued version of the originally filed claim of the application and generate an examiner metric and/or an art unit metric based at least in part on a difference between the comprehensive breadth score of the originally filed claims and the comprehensive breadth score of the issued claims. In this way, the predictive analytics component may determine an effect that a particular examiner and/or art unit may have on a comprehensive breadth score of a potentially allowable claim. For example, the predictive analytics component may determine predicted breadth score for a pending IP asset based at least in part on the examiner metric and/or the art unit metric. In some cases, the predicted breadth score may be utilized by the opportunity component to generate the opportunity metric.

In some cases, the predictive analytics component may generate a predicted issue date for a pending IP asset associated with an entity based on an average length of prosecution associated with an examiner and/or an art unit. In some cases, the predicted issue date may be utilized by the opportunity component to generate the opportunity metric.

In response to the user the user moving the slide mechanism 622 to a future date, such as 2033, the user can visualize the changes in the cluster representations of cluster 626, which has disappeared, cluster 628, which has remained the same, and a new cluster 632 which has appeared, when the year 2033 is selected. In some cases, the user may continue to use selector 630 to select the new cluster 632 causing the overlay window 606 to present data, such as scores and/or metrics associated with the cluster 632. In this case, each of the scores associated with the selected cluster 632, the revenue associated with the selected cluster 632, the R&D associated with the selected cluster 632, and the velocity score associated with the selected cluster 632.

Figure 7A:
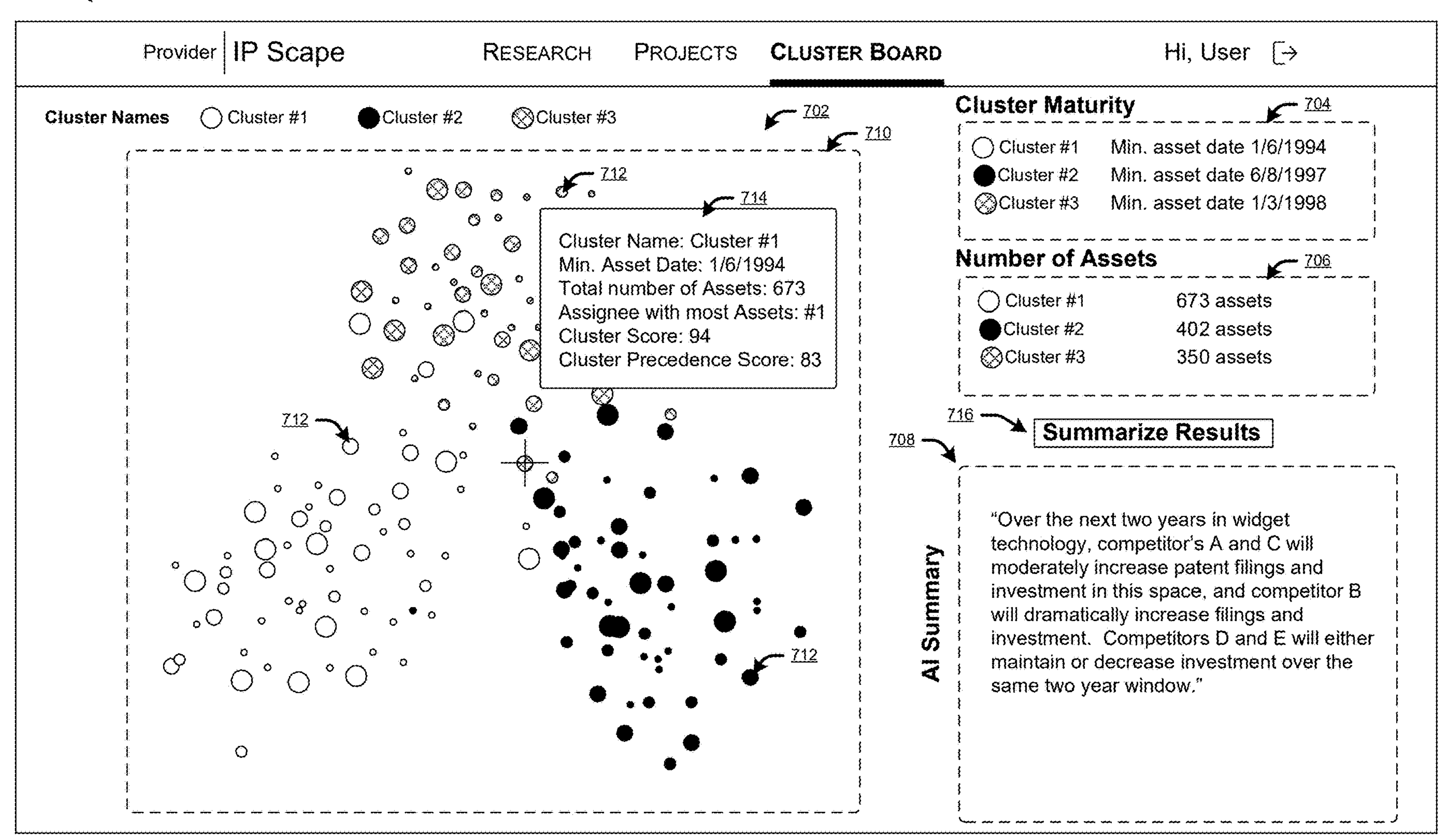
FIG. 7A illustrates an example user interface for displaying data representing an interactive graphical element configured as a visual representation of a targeted intellectual-property landscape, one or more word cloud windows, and/or an artificial intelligence summary window.

FIG. 7A illustrates an example user interface 700 for displaying data associated with a user account representing a spatial representation of cluster(s) that may be included in a selected result set and/or included in a user-defined result set. The data may be presented using an interactive graphical element 702, a cluster maturity box 704, a summary box 708, and/or an assignee publication count window 706. The user interface 700 may be displayed on a display of an electronic device associated with a user account, such as, for example, the electronic device 102 as described with respect to FIG. 1 above. Additionally, or alternatively, the interactive graphical element 702 may include any number of the features of the interactive graphical element 602 described above with respect to FIG. 6. In some cases, the AI training model component 258 may utilize a generative AI model to summarize a user's manipulations and view on a particular technology space. For instance, the AI training model component 258 may be configured to present a "Summarize Results" button 716, or similar button, which, when selected, causes the AI training model component 258 to instruct a generative AI to write a report in the summary box 708 detailing what the user sees in a spatial representation of the clusters 710. For instance, if there are 5 entities presented in a particular technology space, the AI may produce a narrative description similar to "Acme Co. expects that over the next two years in widget technology, that competitor's A and C will moderately increase patent filings and investment in this space, and competitor B will dramatically increase filings and investment. Competitors D and E will either maintain or decrease investment over the same two year window." By writing this narrative, the user's insights can be described in ways that can be published, emailed, or communicated, without having to explain how to read complicated graphs, or in addition to the graphs as an alternate way to explain the data. In some cases, the AI training model component 258 may instruct the generative AI model to produce power point slide shows using both the graphs and textual descriptions to automate sending the trends analysis to another user.

In some examples, the interactive graphical element 702 may include a spatial representation of the clusters 710 and/or one or more cluster filter elements. In some examples, the cluster filter elements may be represented by a name of the cluster and/or keywords associated with the cluster. Additionally, or alternatively, the cluster filter elements may be configured such that, when selected, graphical indicators 712 associated with the selected cluster may appear and/or disappear on the interactive graphical element 702 accordingly. In some examples, the spatial representation 710 may include a background represented by white space, graphical indicators 712 associated with respective IP assets included in the clusters, and/or a quick information overlay window 714. Additionally, or alternatively, the spatial representation 710 may include any of the one or more features of the spatial representation 608 described above with respect to FIG. 6. In some examples, the graphical indicators 712 may be represented as dots having a size corresponding to the relevance of the associated IP asset with respect to the other IP assets included in the cluster. It should be appreciated that the interactive graphical element 710 may include more graphical indicators 712 than indicated by the reference numerals. Additionally, or alternatively, the graphical indicators 712 may be color coded, such that IP assets that are included in a cluster of the selected result set may be represented by a graphical indicator 712 having a color associated with the cluster. In some examples, graphical indicators 712 belonging to separate clusters in a result set may have different colors that correspond to the respective cluster to which they belong. Additionally, or alternatively, the interactive graphical element 702 may be configured to be manipulated by various user inputs, such as, for example, a zoom action configured to enlarge or shrink the view of the interactive graphical element to a desired location of the spatial representation and/or a click and drag action configured to focus the view of the interactive graphical element 702 to a desired location of the spatial representation 710. In some examples, the quick information overlay window 714 may be displayed in response to a user hovering over a graphical element 712 in the spatial representation. The quick information window 714 may include information associated with the IP asset corresponding to the graphical element 712 in which the user is hovering over. In some examples, the quick information window 714 may include an indication of the assignee associated with the IP asset, an indication as to how broad the IP asset is, such as, for example, narrow, medium, and/or broad, a title of the IP asset, the abstract of the IP asset, a priority date of the IP asset, and/or an expiration date of the IP asset.

In some examples, the cluster maturity box 704 may include an indication of an earliest filed asset within clusters selected by the user. For example, the user may select "cluster #1", "cluster #2", and "cluster #3" and in response, cluster maturity box 704 may present each cluster as well as the earliest filed asset within each cluster. In some examples, the selected clusters may be ordered based on the earliest filed asset. In some cases the visualization may include a line graph for each cluster beginning at the earliest priority date and ending at the latest priority date. In some cases, the visualization included in the cluster maturity box 704 may be based on other dates, such as an earliest and/or latest filing date of an IP asset within each cluster, an earliest and/or latest publication date of an IP asset within each cluster, and/or other dates associated with IP assets that may indicate an age of the IP asset.

In some examples, the graph may be presented as a bar graph, a line graph, a pie chart, a table, and/or any other graph suitable for presenting the data. Additionally, or alternatively, the graph may be configured such that when a user hovers over one of the bars (or other data point representation) the user is presented with information associated with the assignee, such as, for example, the name of the assignee and/or a number of the associated IP assets. Additionally, or alternatively, the graph may be configured to receive user input. For example, the graph may be configured such that when a user selects a bar (or other data point representation) the user is presented with one or more actions. In some examples, the one or more actions may include focusing the spatial representation 710 and/or causing the spatial representation 710 to present only the graphical indicators 712 that are associated with the selected assignee. Additionally, or alternatively, the one or more actions may include presenting a list of IP assets associated with the assignee, including the assignee in a particular cluster, and/or excluding the assignee from a particular cluster. In some examples, the list of IP assets associated with the assignee may be presented in a ranked manner, and based on a score associated with and indicating the overall quality of the individual IP assets.

Figure 7B:
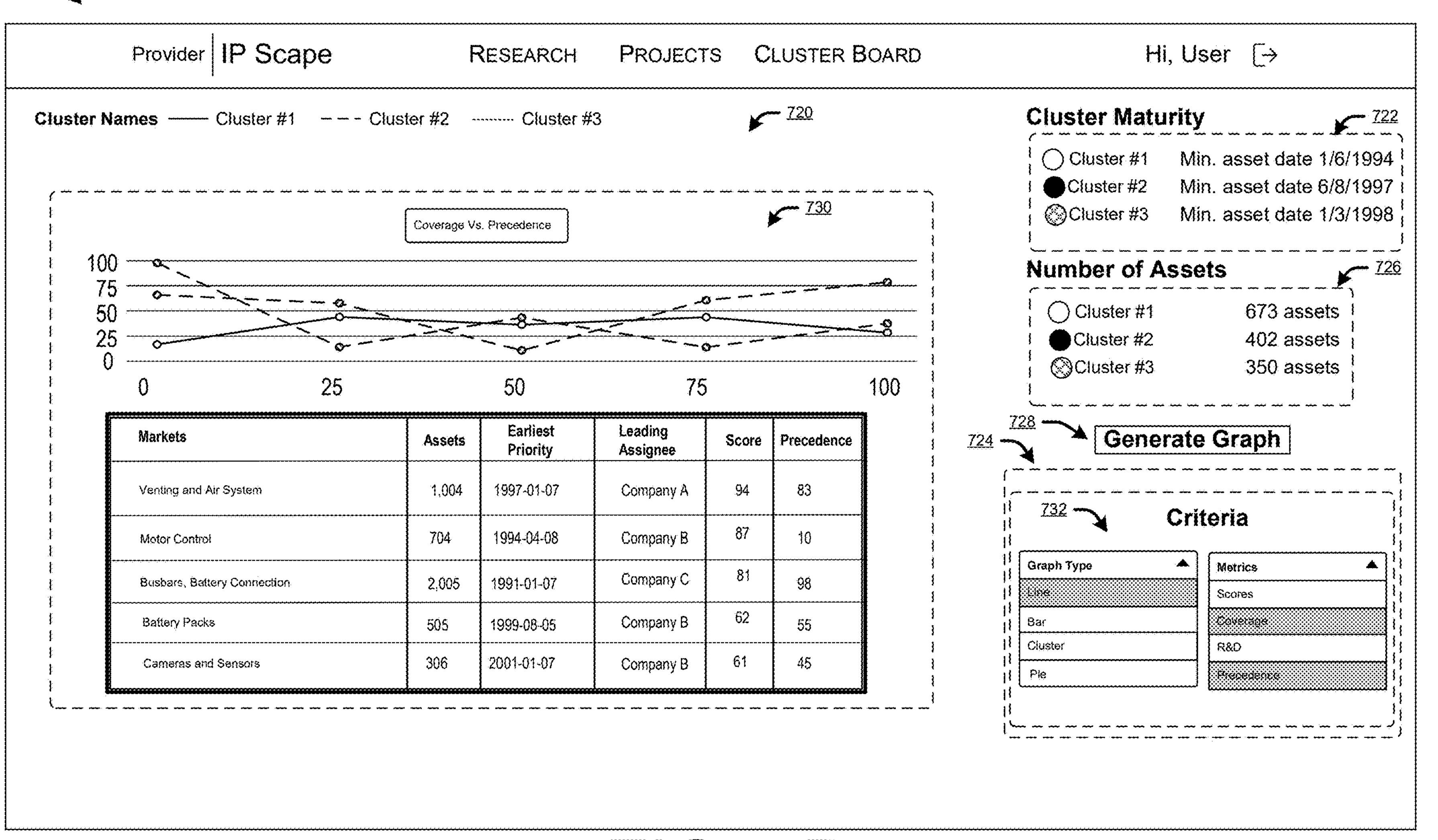
FIG. 7B illustrates an example user interface for displaying data representing an interactive graphical element configured as a visual representation of a targeted intellectual-property landscape, one or more word cloud windows, and/or an artificial intelligence visual representation generation window.

FIG. 7B illustrates an example user interface 718 for displaying data associated with a user account representing a spatial representation of cluster(s) that may be included in a selected result set and/or included in a user-defined result set. The data may be presented using an interactive graphical element 720, a cluster maturity box 722, a graph criteria box 724, and/or an assignee publication count window 726. The user interface 718 may be displayed on a display of an electronic device associated with a user account, such as, for example, the electronic device 102 as described with respect to FIG. 1 above. Additionally, or alternatively, the interactive graphical element 720 may include any number of the features of the interactive graphical element 602 described above with respect to FIG. 6. In some cases, the AI training model component 258 may utilize a generative AI model to generate a visual representation of one or more metrics that can be associated with a company, a market, a technology space, and/or a cluster. For instance, the AI training model component 258 may be configured to present a "Generate Graph" button 728, or similar button, which, when selected, causes the AI training model component 258 to instruct a generative AI to generate a visual representation 730 illustrating a relationship between the criteria 732 selected by the user. For instance, the user may select a "line graph" as a graph type and also select the "coverage" metric and the "precedence" metric as criteria for generating the graph. The generative AI may generate and present the visual representation 730 which correlates the coverage metric and the precedence metric for each cluster via a line graph (e.g., each point in the line graph representing an IP asset having an associated coverage metric and precedence metric. By generating this graph, the user can gleam insights that would otherwise be unavailable and/or unintuitive. In some cases, the AI training model component 258 may instruct the generative AI model to produce power point slide shows using both the graphs and textual descriptions to automate sending the trends analysis to another user.

In some examples, the graph may be presented as a bar graph, a line graph, a pie chart, a table, and/or any other graph suitable for presenting the data. Additionally, or alternatively, the graph may be configured such that when a user hovers over one of the bars (or other data point representation) the user is presented with information associated with the assignee, such as, for example, the name of the assignee and/or a number of the associated IP assets. Additionally, or alternatively, the graph may be configured to receive user input. For example, the graph may be configured such that when a user selects a bar (or other data point representation) the user is presented with one or more actions. Additionally, or alternatively, the one or more actions may include presenting a list of IP assets associated with the assignee, including the assignee in a particular cluster, and/or excluding the assignee from a particular cluster. In some examples, the list of IP assets associated with the assignee may be presented in a ranked manner, and based on a score associated with and indicating the overall quality of the individual IP assets.

FIGS. 8-12 illustrate example processes associated with the IP landscaping platform. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

FIG. 8 illustrates an example flow diagram of an example process 800 for utilizing a target entity having IP assets to seed an entity search and generate a user interface configured to present extrapolated data associated with entities that are similar to the target entity. The order in which the operations or steps are described is not intended to be construed as a limitation, and any number of the described operations may be combined in any order and/or in parallel to implement process 800. The operations described with respect to the process 800 are described as being performed by an electronic device and/or a remote computing resource associated with the IP landscaping platform. However, it should be understood that some or all of these operations may be performed by some or all of components, devices, and/or systems described herein.

At block 802, the process 800 may include identifying a first entity having first intellectual-property assets.

At block 804, the process 800 may include generating a graphical user interface (GUI) configured to display on a computing device, the GUI configured to display one or more second entities having second intellectual-property assets that are similar to one or more of the first intellectual-property assets and receive an input from the computing device. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 806, the process 800 may include receiving, via the GUI, first input data representing the input, the first input data indicating selection of at least one of the second entities as selected entities and a first time period. In some examples, the input data may indicate an identification of a first entity as a target entity and/or one or more first entities as target entities. Additionally, or alternatively, the input data may indicate an identification of a target intellectual-property asset and/or one or more identifications of target intellectual-property assets. Additionally, or alternatively, the input data may indicate an identification of a target product and/or one or more identifications of target products.

At block 808, the process 800 may include generating, based at least in part on the second IP assets associated with the selected entities, first data representing a first result set including at least a first cluster including a first portion of the second IP assets associated with the selected entities and a first metric associated with the second IP assets included in the first portion.

At block 810, the process 800 may include receiving, via the GUI, second input data, the second input data indicating selection of at least a second time period that postdates an access date in which the GUI is being generated. For example, the first time period and/or the access date may include a current date, a present date, and/or existing date that has occurred and the second time period may include a date in the future that is still yet to come. In some cases, the second time period may include date that has already occurred but postdates the first time period.

At block 812, the process 800 may include generating, based at least in part on the second IP assets associated with the selected entities and the second time period, second data representing a second result set including at least one of a second cluster including a second portion of the second IP assets associated with the selected entities, a second metric associated with the second IP assets included in the first portion, or a new IP asset added to the first cluster.

At block 814, the process 800 may include causing the GUI to display at least one of the first result set or the second result set.

Additionally, or alternatively, the process 800 may include identifying a first number of IP assets associated with at least one of the selected entities and filed between a first date and a second date, determining a second number of IP assets associated with the at least one of the selected entities and filed between a third date and a fourth date, and generating a filing velocity metric based at least in part on comparing the second number of IP assets filed by between the third date and the fourth date to the first number of IP assets filed between the first date and the second date, wherein generating the second data is based at least in part on the filing velocity metric.

Additionally, or alternatively, the process 800 may include receiving the selection of the first time period and the second time period via a slider mechanism.

Additionally, or alternatively, the process 800 may include the second result set being displayed subsequently to the first result set being displayed in response to receiving the second input data via the slider mechanism.

Additionally, or alternatively, the process 800 may include receiving third input indicating selection of the first time period and displaying the first result set in response to receiving selection of the first time period.

Additionally, or alternatively, the process 800 may include at least one of the first metric or the second metric including a coverage metric, an opportunity metric, and an exposure metric.

Additionally, or alternatively, the process 800 may include at least one of the first metric or the second metric including a comprehensive metric based at least in part on a coverage metric, an opportunity metric, and an exposure metric.

FIG. 9 illustrates an example flow diagram of an example process 900 for utilizing a target entity having IP assets to seed an entity search and generate a user interface configured to present extrapolated data associated with entities that are similar to the target entity. The order in which the operations or steps are described is not intended to be construed as a limitation, and any number of the described operations may be combined in any order and/or in parallel to implement process 900. The operations described with respect to the process 900 are described as being performed by an electronic device and/or a remote computing resource associated with the IP landscaping platform. However, it should be understood that some or all of these operations may be performed by some or all of components, devices, and/or systems described herein.

At block 902, the process 900 may include identifying a first entity having first intellectual property assets.

At block 904, the process 900 may include generating a graphical user interface (GUI) configured to display on a computing device. In some examples, the GUI may be configured to display second entities having second intellectual-property assets that are similar to one or more of the first intellectual-property assets and receive an input from the computing device. The computing device may be any of the electronic devices 102 and/or remote computing resources 104 described with respect to FIG. 1. Additionally, or alternatively, the GUI may include any of the example user interfaces 300-700 described with respect to FIGS. 3-7.

At block 906, the process 900 may include receiving, via the GUI, first input data representing the input, the first input data indicating selection of at least one of the second entities as selected entities and a first time period. Additionally, or alternatively, the input data may indicate an identification of a target entity. Additionally, or alternatively, the input data may indicate an identification of a target product.

At block 908, the process 900 may include generating, based at least in part on the second IP assets associated with the selected entities, first data representing a first result set including a first cluster including a first portion of the second IP assets associated with the selected entities, the first result set being associated with the first period of time.

At block 910, the process 900 may include receiving, via the GUI, second input data, the second input data indicating selection of at least a second time period that postdates an access date in which the GUI is being generated.

At block 912, the process 900 may include identifying a first number of IP assets associated with at least one of the selected entities and filed between a first date and a second date.

At block 914, the process 900 may include determining a second number of IP assets associated with the at least one of the selected entities and filed between a third date and a fourth date.

At block 916, the process 900 may include generating a filing velocity metric based at least in part on comparing the second number of IP assets filed by between the third date and the fourth date to the first number of IP assets filed between the first date and the second date.

At block 918, the process 900 may include generating, based at least in part on the filing velocity metric and the second time period, second data representing a second result set indicating a change to the first result set.

At block 920, the process 900 may include causing the GUI to display at least one of the first result set or the second result set.

Additionally, or alternatively the process 900 may include the metric associated with the first cluster indicating at least one of: geographical data, breadth data, expiration data, diversity data, revenue alignment data, invalidity data, filing velocity data, spending data, predictive analytics data, precedence data, litigation data, market data, or revenue alignment data.

Additionally, or alternatively the process 900 may include receiving the selection of the first time period and the second time period via a slider mechanism.

Additionally, or alternatively the process 900 may include the second result set being displayed subsequently to the first result set being displayed in response to receiving the second input data via the slider mechanism.

Additionally, or alternatively the process 900 may include receiving third input indicating selection of the first time period and displaying the first result set in response to receiving selection of the first time period.

Additionally, or alternatively the process 900 may include displaying at least one of a coverage metric, an opportunity metric, an exposure metric, or a comprehensive metric in response to a selection of at least one IP asset displayed on a first portion of the GUI.

Additionally, or alternatively the process 900 may include displaying the at least one of the coverage metric, the opportunity metric, the exposure metric, or the comprehensive metric in response to the selection of the at least one IP asset displayed on the first portion of the GUI comprising displaying an information overly window within the first portion of the GUI.

Additionally, or alternatively the process 900 may include identifying, from the second IP assets, foreign IP assets and design IP assets as third IP assets and removing the third IP assets from the second IP assets prior to generating data representing the first result set and the second result set.

Figure 10:
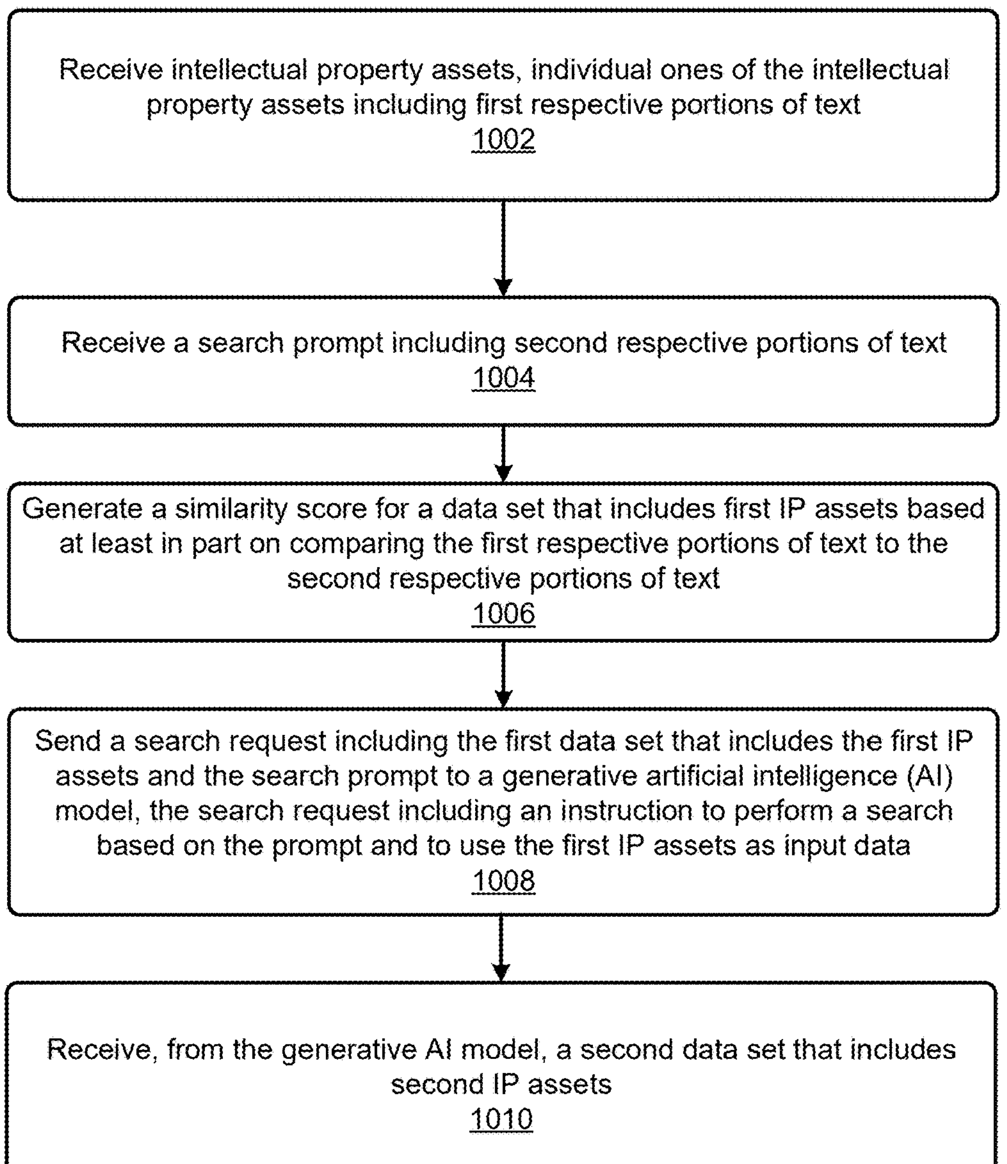
FIG. 10 illustrates an example flow diagram of an example process for providing feedback input to a generative artificial intelligence model including IP asset data.

FIG. 10 illustrates an example flow diagram of an example process 1000 for providing feedback input to a generative AI model including IP asset data. The order in which the operations or steps are described is not intended to be construed as a limitation, and any number of the described operations may be combined in any order and/or in parallel to implement process 1000. The operations described with respect to the process 1000 are described as being performed by an electronic device and/or a remote computing resource associated with the IP landscaping platform. However, it should be understood that some or all of these operations may be performed by some or all of components, devices, and/or systems described herein.

At block 1002, the process 1000 may include receiving intellectual property assets, individual ones of the intellectual property assets including first respective portions of text.

At block 1004, the process 1000 may include receiving a search prompt including second respective portions of text.

At block 1006, the process 1000 may include generating a similarity score for a data set that includes first IP assets based at least in part on comparing the first respective portions of text to the second respective portions of text.

At block 1008, the process 1000 may include sending a search request including the first data set that includes the first IP assets and the search prompt to a generative artificial intelligence (AI) model, the search request including an instruction to perform a search based on the prompt and to use the first IP assets as input data.

At block 1010, the process 1000 may include receiving, from the generative AI model, a second data set that includes second IP assets.

Additionally, or alternatively, the process 1000 may include receiving, from the generative AI model, a fifth data set that includes third IP assets, generating a third vector representation of the fifth data set based at least in part on the third IP assets, generating a fourth vector representation of the fourth data set based at least in part on the first IP assets, determining a ranking of the third IP assets based at least in part on comparing the third vector representation to the fourth vector representation, sending the generative AI model a sixth data set that includes the ranking of the third IP assets as a feedback input, and sending a third search request including a seventh data set that includes the first IP assets to the generative AI model.

Additionally, or alternatively, the process 1000 may include generating the ranking of the second IP assets include generating a similarity score associated with the second IP assets based at least in part on comparing the first vector representation to the second vector representation.

Additionally, or alternatively, the process 1000 may include the first data set including at least one non-IP based assets.

Additionally, or alternatively, the process 1000 may include the at least one non-IP based asset including a 10-K filing associated with an entity.

Additionally, or alternatively, the process 1000 may include generating a graphical user interface (GUI) configured to display on a computing device, the GUI configured to display the second data set that includes the second IP assets, and receive an input from the computing device.

Additionally, or alternatively, the process 1000 may include receiving input data representing the input, the input data indicating a selection of a generative AI summary button, sending a request to the generative AI model for a word summary of the second data set, receiving the word summary of the second data set, and causing the GUI to display at least the word summary.

Figure 11:
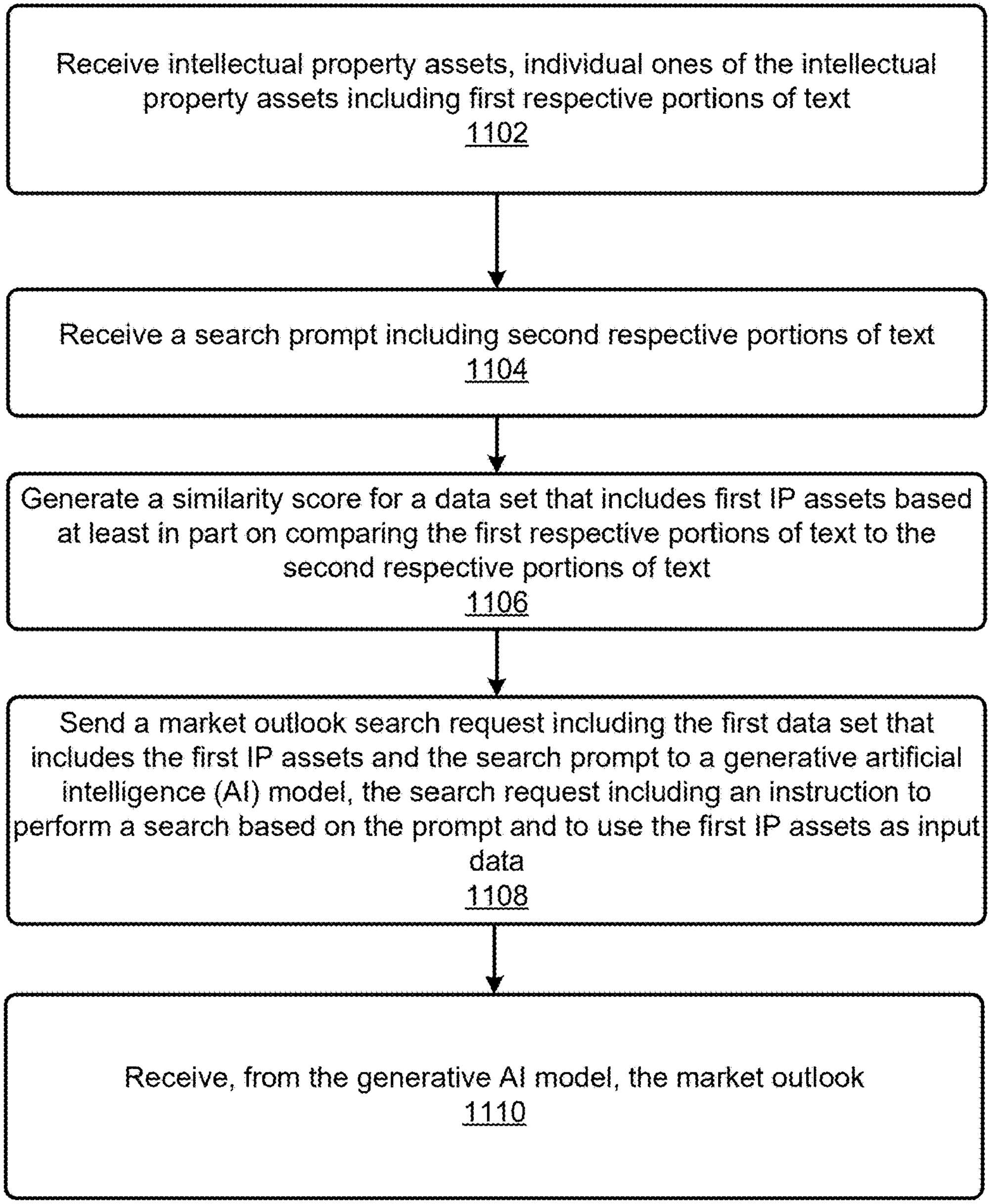
FIG. 11 illustrates an example flow diagram of an example process for providing feedback input to a generative artificial intelligence model including IP asset data.

FIG. 11 illustrates an example flow diagram of an example process 1100 for providing feedback input to a generative AI model including IP asset data. The order in which the operations or steps are described is not intended to be construed as a limitation, and any number of the described operations may be combined in any order and/or in parallel to implement process 1100. The operations described with respect to the process 1100 are described as being performed by an electronic device and/or a remote computing resource associated with the IP landscaping platform. However, it should be understood that some or all of these operations may be performed by some or all of components, devices, and/or systems described herein.

At block 1102, the process 1100 may include receiving intellectual property assets, individual ones of the intellectual property assets including first respective portions of text.

At block 1104, the process 1100 may include receiving a search prompt including second respective portions of text.

At block 1106, the process 1100 may include generating a similarity score for a data set that includes first IP assets based at least in part on comparing the first respective portions of text to the second respective portions of text.

At block 1108, the process 1100 may include sending a market outlook search request including the first data set that includes the first IP assets and the search prompt to a generative artificial intelligence (AI) model, the search request including an instruction to perform a search based on the prompt and to use the first IP assets as input data.

At block 1110, the process 1100 may include receiving the market outlook from the generative AI model.

Additionally, or alternatively, the process 1100 may include receiving input data including selection of a at least one of a first time period or a second time period via a slider mechanism.

Additionally, or alternatively, the process 1100 may include displaying the second data set in response to receiving the input data via the slider mechanism.

Additionally, or alternatively, the process 1100 may include generating the ranking of the second IP assets include generating a similarity score associated with the second IP assets is based at least in part on comparing the first vector representation to the second vector representation Additionally, or alternatively, the process 1100 may include the ranking of the second IP assets being based at least in part on at least one of geographical data, breadth data, expiration data, diversity data, revenue alignment data, invalidity data, filing velocity data, spending data, predictive analytics data, precedence data, litigation data. market data, or revenue alignment data.

Additionally, or alternatively, the process 1100 may include generating a graphical user interface (GUI) configured to display on a computing device, the GUI configured to display the second data set that includes the second IP assets, and receive an input from the computing device Additionally, or alternatively, the process 1100 may include displaying at least one of a coverage metric, an opportunity metric, an exposure metric, or a comprehensive metric in response to a selection of at least one IP asset displayed on a first portion of the GUI.

Additionally, or alternatively, the process 1100 may include receiving input data representing the input, the input data indicating a selection of a generative AI summary button, sending a request to the generative AI model for a word summary of the second data set, receiving the word summary of the second data set, and causing the GUI to display at least the word summary.

Figure 12:
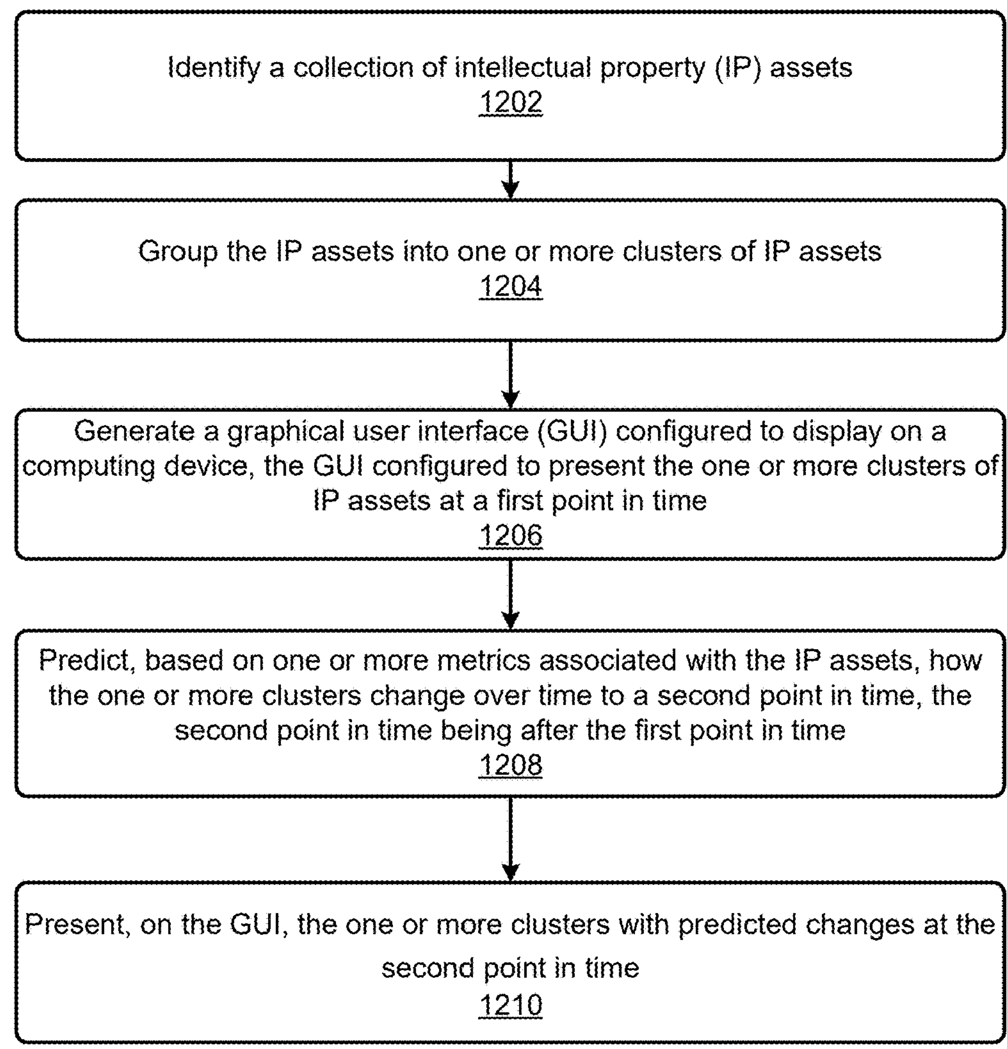
FIG. 12 illustrates an example flow diagram of an example process for predicting, based on one or more metrics associated with IP assets, how one or more clusters change over time.

FIG. 12 illustrates an example flow diagram of an example process 1200 for predicting, based on one or more metrics associated with IP assets, how one or more clusters change over time. The order in which the operations or steps are described is not intended to be construed as a limitation, and any number of the described operations may be combined in any order and/or in parallel to implement process 800. The operations described with respect to the process 800 are described as being performed by an electronic device and/or a remote computing resource associated with the IP landscaping platform. However, it should be understood that some or all of these operations may be performed by some or all of components, devices, and/or systems described herein.

At block 1202, the process 1200 may include identifying a collection of intellectual property (IP) assets.

At block 1204, the process 1200 may include grouping the IP assets into one or more clusters of IP assets.

At block 1206, the process 1200 may include generating a graphical user interface (GUI) configured to display on a computing device, the GUI configured to present the one or more clusters of IP assets at a first point in time.

At block 1208, the process 1200 may include predicting, based on one or more metrics associated with the IP assets, how the one or more clusters change over time to a second point in time, the second point in time being after the first point in time.

At block 1210, the process 1200 may include presenting, on the GUI, the one or more clusters with predicted changes at the second point in time.

Additionally, or alternatively, the process 1200 may include the one or more metrics including at least one of a filing date metric, a filing velocity metric, an entity owner of the IP assets, or a quality metric associated with the IP assets.

Additionally, or alternatively, the process 1200 may include the predicting comprising evaluating trends, based on the one or more metrics associated with the IP assets, to estimate one or more new IP assets, the one or more new IP assets being added to the one or more clusters and presented on the GUI at the second point in time.

Additionally, or alternatively, the process 1200 may include at least one of the one or more new IP assets forming a new cluster that is presented on the GUI at the second point in time.

Additionally, or alternatively, the process 1200 may the IP assets being owned by multiple different entities, the method further comprising ranking the multiple different entities for the one or more clusters based at least in part on the one or more metrics associated with the IP assets. In some cases, the process 1200 may further include presenting, on the GUI, the ranking of the multiple different entities for the one or more clusters. Additionally, or alternatively, the process 1200 may further include presenting, on the GUI, a change in ranking of the multiple different entities from the first point in time to the second point in time.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:

receiving intellectual property assets, individual ones of the intellectual property assets including first respective portions of text;

transforming the first respective portions of text into first vectors;

generating a custom vector space configured to maintain the first vectors instead of maintaining data representing the intellectual property assets, wherein the custom vector space represents a lower dimensionality than the data representing the intellectual property assets such that storage requires are decreased by generation and use of the custom vector space;

receiving a search prompt including second respective portions of text;

transforming the second respective portions of text into second vectors in the custom vector space;

generating a similarity score for a data set that includes first intellectual property (IP) assets based at least in part on comparing the first vectors to the second vectors;

sending a search request including the first data set that includes the first IP assets and the search prompt to a generative artificial intelligence (AI) model, the search request including an instruction to perform a search based on the prompt and to use the first vectors and the second vectors as input data;

receiving, from the generative AI model, a second data set that includes second IP assets;

displaying, to a user, a generated graphical user interface (GUI) configured to display the second data set that includes the second IP assets;

receiving, from the GUI, additional input data indicating a selection of a generative AI summary button;

sending a request to the generative AI model for a word summary of the second data set; and receiving the word summary of the second data set, wherein the displayed GUI is updated based at least in part on the word summary of the second data set.

2. The method of claim 1, further comprising:

generating a first vector representation of the first data set based at least in part on the first IP assets;

generating a second vector representation of the second data set based at least in part on the second IP assets;

determining a ranking of the second IP assets based at least in part on comparing the first vector representation to the second vector representation;

sending the generative AI model a third data set that includes the ranking of the second IP assets as a feedback input; and sending a second search request including a fourth data set that includes the first IP assets to the generative AI model.

3. The method of claim 2, further comprising:

receiving, from the generative AI model, a fifth data set that includes third IP assets;

generating a third vector representation of the fifth data set based at least in part on the third IP assets;

generating a fourth vector representation of the fourth data set based at least in part on the first IP assets;

determining a ranking of the third IP assets based at least in part on comparing the third vector representation to the fourth vector representation;

sending the generative AI model a sixth data set that includes the ranking of the third IP assets as a feedback input; and sending a third search request including a seventh data set that includes the first IP assets to the generative AI model.

4. The method of claim 2, wherein generating the ranking of the second IP assets include generating a similarity score associated with the second IP assets based at least in part on comparing the first vector representation to the second vector representation.

5. The method of claim 1, wherein the first data set includes at least one non-IP based assets.

6. The method of claim 5, wherein the at least one non-IP based asset includes a 10-K filing associated with an entity.

7. A method comprising:

receiving intellectual property assets, individual ones of the intellectual property assets including first respective portions of text;

transforming the first respective portions of text into first vectors;

generating a custom vector space configured to maintain the first vectors instead of maintaining data representing the intellectual property assets, wherein the custom vector space represents a lower dimensionality than the data representing the intellectual property assets such that storage requires are decreased by generation and use of the custom vector space;

receiving a search prompt including second respective portions of text;

transforming the second respective portions of text into second vectors in the custom vector space;

generating a similarity score for a data set that includes first intellectual property (IP) assets based at least in part on comparing the first vectors and the second vectors;

sending a market outlook search request including the first data set that includes the first IP assets and the search prompt to a generative artificial intelligence (AI) model, the search request including an instruction to perform a search based on the prompt and to use the first vectors and the second vectors as input data;

receiving the market outlook from the generative AI model;

displaying, to a user, a generated graphical user interface (GUI) configured to display the second data set that includes the second IP assets;

receiving, from the GUI, additional input data indicating a selection of a generative AI summary button;

sending a request to the generative AI model for a word summary of the second data set; and receiving the word summary of the second data set, wherein the displayed GUI is updated based at least in part on the word summary of the second data set.

8. The method of claim 7, further comprising receiving additional input data including selection of a at least one of a first time period or a second time period via a slider mechanism.

9. The method of claim 8, further comprising displaying the second data set in response to receiving the additional input data via the slider mechanism.

10. The method of claim 7, wherein generating a ranking of the second IP assets include generating a similarity score associated with the second IP assets.

11. The method of claim 10, wherein the ranking of the second IP assets is based at least in part on at least one of:

geographical data;
breadth data;
expiration data;
diversity data;
revenue alignment data;
invalidity data;
filing velocity data;
spending data;
predictive analytics data;
precedence data;
litigation data;
market data; or
revenue alignment data.

12. The method of claim 10, further comprising:

receiving additional input data representing the input, the input data indicating a selection of a generative AI summary button;

sending a request to the generative AI model for a word summary of the second data set;

receiving the word summary of the second data set; and causing the GUI to display at least the word summary.

13. A system comprising:

one or more processors; and one or more non-transitory computer-readable media comprising instructions that, when executed by the one or more processors, cause the one or more processors to perform operations comprising:

receiving intellectual property assets, individual ones of the intellectual property assets including first respective portions of text;

transforming the first respective portions of text into first vectors in a custom vector space;

receiving a search prompt including second respective portions of text;

transforming the second respective portions of text into second vectors;

generating a custom vector space configured to maintain the first vectors instead of maintaining data representing the intellectual property assets, wherein the custom vector space represents a lower dimensionality than the data representing the intellectual property assets such that storage requires are decreased by generation and use of the custom vector space;

generating a similarity score for a data set that includes first intellectual property (IP) assets based at least in part on comparing the first vectors and the second vectors;

sending a search request including the first data set that includes the first IP assets and the search prompt to a generative artificial intelligence (AI) model, the search request including an instruction to perform a search based on the prompt and to use the first vectors and the second vectors as input data; and receiving, from the generative AI model, a second data set that includes second IP assets; and displaying to a user, a generated graphical user interface (GUI) configured to display the second data set that includes the second IP assets, wherein the displayed GUI is updated based at least in part on a selection of at least one IP asset displayed on a first portion of the GUI.

14. The system of claim 13, the operations further comprising:

generating a first vector representation of the first data set based at least in part on the first IP assets;

generating a second vector representation of the second data set based at least in part on the second IP assets;

determining a ranking of the second IP assets based at least in part on comparing the first vector representation to the second vector representation;

sending the generative AI model a third data set that includes the ranking of the second IP assets as a feedback input; and sending a second search request including a fourth data set that includes the first IP assets to the generative AI model.

15. The system of claim 14, the operations further comprising:

receiving, from the generative AI model, a fifth data set that includes third IP assets;

generating a third vector representation of the fifth data set based at least in part on the third IP assets;

generating a fourth vector representation of the fourth data set based at least in part on the first IP assets;

determining a ranking of the third IP assets based at least in part on comparing the third vector representation to the fourth vector representation;

sending the generative AI model a sixth data set that includes the ranking of the third IP assets as a feedback input; and sending a third search request including a seventh data set that includes the first IP assets to the generative AI model.

16. The system of claim 14, wherein generating the ranking of the second IP assets include generating a similarity score associated with the second IP assets based at least in part on comparing the first vector representation to the second vector representation.

* * * * *